(12) United States Patent
Tochigi et al.

(10) Patent No.: US 7,509,046 B2
(45) Date of Patent: Mar. 24, 2009

(54) OPTICAL SYSTEM, FINDER OPTICAL SYSTEM, RELAY TYPE FINDER OPTICAL SYSTEM, EYEPIECE OPTICAL SYSTEM, AND SINGLE-LENS REFLEX CAMERA

(75) Inventors: Akiyoshi Tochigi, Kokubunji (JP); Teruhisa Mitsuo, Oume (JP); Keiichi Kuba, Koganei (JP); Hisashi Goto, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 348 days.

(21) Appl. No.: 11/322,641

(22) Filed: Jan. 3, 2006

(65) Prior Publication Data

US 2006/0153553 A1 Jul. 13, 2006

(30) Foreign Application Priority Data

| Jan. 11, 2005 | (JP) | ............................. 2005-003395 |
| Mar. 18, 2005 | (JP) | ............................. 2005-079097 |
| Mar. 18, 2005 | (JP) | ............................. 2005-079098 |
| Mar. 18, 2005 | (JP) | ............................. 2005-079099 |
| Mar. 18, 2005 | (JP) | ............................. 2005-079100 |

(51) Int. Cl.
*G03B 13/08* (2006.01)

(52) U.S. Cl. ..................... 396/386; 359/730
(58) Field of Classification Search ............ 348/341; 396/152, 386; 359/726, 730, 850

See application file for complete search history.

(56) References Cited

U.S. PATENT DOCUMENTS

| 4,573,781 A | * | 3/1986 | Kato ..................... 396/152 |
| 5,319,405 A | * | 6/1994 | Ikemori ................. 396/353 |
| 5,363,163 A |   | 11/1994 | Hayashi et al. |
| 5,557,458 A | * | 9/1996 | Itoh ..................... 359/434 |

FOREIGN PATENT DOCUMENTS

| JP | 01-101530 | 4/1989 |
| JP | 08-043749 | 2/1996 |
| JP | 09-054258 | 2/1997 |
| JP | 09-329820 | 12/1997 |
| JP | 2003-091027 | 3/2003 |

* cited by examiner

*Primary Examiner*—Melissa J Koval
*Assistant Examiner*—Autumn Parker
(74) *Attorney, Agent, or Firm*—Kenyon & Kenyon LLP

(57) ABSTRACT

The invention concerns an optical system adapted to split an optical path from a taking optical system into a finder optical system, which has a camera-shake correction function best suited for the finder optical system, and so on. This optical system comprises a taking optical system and a finder optical system. The taking optical system comprises an optical path splitter means operable to split an optical path into the finder optical system, and the finder optical system includes a relay optical system RLS for re-forming a subject image once. Anti-shake is implemented by shifting an optical subsystem RL that forms a part of the finder optical system in a plane vertical to an optical axis.

12 Claims, 46 Drawing Sheets

OPTICAL SYSTEM, FINDER OPTICAL SYSTEM, RELAY TYPE FINDER OPTICAL SYSTEM, EYEPIECE OPTICAL SYSTEM, AND SINGLE-LENS REFLEX CAMERA

This application claims benefits of Japanese Application No. 2005-3395 filed in Japan on Jan. 11, 2005 and Japanese Application Nos. 2005-79097, 2005-79098, 2005-79099 and 2005-79100 filed in Japan on Mar. 18, 2005, the contents of which are incorporated by this reference.

BACKGROUND OF THE INVENTION

The present invention relates generally to an optical system, a finder optical system, a relay type finder optical system, an eyepiece optical system and a single-lens reflex camera, and more specifically to an optical system having a camera-shake correction function capable of preventing image-shakes by camera-shake (e.g., upon hand-hold photographing), a relay optical system designed especially for taking systems such as digital cameras, film cameras and video cameras, an eyepiece optical system having a wide field of view, a long eye relief and a compact total length, a compact relay type finder optical system using the same, and a single-lens reflex camera using the same.

Prior art finder optical systems having a camera-shake correction function include the following.

The finder optical system set forth in patent publication 1 is configured as shown in FIG. 45. In this optical system, the camera-shake correction lens L is located in a non-TTL finder optical system wherein the taking optical system is separate from the finder optical system. Then, the camera-shake correction lens L is decentered parallel with the optical axis of the finder optical system by means of a driving system A, thereby implementing correction of shakes of light incident from a subject on the optical system.

The optical system set forth in patent publication 2 is configured as depicted in FIGS. 46, 47 and 48. In FIGS. 46 and 47, the lens L that forms a part of the objective lens is moved vertically to the optical axis, and in FIG. 48, the eyepiece lens E is moved vertically to the optical axis. In this way, correction of camera-shake is implemented.

With the above prior arts, a lens group having a camera-shake preventive function, i.e., an anti-shake group is used. As this anti-shake group is decentered, it produces aberrations that lead to image-formation capability deteriorations. It also produces decentration distortion that may otherwise cause an image shape to turn asymmetric with respect to the optical axis. There is thus the need of preventing such image-formation capability deteriorations and asymmetric image shape due to anti-shake Further, as the anti-shake group is heavy, it gives an increasing load to an actuator for the movement of the anti-shake group; that is, it is necessary to lighten the anti-shake group.

Furthermore, a low sensitivity to anti-shake causes an increase in the amount of movement of the anti-shake group. A high sensitivity to anti-shake, in contrast, renders control of movement of the anti-shake group difficult. To eliminate this problem, the sensitivity to anti-shake must be set at a proper value.

With anti-shake optical systems, much care must thus be taken of anti-shake functions.

The optical systems disclosed in patent publications 1 and 2 teach nothing about how the problems to be solved with anti-shake optical systems are addressed. In other words, these prior arts are still less than satisfactory in terms of practically optimum anti-shake methods, and how they are feasible. In particular, some patent publications do not present any optical path diagrams.

The optical systems disclosed in patent publications 1 and 2 are all directed to a non-TTL finder optical system with a taking optical system separate from a finder optical system.

By the way, single-lens reflex cameras comprising an image pickup plane smaller than conventional Leica-format size have been proposed and commercialized. Especially the market for single-lens reflex cameras using CCDs, C-MOSs or other electronic image pickup devices are now expanding. Decreased image pickup planes need a finder system of higher magnification. Although it is necessary to shorten the focal length of the whole finder optical system so as to make finder magnification high, this renders it difficult to set up a finder system in a widely available penta prism mode. Another technique known in the art is to use a relay type finder optical system, as typically taught in patent publications 3 and 4. Never until now, however, is there proposed any relay optical system, and any eyepiece optical system that is of good performance, is suitable for use with a small image pickup lane, and can be compactly laid out.

Further, there is still desired an eyepiece optical system or lens that ensures a relatively wide field of view, a long distance (eye relief) from the eyepiece lens the viewer's pupil (eye point), and a compact whole length inclusive of the position of an image being viewed as set by an image-formation lens, and a display position. Such eyepiece optical systems as set forth in patent publications 5 and 6 have so far been available. However, although they have a sufficiently wide angle of view, yet they are of inadequate eye relief.

Still, an eyepiece optical system having a long eye relief is desired in view of camera body construction as well.

Patent Publication 1
JP (A)) 9-329820
Patent Publication 2
JP (A) 2003-91027
Patent Publication 3
JP (A) 4-337705
Patent Publication 4
JP (A) 1-101530
Patent Publication 5
JP (A) 8-43749
Patent Publication 6
JP (A) 9-54258

SUMMARY OF THE INVENTION

The prior art situation being like this, one object of the invention is to provide an optical system operable to split an optical path from a taking optical system into a finder optical system, wherein a camera-shake correction function best suited for the finder optical system is provided.

Another object of the invention is to provide a compact relay type finder optical system that is compatible with a single-lens reflex camera using a relatively small image pickup device, and a single-lens reflex camera incorporating it.

Yet another object of the invention is to provide an eyepiece optical system that has a relatively wide field of view, a long distance (eye relief) from an eyepiece lens to a viewer's pupil (eye point) and a compact total length including an image viewing position by an image-formation lens.

A further object of the invention is to provide an eyepiece optical system that is compatible with a single-lens reflex camera using a relatively small image pickup device and suitable for use as a compact relay type finder optical system, and a finder optical system incorporating it.

The present invention, with which the above objects are achievable, is generally broken down into five aspects, of which the first aspect is directed to the following optical system.

[1] An optical system, comprising:
a taking optical system, and a finder optical system, wherein:
the taking optical system comprises an optical path splitter means operable to split an optical path into the finder optical system,
the finder optical system comprises a relay optical system operable to form a subject image once, and
the finder optical system comprises an optical subsystem that is operable to shift for anti-shake in a plane vertical to an optical axis of the finder optical system, and forms a part of the finder optical system.

The second aspect of the invention includes the following finder optical systems and single-lens reflex cameras.

[1] A finder optical system, comprising:
a relay optical system operable to re-form a subject image at a secondary image-formation position wherein the subject image is a primary image formed at a primary image-formation position through an objective optical system, and
an eyepiece optical system operable to view an image re-formed through the relay optical system, wherein:
the finder optical system comprises at least four reflecting surfaces including an F3 reflecting surface, an F2 reflecting surface, an F1 reflecting surface and an R1 reflecting surface located between the primary image-formation position and the secondary image-formation position side and in an optical path order from a primary image-formation position side to a secondary image-formation position side, and at least one positive lens located between the F1 reflecting surface and the R1 reflecting surface,
the finder optical system has an optical axis reflected at each of the reflecting surfaces, and
when a direction of a light ray traveling on an optical axis is taken as an optical axis direction and a component parallel with an optical axis direction exiting the eyepiece optical system is taken as a transverse component,
a transverse component in an optical axis direction exiting from the F2 reflecting surface is opposite to an optical axis direction exiting the eyepiece optical system, and
a transverse component in an optical axis direction exiting from the R1 reflecting surface is opposite to the optical axis direction exiting the eyepiece optical system.

[2] A finder optical system, comprising:
a relay optical system operable to re-form a subject image at a secondary image-formation position wherein the subject image is a primary image formed at a primary image-formation position through an objective optical system, and
an eyepiece optical system operable to view an image re-formed through the relay optical system, wherein:
the finder optical system comprises at least four reflecting surfaces including an F3 reflecting surface, an F2 reflecting surface, an F1 reflecting surface and an R1 reflecting surface located between the primary image-formation position and the secondary image-formation position side and in an optical path order from a primary image-formation position side to a secondary image-formation position side, and at least one positive lens located between the F1 reflecting surface and the R1 reflecting surface,
the finder optical system has an optical axis reflected at each of the reflecting surfaces, and
when a direction of a light ray traveling on an optical axis is taken as an optical axis direction and a component parallel with an optical axis direction exiting the eyepiece optical system is taken as a transverse component,
a transverse component in an optical axis direction incident on the F1 reflecting surface is opposite to an optical axis direction exiting the eyepiece optical system, and
a transverse component in an optical axis direction exiting from the R1 reflecting surface is opposite to an optical axis direction exiting the eyepiece optical system.

[3] A finder optical system, comprising:
a relay optical system operable to re-form a subject image at a secondary image-formation position wherein the subject image is a primary image formed at a primary image-formation position through an objective optical system, and
an eyepiece optical system operable to view an image re-formed through the relay optical system, wherein:
the finder optical system comprises at least four reflecting surfaces including an F3 reflecting surface, an F2 reflecting surface, an F1 reflecting surface and an R1 reflecting surface located between the primary image-formation position and the secondary image-formation position side and in an optical path order from a primary image-formation position side to a secondary image-formation position side, and at least one positive lens located between the F1 reflecting surface and the R1 reflecting surface,
an optical axis is acutely reflected at the F1 reflecting surface and acutely reflected at the R1 reflecting surface, and
an angle that the F1 reflecting surface subtends the R1 reflecting surface is an acute angle, provided that when at least one of the F1 reflecting surface and the R1 reflecting surface is a curved reflecting mirror, the subtending angle is an angle that tangent planes subtend each other at a position of incidence of an optical axis.

[4] A single-lens reflex camera, comprising:
a light beam splitter means operable to split light beams incident through an objective optical system into a light beam incident on an image pickup device and a light beam incident on a finder optical system operable to bend a light beam to view a subject image, and
a finder optical system operable to bend a light beam from the objective optical system to view a subject image, wherein:
the finder optical system comprises a focal plane plate located at a primary image-formation position set at a surface optically equivalent to the image pickup device,
a relay optical system operable to re-form a subject image at a secondary image-formation position wherein the subject image is a primary image formed at the primary image-formation position, and
an eyepiece optical system operable to view an image re-formed through the relay optical system, and wherein:
the finder optical system further comprises:
an F1 reflecting surface, an R1 reflecting surface and an R2 reflecting surface located in an optical path order from a primary image-formation position side to a secondary image-formation position side, and
at least one positive lens located between the F1 reflecting surface and the R1 reflecting surface, wherein:
an optical axis of the finder optical system is reflected at each of the reflecting surfaces, wherein an optical axis is acutely reflected at the light beam splitter means, an optical axis is acutely reflected at the F1 reflecting surface, an optical axis is acutely reflected at the R1 reflecting surface,
an angle that the F1 reflecting surface subtends the R1 reflecting surface is an acute angle, provided that when at east one of the F1 reflecting surface and the R1 reflecting surface is a curved reflecting mirror, the angle that the F1 reflecting surface subtends the R1 reflecting surface is given by an angle that tangent planes subtend each other at a position of incidence of an optical axis, and an optical axis of the eyepiece optical system is substantially parallel with an optical axis of the objective optical system.

The third aspect of the invention includes the following finder optical systems.

[1] A finder optical system, comprising:

a relay optical system operable to re-form a subject image at a secondary image-formation position wherein the subject image is a primary image formed at a primary image-formation position through an objective optical system, and an eyepiece optical system operable to view an image re-formed through the relay optical system, wherein:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on a side of the FP lens group facing the eyepiece optical system and having negative refracting power, and the RP lens group of positive refracting power consists of a fourth lens located on a side of the N lens group facing the eyepiece optical system and having negative refracting power and a fifth lens located on an eyepiece optical system side with respect to the fourth lens and having positive refracting power, and the relay optical system satisfies the following condition with respect to a composite focal length, flr, of the EP lens group, the N lens group and the RP lens group, and an axial distance, dl, between the primary image-formation position and a surface of the first lens on a primary image-formation position side:

$$0.3 < dl/flr < 3 \tag{3-1}$$

[2] A finder optical system, comprising:

a relay optical system operable to re-form a subject image at a secondary image-formation position wherein the subject image is a primary image formed at a primary image-formation position through an objective optical system, and an eyepiece optical system operable to view an image re-formed through the relay optical system, wherein:

the relay optical system comprises an FP lens group of positive refracting power, an N lens group located on a side of the FP lens group facing the eyepiece optical system and having negative refracting power, and an RP lens group located on a side of the N lens group facing the eyepiece optical system and having positive refracting power, wherein:

the RP lens group consists of, in order from a primary image-formation position side to a secondary image-formation position side, a negative lens and a positive lens, and the relay optical system satisfies the following condition (3-2) with respect to an axial distance, drf, from a surface located in, and nearest to a secondary image-formation position side of, the FP lens group to a surface located in the N lens group and on a secondary image-formation position side and an axial distance, drr, from a surface located in the N lens group and on a secondary image-formation position side to a surface located in, and nearest to a primary image-formation position side of, the RP lens group:

$$0.2 < drf/drr < 0.8 \tag{3-2}$$

[3] A finder optical system, comprising:

a relay optical system operable to re-form a subject image at a secondary image-formation position wherein the subject image is a primary image formed at a primary image-formation position through an objective optical system, and an eyepiece optical system operable to view an image re-formed through the relay optical system, wherein:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on an eyepiece optical system side with respect to the FP lens group and having negative refracting power, and the RP lens group of positive refracting power is located on an eyepiece optical system side with respect to the N lens group, and the relay optical system satisfies the following conditions (3-1) and (3-3) with respect to a composite focal length, flr, of the EP lens group, the N lens group and the RP lens group, an axial distance, dl, between the primary image-formation position and a surface of the first lens facing the primary image-formation position, and an axial distance, ds, from a surface located in the RP lens group and on a secondary image-formation position side to the secondary image-formation position:

$$0.3 < dl/flr < 3 \tag{3-1}$$

$$0.5 < ds/flr < 2 \tag{3-3}$$

[4] A finder optical system, comprising:

a relay optical system operable to re-form a subject image at a secondary image-formation position wherein the subject image is a primary image formed at a primary image-formation position through an objective optical system, and an eyepiece optical system operable to view an image re-formed through the relay optical system, wherein:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on an eyepiece optical system side with respect to the FP lens group and having negative refracting power, and the RP lens group of positive refracting power consists of a fourth lens located on an eyepiece optical system side with respect to the N lens group and having negative refracting power, and a fifth lens located on a side of the fourth lens facing the eyepiece optical system having positive refracting power, and the relay optical system satisfies the following conditions (3-1), (3-2) and (3-3) with respect to a composite focal length, flr, of the EP lens group, the N lens group and the RP lens group, an axial distance, dl, between the primary image-formation position and a surface of the first lens on a primary image-formation position side, an axial distance, drf, from a surface located in, and nearest to a secondary image-formation position side of, the FP lens group to a surface located in the N lens group and on a secondary image-formation position side, an axial distance, drr, from a surface located in the N-lens group and on a secondary image-formation position side to a surface located in, and nearest to a primary image-formation position side of, the RP lens, and an axial distance, ds, from a surface located in the RP lens group and on a secondary image-formation position side to the secondary image-formation position:

$$0.3 < dl/flr < 3 \quad (3\text{-}1)$$

$$0.2 < drf/drr < 0.8 \quad (3\text{-}2)$$

$$0.5 < ds/flr < 2 \quad (3\text{-}3)$$

The fourth aspect of the invention includes the following eyepiece optical systems and relay type finder optical systems.

[1] An eyepiece optical system, comprising, in order from a side of an image being viewed,
 a first lens having negative refracting power,
 a second lens having positive refracting power,
 a third lens having positive refracting power, and
 a fourth lens having positive refracting power, wherein the eyepiece optical system satisfies the following condition:

$$2.5 \leq f123/fA \leq 8 \quad (4\text{-}1)$$

where f123 is a composite focal length of the first lens, the second lens and the third lens, and
 fA is a focal length of the eyepiece optical system.

[2] An eyepiece optical system, comprising, in order from a side of an image being viewed,
 a first lens having negative refracting power,
 a second lens having positive refracting power,
 a third lens having positive refracting power, and
 a fourth lens having positive refracting power, wherein the eyepiece optical system satisfies the following condition:

$$1 \leq f4/fA \leq 2 \quad (4\text{-}2)$$

where f4 is a focal length of the fourth lens, and
 fA is a focal length of the eyepiece optical system.

[3] An eyepiece optical system, comprising, in order from a side of an image being viewed,
 a first lens having negative refracting power,
 a second lens having positive refracting power,
 a third lens having positive refracting power, and
 a fourth lens having positive refracting power, wherein the eyepiece optical system satisfies the following condition:

$$0.02 \leq d4/fA \leq 0.2 \quad (4\text{-}3)$$

where d4 is an axial thickness of the fourth lens, and
 fA is a focal length of the eyepiece optical system.

[4] A relay type finder optical system, comprising:
 a relay optical system operable to re-form a primary image formed through a taking optical system, and
 an eyepiece optical system operable to view an image re-formed through the relay optical system, wherein:
 the eyepiece optical system comprises, in order from a relay optical system side,
  a first lens having negative refracting power,
  a second lens having positive refracting power,
  a third lens having positive refracting power, and
  a fourth lens having positive refracting power.

The fifth aspect of the invention includes the following relay type finder optical systems.

[1] A relay type finder optical system, comprising:
 a relay optical system operable to re-form a subject image at a secondary image-formation position wherein the subject image is a primary image formed at a primary image-formation position through an objective optical system, and
 an eyepiece optical system operable to view an image re-formed through the relay optical system, wherein:
 the relay type finder optical comprises at least three reflecting surfaces located between the primary image-formation position and the secondary image-formation position, and
 the relay type finder optical system comprises a one-piece prism P1, wherein:
 of the at least three reflecting surfaces, two reflecting surfaces lying side by side on an optical axis in an optical path through the relay optical system are internal reflecting surfaces of the prism P1, and two such reflecting surfaces are total-reflection surfaces.

[2] A relay type finder optical system, comprising:
 a relay optical system operable to re-form a subject image at a secondary image-formation position wherein the subject image is a primary image formed at a primary image-formation position through an objective optical system, and
 an eyepiece optical system operable to view an image re-formed through the relay optical system, wherein:
 the relay type finder optical comprises at least three reflecting surfaces located between the primary image-formation position and the secondary image-formation position, and
 the relay type finder optical system comprises a one-piece prism P1, wherein:
 of the at least three reflecting surfaces, two reflecting surfaces lying side by side on an optical axis in an optical path through the relay optical system are internal reflecting surfaces of the prism P1, and an angle of incidence of an optical axis on two such internal reflecting surfaces is greater than 45°.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
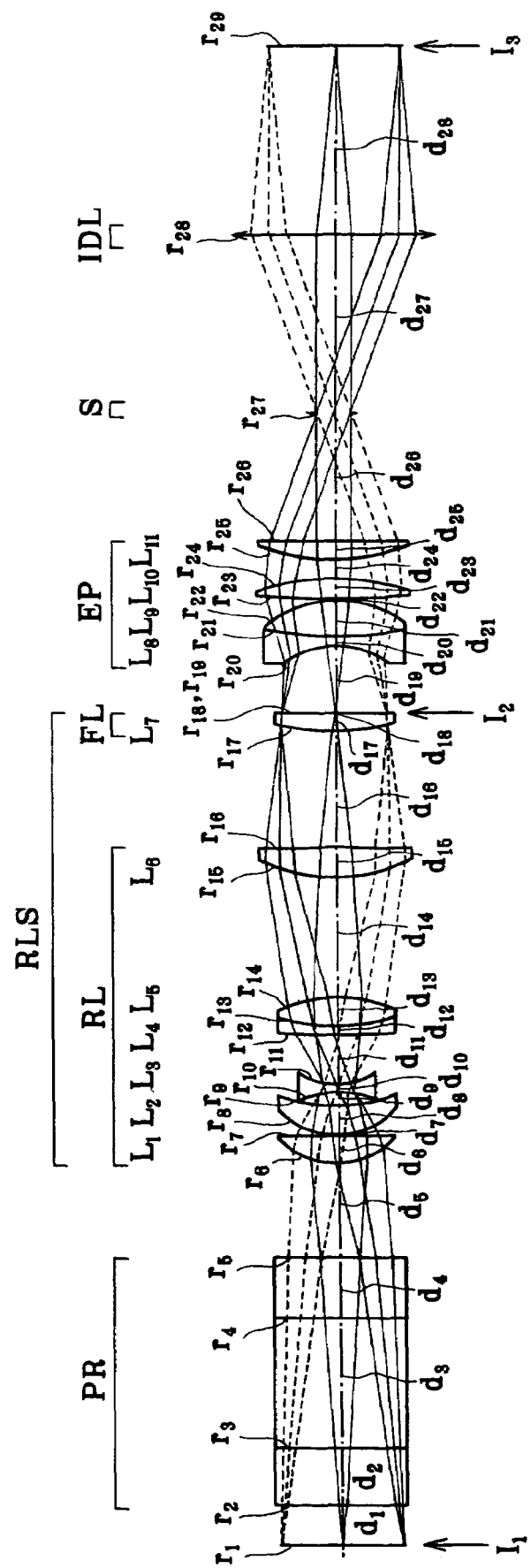
FIG. 1 is an optical path diagram for one exemplary finder optical system to which Embodiments 1-5 according to the first aspect of the invention are applied.

Possible arrangements of the optical system, finder optical system, relay type finder optical system, eyepiece optical system and single-lens reflex camera of the invention are now explained with reference to the $1^{st}$ to $5^{th}$ aspects of the invention in this order.

The first aspect of the invention is first explained.

The first optical system according to the first aspect of the invention comprises a taking optical system and a finder optical system, characterized in that:

the taking optical system comprises an optical path splitter means for splitting an optical path into the finder optical system, the finder optical system comprises a relay optical system for forming a subject image once, and an optical subsystem that forms a part of the finder optical system is moved or shifted in a plane vertical to the optical axis of the finder optical system for anti-shake (correction of camera-shake).

The advantage of, and the requirement for, the above first optical system arrangement is now explained. This optical system corresponds to Embodiments 1-5 given later.

In this arrangement, the taking optical system also works as an objective lens in the finder optical system; any objective lens for the finder optical system is dispensed with, so that the optical system can become simple.

An image viewed through the finder optical system is stabilized by an anti-shake mechanism, and so there is no shake of the image being viewed, which is a problem especially with telephotography or fledgling camera operators.

The location in the finder optical system of the relay optical system for forming a subject image once ensures that the image is easily viewable by increasing the magnification of the relay optical system, and helps increase the degree of flexibility in implementing the camera-shake correction function.

For a single-lens reflex camera like one contemplated herein, an erection optical system must be located between a primary image-formation plane and an eyepiece optical system, and to take hold of the angle of field, the focal length of the eyepiece optical system must be shortened. As the focal length is reduced while the pupil diameter and eye point position are kept constant, however, it causes the effective diameter of the erection optical system to become large, resulting in difficulty in offering a sensible tradeoff between getting hold of the angle of field and size reductions. However, this problem can be solved by the adoption of the secondary image-formation technique of re-forming the image through the relay optical system.

By the adoption of the shift technique where the optical subsystem that forms a part of the finder optical system moves in the plane vertical to the optical axis of the finder optical system, there is no need of another element such as a variable vertex angle prism for camera-shake correction (anti-shake) purposes, so that the construction of the optical system can become simple.

The second optical system according to the first aspect of the invention is characterized in that the optical subsystem that forms the relay optical system in the first optical system is shifted for anti-shake.

The advantage of, and the requirement for, the above second optical system arrangement is now explained. This optical system corresponds to Embodiments 1-4 given later.

The relay optical system is operable to re-form the primary image formed through the taking optical system in the form of a secondary image. When a field frame is placed on the secondary image-formation plane, another anti-shake function is needed for that field frame unless the image being viewed is corrected for camera-shake (anti-shake) on the secondary image-formation plane. If the anti-shake shift function of the optical system that forms the relay optical system is implemented, the image being viewed is prevented from shaking on the secondary image-formation plane; even without any anti-shake function for the field frame, both the image being viewed and the field frame can be corrected for camera-shake (anti-shake).

More preferably in this case, the relay optical system should include an optical system (of triplet construction) composed of a positive lens, a negative lens and a positive lens in this order, because even better correction of aberrations can be implemented with simple construction.

The third optical system according to the first aspect of the invention is characterized in that the relay optical system in the first optical system includes a field lens, and the anti-shake optical subsystem does not include that field lens.

The advantage of, and the requirement for, the above third optical system arrangement is now explained.

If the relay optical system includes a field lens and that field lens has a primary role of pupil position control, the diameter of the components of the relay optical system other than the field lens can then be decreased, although that field lens has a large diameter. The field lens positioned facing the primary image-formation plane or the second image-formation plane has a large effective diameter; if the field lens is included in the anti-shake group, the weight of the anti-shake group adds up. This will often render it impossible to drive the anti-shake group or drive it at high speed.

However, if the anti-shake function is implemented by the optical subsystem having a small diameter except the field lens, the load on the actuator can be lessened.

In addition, the sensitivity of the field lens to decentration is so low that the anti-shake function can be implemented by the shifting of the optical subsystem except that field lens; even when relative misalignments are caused by anti-shake operation between the anti-shake group and the field lens, the level of underperformance will remain limited after anti-shake operation.

Because of being free from the field lens, the anti-shake group can be composed of fewer lenses.

In this connection, the inclusion of the field lens on the secondary image-formation plane side of the relay optical system also provides the following advantages. As the exit pupil of the relay optical system is formed on the image side with respect to the secondary image-formation plane, it allows for a decrease in the diameter of the eyepiece optical system. This advantage grows more if the field lens primarily operable to control the pupil position is used for the lens on the secondary image-formation plane side of the relay optical system. The field lens here should preferably be composed of one or two lenses.

The fourth optical system according to the first aspect of the invention is characterized in that the anti-shake optical subsystem is included between the pupil of the relay optical system and the field lens.

The advantage of, and the requirement for, the above fourth optical system arrangement is now explained. This optical system corresponds to Embodiments 3 and 4 given later.

The effective diameter of the optical system near the pupil is small, and so the effective diameter of the optical system between the pupil and the field lens is relatively small, too. If the anti-shake function is implemented by the optical system between the pupil of relatively small size and the field lens, the weight of the anti-shake group becomes light enough to lessen loads on the anti-shake group driving actuator.

The fifth optical system according to the first aspect of the invention is characterized in that the relay optical system in the second optical system comprises, in order from the primary image-formation plane side, a group of positive refracting power, a group of negative refracting power and a group of positive refracting power, and the anti-shake optical subsystem is included in the last group of positive refracting power.

The advantage of, and the requirement for, the above fifth optical system arrangement is now explained. This optical system corresponds to Embodiments 3 and 4 given later.

As the relay optical system is of the triplet construction comprising a group of positive refracting power, a group of negative refracting power and a group of positive refracting power in this order, it allows for correction of aberrations with simple construction. A high transverse magnification of the lens included in the last group of positive refracting power contributes to an increased anti-shake sensitivity.

The sixth optical system according to the first aspect of the invention is characterized in that the first optical system satisfies the following condition:

$$0.8 \leq |\Delta'/\Delta| \leq 4 \quad (1\text{-}1)$$

where:

$\Delta$ is the amount of shift of the moving optical subsystem, and $\Delta'$ is the amount of correction of an image position at the secondary image-formation plane.

The advantage of, and the requirement for, the above sixth optical system arrangement is now explained. This optical system corresponds to Embodiments 1-4 given later.

The satisfaction of condition (1-1) ensures that the anti-shake sensitivity (amount of image-shake correction/amount of shift of the anti-shake group) becomes proper. As the upper limit of 4 to this condition is exceeded, it renders adjustment of the amount of shift of the anti-shake group difficult due to too high a sensitivity. As the lower limit of 0.8 is not reached, it causes large loads to be applied on the actuator, because too low a sensitivity renders the amount of shift of the anti-shake group large.

More preferably, $$1 \leq |\Delta'/\Delta| \leq 3 \quad (1\text{-}1)'$$

The above advantage grows more.
Even more preferably, $$1.2 \leq |\Delta'/\Delta| \leq 2.2 \quad (1\text{-}1)''$$

The above advantage grows much more.

The seventh optical system according to the first aspect of the invention is characterized in that the second optical system satisfies the following condition:

$$0.5 \leq |f_t/f_s| \leq 8 \quad (1\text{-}2)$$

where:

$f_t$ is the focal length of the relay lens system, and $f_s$ is the focal length of the optical subsystem that shifts for anti-shake.

The advantage of, and the requirement for, the above seventh optical system arrangement is now explained. This optical system corresponds to Embodiments 1-4 given later.

The satisfaction of condition (1-2) ensures that a sensible tradeoff can be made between anti-shake sensitivity and performance after anti-shake. If the upper limit of 8 to this condition is exceeded, the power of the anti-shake group will become too strong, resulting in considerable underperformance after anti-shake. Falling short of the lower limit of 0.5 will cause the power of the anti-shake group to become too weak, resulting in poor anti-shake sensitivity.

The eighth optical system according to the first aspect of the invention is characterized in that the first optical system satisfies the following condition:

$$-3 \leq \beta_a \leq -0.5 \quad (1\text{-}3)$$

where $\beta_a$ is the transverse magnification of the optical subsystem that moves for anti-shake.

The advantage of, and the requirement for, the above eighth optical system arrangement is now explained. This optical system corresponds to Embodiments 1-4 given later.

When a part of the optical system is shifted for anti-shake, the following relation is satisfied:

$$\Delta' = \Delta(1-\beta_a)\beta_b$$

where:

$\Delta$ is the amount of shift of the moving optical subsystem, $\Delta'$ is the amount of correction of an image position at the secondary image-formation plane, $\beta_a$ is the transverse magnification of the optical subsystem that moves for anti-shake, and $\beta_b$ is the transverse magnification of the relay lens group on the image side with respect to the optical subsystem that moves for anti-shake.

The satisfaction of condition (1-3) ensures that the anti-shake sensitivity (amount of image-shake correction/amount of shift of the anti-shake group) becomes proper. As the lower limit of −3 to condition (1-3) is not reached, it renders adjustment of the amount of shift of the anti-shake group difficult due to too high a sensitivity. As the upper limit of −0.5 is exceeded, it causes large loads to be applied on the actuator, because too low a sensitivity renders the amount of shift of the anti-shake group large.

More preferably, $$-2.7 \leq \beta_a \leq -0.6 \quad (1\text{-}3)'$$

The above advantage grows more.
Even more preferably, $$-2.3 \leq \beta_a \leq -0.7 \quad (1\text{-}3)''$$

The above advantage grows much more.

According to the above first aspect of the invention, the anti-shake optical system that is reduced in terms of performance deterioration after anti-shake and has proper anti-shake sensitivity can be used to correct the finder optical system for camera-shake.

Reference is now made to the second aspect of the invention.

The first finder optical system according to the second aspect of the invention comprises:

a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the finder optical system comprises at least four reflecting surfaces including an F3 reflecting surface, an F2 reflecting surface, an F1 reflecting surface and an R1 reflecting surface located between the primary image-formation position and the secondary image-formation position and in an optical path order from a primary image-formation position side to a secondary image-formation position side, the finder optical system has an optical axis reflected at each of the reflecting surfaces, at least one positive lens is located at least between the F1 reflecting surface and the R1 reflecting surface, and when a direction of a light ray traveling on an optical axis is taken as an optical axis direction and a component parallel with an optical axis direction exiting the eyepiece optical system is taken as a transverse component, a transverse component in an optical axis direction exiting from the F2 reflecting surface is opposite to an optical axis direction exiting the eyepiece optical system, and a transverse component in an optical axis direction exiting from the R1 reflecting surface is opposite to the optical axis direction exiting the eyepiece optical system. The second finder optical system according to the second aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the finder optical system comprises at least four reflecting surfaces including an F3 reflecting surface, an F2 reflecting surface, an F1 reflecting surface and an R1 reflecting surface located between the primary image-formation position and the secondary image-formation position and in an optical path order from a primary image-formation position side to a secondary image-formation position side, the finder optical system has an optical axis reflected at each of the reflecting surfaces, at least one positive lens is located at least between the F1 reflecting surface and the R1 reflecting surface, and when a direction of a light ray traveling on an optical axis is taken as an optical axis direction and a component parallel with an optical axis direction exiting the eyepiece optical system is taken as a transverse component, a transverse component in an optical axis direction incident on the F1 reflecting surface is opposite to an optical axis direction exiting the eyepiece optical system, and a transverse component in an optical axis direction exiting from the R1 reflecting surface is opposite to an optical axis direction exiting the eyepiece optical system. The third finder optical system according to the second aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the finder optical system comprises at least four reflecting surfaces including an F3 reflecting surface, an F2 reflecting surface, an F1 reflecting surface and an R1 reflecting surface located between the primary image-formation position and the secondary image-formation position and in an optical path order from a primary image-formation position side to a secondary image-formation position side, and at least one positive lens located between the F1 reflecting surface and the R1 reflecting surface, the finder optical system has an optical axis reflected at each of the reflecting surfaces, at least one positive lens is located between the F1 reflecting surface and the R1 reflecting surface, an optical axis is acutely reflected at the F1 reflecting surface and acutely reflected at the R1 reflecting surface, and an angle that the F1 reflecting surface subtends the R1 reflecting surface is an acute angle, provided that when at least-one of the F1 reflecting surface and the R1 reflecting surface is a curved reflecting mirror, the subtending angle is an angle that tangent planes subtend each other at a position of incidence of an optical axis.

The advantages of, and the requirements for, the above $1^{st}$ to $3^{rd}$ optical system arrangements are now explained.

To make the finder optical system compact in its height direction (with respect to the optical axis of the objective optical system), the lenses in the relay optical system should preferably be laid out such that they do not line up in the vertical direction to the objective optical system. To make the objective optical system compact in its optical axis direction, the relay optical system should preferably be configured such that the optical axis of its main part is not on the same straight line as the optical axis of the eyepiece optical system.

On the other hand, the relay optical system must have reasonable spaces between the primary image-formation position and its principal point positions and between its principal point positions and the secondary image-formation position so as to implement its own function.

The satisfaction of the respective requirements for the $1^{st}$ to $3^{rd}$ finder optical systems according to the second aspect of the invention as described above ensures that the lens element in the relay optical system has the F1 reflecting surface and R1 reflecting surface before and after it, and that the lens element-receiving space can efficiently and easily be secured between these reflecting surfaces. In addition, it is possible to achieve a relay optical system that is compact in both its height direction and the optical axis direction of the objective optical system.

Note here that the principal point positions of the relay optical system are preferably found between the F1 reflecting surface and the R1 reflecting surface.

The fourth finder optical system according to the second aspect of the invention is characterized in that the first finder optical system satisfies the following condition (2-1) with respect to an angle $\alpha_f$ at which an optical axis direction exiting from the F2 reflecting surface subtends an optical axis direction exiting from the eyepiece optical system, provided however that when extensions of the above two optical axis directions do not intersect, that angle $\alpha_f$ could be given by an angle made upon projection of two such extensions in a direction of a straight line of connecting together their closest portions.

$$92° \leq \alpha_f \leq 135° \quad (2\text{-}1)$$

The fifth finder optical system according to the second aspect of the invention is characterized in that the fourth finder optical system satisfies the following condition (2-1)':

$$97° \leq \alpha_f \leq 105° \quad (2\text{-}1)'$$

The advantages of, and the requirements for, the above $4^{th}$ and $5^{th}$ optical system arrangements are now explained.

Being shy of the lower limit of 92° to condition (2-1) will render it difficult to get efficient hold of relay optical system space. If the upper limit of 135° to condition (2-1) is exceeded, a lot more overlaps will be caused by the bending of a light beam, rendering the whole finder system too bulky to figure out a good layout for it.

More preferably, the lower limit and the upper limit should be set 97° and 105°, respectively.

The sixth finder optical system according to the second aspect of the invention is characterized in that the second finder optical system satisfies the following condition (2-2) with respect to an angle $\alpha_f'$ at which an optical axis direction incident on the F1 reflecting surface subtends an optical axis direction exiting from the eyepiece optical system, provided that when extensions of the above two optical axis directions do not intersect, that angle $\alpha_f'$ could be given by an angle made upon projection of two such optical axis extensions in a direction of a straight line of connecting together their closest portions.

$$92° \leq \alpha_f' \leq 135° \quad (2\text{-}2)$$

The seventh finder optical system according to the second aspect of the invention is characterized in that the sixth finder optical system satisfies the following condition (2-2)':

$$92° \leq \alpha_f' \leq 105° \quad (2\text{-}2)'$$

The advantages of, and the requirements for, the above $6^{th}$ and $7^{th}$ optical system arrangements are now explained.

Being shy of the lower limit of 92° to condition (2-2) will render it difficult to get efficient hold of relay optical system space. If the upper limit of 135° to condition (2-2) is exceeded, a lot more overlaps will be caused by the bending of a light beam, rendering the whole finder system too bulky to figure out a good layout for it.

More preferably, the lower limit and the upper limit should be set 97° and 105°, respectively.

The eighth finder optical system according to the second aspect of the invention is characterized in that the third finder optical system satisfies the following condition (2-3) with respect to the angle of reflection, $\theta_f$, of an optical axis at the F1 reflecting surface.

$$45° < \theta_f < 88° \quad (2-3)$$

Note here that the angle of reflection, $\theta_f$, is an angle that the optical axes incident on and reflected at the F1 reflecting surface make.

The ninth finder optical system according to the second aspect of the invention is characterized in that the eighth finder optical system satisfies the following condition (2-3)'.

$$75° < \theta_f < 83° \quad (2-3)'$$

Being shy of the lower limit of 45° to condition (2-3) will render it difficult to get efficient hold of relay optical system space. If the upper limit of 88° to condition (2-3) is exceeded, a lot more overlaps will be caused by the bending of a light beam, rendering the whole finder system too bulky to figure out a good layout for it.

More preferably, the lower limit and the upper limit should be set 75° and 83°, respectively.

The 10th finder optical system according to the second aspect of the invention is characterized in that any one of the 3rd and the 8th-9th finder optical systems satisfies the following condition (2-4) with respect to the angle of reflection, $\theta_r$, of an optical axis at the R1 reflecting surface.

$$45° < \theta_r < 88° \quad (2-4)$$

Note here that the angle of reflection, $\theta_r$, is an angle that the optical axes incident on and reflected at the R1 reflecting surface make.

The 11th finder optical system according to the second aspect of the invention is characterized in that the 10th finder optical system satisfies the following condition (2-4)'.

$$75° < \theta_r < 83° \quad (2-4)'$$

The advantages of, and the requirements for, the above 10th and 11th finder optical systems are now explained.

Being shy of the lower limit of 45° to condition (2-4) will render it difficult to get efficient hold of relay optical system space. If the upper limit of 88° to condition (2-4) is exceeded, a lot more overlaps will be caused by the bending of a light beam, rendering the whole finder system too bulky to figure out a good layout for it.

More preferably, the lower limit and the upper limit should be set 75° and 83°, respectively.

The 12th finder optical system according to the second aspect of the invention is characterized in that any one of the 3rd and the 8th-10th finder optical systems satisfies the following condition (2-5) with respect to an angle $\theta_m$ at which the F1 reflecting surface subtends the R1 reflecting surface.

$$45° < \theta_m < 88° \quad (2-5)$$

It is noted, however, that when at least one of the F1 reflecting surface and the R1 reflecting surface is a curved reflecting mirror, that angle $\theta_m$ could be given by an angle that tangent planes subtend each other at a position of incidence of an optical axis.

The 13th finder optical system according to the second aspect of the invention is characterized in that the 12th finder optical system satisfies the following condition (2-5)'.

$$75° < \theta_m < 83° \quad (2-5)$$

The advantages of, and the requirements for, the above 12th and 13th finder optical systems are now explained.

Being shy of the lower limit of 45° to condition (2-5) will render it difficult to get efficient hold of relay optical system space. If the upper limit of 88° to condition (2-5) is exceeded, a lot more overlaps will be caused by the bending of a light beam, rendering the whole finder system too bulky to figure out a good layout for it.

More preferably, the lower limit and the upper limit should be set 75° and 83°, respectively.

The 14th finder optical system according to the second aspect of the invention is characterized in that in any one of the 1st and the 2nd finder optical system, an optical axis just upon exiting from the R1 reflecting surface subtends an optical axis exiting from the eyepiece optical system at an acute angle $\alpha_r$ that satisfies the following condition (2-6), provided however that when extensions of the above two optical axis directions do not intersect, that angle $\alpha_r$ could be given by an angle made upon projection of two such extensions in a direction of a straight line of connecting together their closest portions.

$$45° \leq \alpha_r \leq 88° \quad (2-6)$$

The 15th finder optical system according to the second aspect of the invention is characterized in that the 14th finder optical system satisfies the following condition (2-6)'.

$$60° \leq \alpha_r \leq 80° \quad (2-6)'$$

The advantages of, and the requirements for, the above 14th and 15th finder optical systems are now explained.

If the lower limit of 45° to condition (2-6) is not reached, a lot more overlaps will be caused by the bending of a light beam, rendering the whole finder system too bulky to figure out a good layout for it. Exceeding the upper limit of 88° to condition (2-6) will render it difficult to get efficient hold of relay optical system space.

More preferably, the lower limit and the upper limit should be set 60° and 80°, respectively.

The 16th finder optical system according to the second aspect of the invention is characterized in that the direction of an optical axis incident on the F1 reflecting surface is away from the primary image-formation position and the direction of an optical axis exiting from the R1 reflecting surface is toward the primary image-formation position.

The advantage of, and the requirement for, the above 16th finder optical system arrangement is now explained.

With such arrangement, it is possible to get hold of the space between the F1 reflecting surface and the R1 reflecting surface, and figure out a compact layout for the whole finder optical system including the relay optical system and the eyepiece optical system.

In particular, the location of the F1 reflecting surface on a subject side with respect to the primary image-formation position and the location of the R1 reflecting surface on a viewer side with the respect to the primary image-formation position are more preferable for that compact layout.

The 17th finder optical system according to the second aspect of the invention is characterized in that in any one of the 1st to the 16th finder optical system, at least one positive lens is located between the F1 reflecting surface and the R1 reflecting surface, at least one negative lens is located on the side of the positive lens that faces the R1 reflecting surface, and at least one positive lens is located on the side of the negative lens that faces the R1 reflecting surface.

The advantage of, and the requirement for, the above 17$^{th}$ finder optical system arrangement is now explained.

If at least the positive lens, the negative lens and the positive lens are located in relatively proximate relations without any reflecting surface interposed between the lenses, it is then possible to configure a compact yet good-performance relay optical system.

The 18$^{th}$ finder optical system according to the second aspect of the invention is characterized in that in any one of the 1$^{st}$ to the 17$^{th}$ finder optical system, the position of incidence of an optical axis on the F1 reflecting surface with respect to the position of incidence of an optical axis on the F3 reflecting surface is in a direction away from the direction of an optical axis exiting the eyepiece optical system.

The advantage of, and the requirement for, the above 18$^{th}$ finder optical system arrangement is now explained.

With that arrangement, it is possible to get hold of a space capable of laying out the relay optical system on a straight line substantially parallel with the optical axis exiting the eyepiece optical system.

The 19$^{th}$ finder optical system according to the second aspect of the invention is characterized in that optical function surfaces located between the F3 reflecting surface and the F1 reflecting surfaces are all in plane form.

The advantage of the above 19$^{th}$ finder optical system arrangement is now explained.

That arrangement is easy to assemble.

The 20$^{th}$ finder optical system according to the second aspect of the invention is characterized in that in any one of the 1$^{st}$ to the 19$^{th}$ finder optical system, an R2 reflecting surface is located between the R1 reflecting surface and the secondary image-formation position, and an optical axis exiting from the secondary image-formation position and an optical axis incident on the eyepiece optical system lie on the same straight line.

The advantage of, and the requirement for, the about 20$^{th}$ finder optical system arrangement is now explained.

With that arrangement, it is possible to get hold of a space between the secondary image-formation position and the principal point positions of the relay optical system, and it is easy to figure out a layout where the secondary image-formation position comes close to the eyepiece optical system. This works for configuring a relay type finder system having improved performance at a high finder magnification.

The 21$^{st}$ finder optical system according to the second aspect of the invention is characterized in that any one of the 1$^{st}$ to the 20$^{th}$ finder optical system, an R2 reflecting surface is located between the R1 reflecting surface and the secondary image-formation position, and at least one positive lens is located between the R1 reflecting surface and the R2 reflecting surface.

The advantage of, and the requirement for, the above 21$^{st}$ finder optical system arrangement is now explained.

If a lens having the image-formation function of the relay optical system and a pupil transmission function from secondary image-formation to the viewer's pupil is located at a position reasonably away from both the principal points of the relay optical system located between the F1 reflecting surface and the R1 reflecting surface and the secondary image-formation plane, it is then easy to configure a compact, easy-to-view, high-performance finder.

The 22$^{nd}$ finder optical system according to the second aspect of the invention is characterized in that the number of reflecting surfaces between the primary image-formation position and the secondary image-formation position is only five.

The advantage of, and the requirement for, the above 22$^{nd}$ finder optical system arrangement is now explained.

As there are six or more reflecting surfaces between the primary image-formation position and the secondary image-formation position, light quantity losses due to them grow large. If the number of reflecting surfaces is five, it is then possible to get hold of the degree of flexibility in determining what layout is used.

One single-lens reflex camera according to the second aspect of the invention is characterized by comprising a light beam splitter means operable to split light beams entered through an objective optical system into a light beam incident on an image pickup device and a light beam incident on a finder optical system operable to bend the light beam to view a subject image, a finder optical system operable to bend the light beam coming from the objective optical system to view a subject image, and a focal plane plate placed at a primary image-formation position on a surface optically equivalent to the image pickup device to form a subject image, wherein the finder optical system is any one of the 1$^{st}$ to the 22$^{nd}$ finder optical system as described above.

The advantage of, and the requirement for, the above single-lens reflex camera arrangement according to the second aspect of the invention is now explained.

The above finder arrangement is mounted on a single-lens reflex camera. Note here that the light beam splitter means could be a light quantity division means relying on a half-silvered mirror or the like, or a time division means relying on a quick return mirror or the like.

Another single-lens reflex camera according to the second aspect of the invention is characterized by comprising a light beam splitter means operable to split light beams entered through an objective optical system into a light beam incident on an image pickup device and a light beam incident on a finder optical system operable to bend the light beam to view a subject image, and a finder optical system operable to bend the light beam coming from the objective optical system to view a subject image, wherein:

the finder optical system comprises:

a focal plane plate placed at a primary image-formation position set on a surface optically equivalent to the image pickup device, a relay optical system operable to re-form a subject image at a secondary image-formation position wherein the subject image is a primary image formed at the primary image-formation position, and an eyepiece optical system operable to view an image re-formed via the relay optical system, and the finder optical system comprises, in order from an optical path order from the primary image-formation position side, an F1 reflecting surface, an R1 reflecting surface and an R2 reflecting surface, wherein:

the finder optical system has an optical axis reflected at each of the reflecting surfaces, at least one positive lens is located at least between the F1 reflecting surface and the R1 reflecting surface, an optical axis is acutely reflected at the light beam splitter means, an optical axis is acutely reflected at the F1 reflecting surface, and an optical axis is acutely reflected at the R1 reflecting surface, an angle that the F1 reflecting surface subtends the R1 reflecting surface is an acute angle, provided however that when at least one of the F1 reflecting surface and the R1 reflecting surface is a curved reflecting mirror, the angle that the F1 reflecting surface subtends the R1 reflecting surface could be given by an angle that tangent planes subtend each other at a position of incidence of an optical axis, and an optical axis of the eyepiece optical system is substantially parallel with an optical axis of the objective optical system.

The advantage of, and the requirement for, the above single-lens reflex camera arrangement is now explained.

With that layout, the optical path through the finder optical system can be turned back with fewer reflecting surfaces. Thus, a compact single-lens reflex camera can be configured albeit having a secondary image-formation type finder. It is also possible to configure a single-lens reflex camera having a high finder magnification.

In accordance with the above second aspect of the invention, it is possible to achieve a relay type finder optical system wherein reflecting surfaces are located before and after a lens element in a relay optical system so that the finder optical system can be made compact in both its height direction and the optical axis direction of an objective optical system. It is thus possible to provide a compact relay type finder optical system well compatible even with a single-lens reflex camera using a relatively small image pickup device, and a single-lens reflex camera using it.

Next, reference is made to the third aspect of the invention.

The first finder optical system according to the third aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on an eyepiece optical system side with respect to the N lens group and having negative refracting power, and the RP lens group of positive refracting power consists of a fourth lens located on an eyepiece optical system side with respect to the N lens group and having negative refracting power and a fifth lens located on a side of the fourth lens facing an eyepiece optical system and having positive refracting power, and the relay optical system satisfies the following condition with respect to a composite focal length, flr, of the EP lens group, the N lens group and the RP lens group, and an axial distance, dl, between the primary image-formation position and a side of the first lens facing a primary image-formation position:

$$0.3 < dl/flr < 3 \quad (3\text{-}1)$$

The advantage of, and the requirement for, the above first finder optical system arrangement according to the third aspect of the invention is now explained.

In the relay lens of the invention, the positive FP lens group, the negative N lens group and the positive RP lens group are located in this order for the purpose of implementing functions of re-forming an image and making correction of aberrations. The location of these lens groups improves on refracting power symmetry, working for correction of aberrations.

In addition, more satisfactory correction of aberrations is achievable if the positive refracting power of the positive FP lens group is allocated to two positive lenses such that the necessary power is obtainable with lens surfaces having a slack curvature.

For correction of chromatic aberrations, the positive RP lens group is composed of the negative lens and the positive lens, in order from the primary image-formation plane side, two in all.

Being short of the lower limit of 0.3 to the above condition (3-1) is not preferable, because the first lens comes too close to the primary image-formation plane, and the power of the first lens contributes less to the re-formation of images. With this, increased loads are applied on the re-formation of images by the second lens, and the fifth lens, rendering spherical aberrations, etc. likely to occur. As the upper limit of 3 to condition (3-1) is exceeded, it renders the whole relay optical system length likely to become long. When the relay optical system is configured while its whole length remains short, it is difficult to implement correction of aberrations with a small number of lenses. In other words, a lot more lenses must be used for that purpose, working against compactness and a paraxial arrangement.

Regarding the above condition (3-1), the lower limit should preferably be set at 0.8, especially 1.2, and the upper limit should preferably be set at 2.4, especially 1.8.

The second finder optical system according to the third aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the relay optical system comprises an FP lens group of positive refracting power, an N lens group located on a side of the FP lens group facing the eyepiece optical system and having negative refracting power, and an RP lens group located on a side of the N lens group facing the eyepiece optical system and having positive refracting power, wherein:

the RP lens group consists of, in order from a primary image-formation position side, a negative lens and a positive lens, and the relay optical system satisfies the following condition (3-2) with respect to an axial distance, drf, from a surface located in, and nearest to a secondary image-formation position side of, the FP lens group to a surface located in the N lens group and on a secondary image-formation position side and an axial distance, drr, from a surface located in the N lens group and on a secondary image-formation position side to to a surface located in, and nearest to a primary image-formation position side of, the RP lens group:

$$0.2 < drf/drr < 0.8 \quad (3\text{-}2)$$

The advantage of, and the requirement for, the above second finder optical system is now explained.

In the relay lens of the invention, the positive FP lens group, the negative N lens group and the positive RP lens group are located in this order for the purpose of implementing functions of re-forming an image and making correction of aberration. The location of these lens groups improves on refracting power symmetry, working for correction of aberrations.

Further, it is preferable for the RP lens to consist of a negative lens and a positive lens and for the relay optical system to satisfy condition (3-2), because the distance between the negative component in the N lens group and the negative lens in the RP lens group can be properly set, thereby implementing satisfactory correction of longitudinal chromatic aberration and chromatic aberration of magnification.

Being shy of the lower limit of 0.2 to condition (3-2) is not preferable in view of compactness and a paraxial arrangement, because the N lens group is spaced too away from the RP lens group, resulting in an increase in the total length of the relay optical system, and an increase in the number of lenses used in it. Exceeding the upper limit of 0.8 renders it difficult to offer a balance against correction of longitudinal chromatic aberration and off-axis chromatic aberration, because the negative lenses come too close to each other.

Preferably, the N lens group should be composed of one negative lens. This can make the relay optical system compact. Preferably, the FP lens group should be composed of two positive lenses. This enables the necessary power to be obtained at lens surfaces having a slack curvature, working for satisfactory correction of aberrations.

Regarding the above condition (3-2), the lower limit should preferably be set at 0.3, especially 0.4, and the upper limit should be set at 0.65, especially 0.55.

The third finder optical system according to the third aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on an eyepiece optical system side with respect to the FP lens group and having negative refracting power, and the RP lens group of positive refracting power is located on an eyepiece optical system side with respect to the N lens group, and the relay optical system satisfies the following conditions (3-1) and (3-3) with respect to a composite focal length, flr, of the FP lens group, the N lens group and the RP lens group, an axial distance, dl, between the primary image-formation position and a side of the first lens facing the primary image-formation position, and an axial distance, ds, from a surface located in the RP lens group and on a secondary image-formation position side to the secondary image-formation position:

$$0.3 < dl/flr < 3 \qquad (3\text{-}1)$$

$$0.5 < ds/flr < 2 \qquad (3\text{-}3)$$

The advantage of, and the requirement for, the above third finder optical system arrangement according to the third aspect of the invention is now explained.

In the relay lens of the invention, the positive FP lens group, the negative N lens group and the positive RP lens group are located in this order for the purpose of implementing functions of re-forming an image and making correction of aberrations. The location of these lens groups improves on refracting power symmetry, working for correction of aberrations.

In addition, more satisfactory correction of aberrations is achievable if the positive refracting power of the positive FP lens group is allocated to two positive lenses such that the necessary power is obtainable with lens surfaces having a slack curvature.

Being short of the lower limit of 0.3 to the above condition (3-1) is not preferable, because the first lens comes too close to the primary image-formation plane, and the power of the first lens contributes less to the re-formation of images. With this, increased loads are applied on the re-formation of images by the second lens, and the positive lens in the RP lens group, rendering spherical aberrations, etc. likely to occur. As the upper limit of 3 to condition (3-1) is exceeded, it renders the whole relay optical system length likely to become long. When the relay optical system is configured while its whole length remains short, it is difficult to implement correction of aberrations with a small number of lenses. In other words, a lot more lenses must be used for that purpose, working against compactness and a paraxial arrangement.

Being short of the lower limit of 0.5 to the above condition (3-3) is not preferable, because the RP lens groups comes too close to the secondary image-formation plane, and the power of the RP lens group contributes less to the re-formation of images. With this, increased loads are applied on the first lens and the second lens, rendering spherical aberrations likely to occur. Exceeding the upper limit of 3 is not preferable in view of compactness and paraxial arrangement, because the whole relay optical system length becomes long with an increase in the number of lenses used.

Regarding the above condition (3-1), the lower limit should preferably be set at 0.8, especially 1.2, and the upper limit should preferably be set at 2.4, especially 1.8.

Regarding the above condition (3-3), the lower limit should preferably be set at 0.7, especially 1.0, and the upper limit should preferably be set at 1.7, especially 1.5.

In the invention, the arrangement of the first finder optical system, the arrangement of the second finder optical system and the arrangement of the third finder optical system could be applied in combination of two or more.

Typically in this regard, the fourth finder optical system according to the third aspect of the invention comprises a relay optical system operable to re-form a subject image at a secondary image-formation position wherein the subject image is a primary image formed at a primary image-formation position through an objective optical system, and an eyepiece optical system operable to view an image re-formed through the relay optical system, characterized in that:

the relay optical system comprises an FP lens group of positive refracting power, an N lens group of negative refracting power and an RP lens group of positive refracting power, wherein:

the FP lens group of positive refracting power consists of a first lens having positive refracting power, and a second lens located on a side of the first lens facing the eyepiece optical system and having positive refracting power, the N lens group of negative refracting power consists of a third lens group located on an eyepiece optical system side with respect to the FP lens group and having negative refracting power, and the RP lens group of positive refracting power consists of a fourth lens located on an eyepiece optical system side with respect to the N lens group and having negative refracting power, and a fifth lens located on a side of the fourth lens facing the eyepiece optical system and having positive refracting power, and the relay optical system satisfies the following conditions (3-1), (3-2) and (3-3) with respect to a composite focal length, flr, of the EP lens group, the N lens group and the RP lens group, an axial distance, dl, between the primary image-formation position and a side of the first lens facing the primary image-formation position, an axial distance, drf, from a surface located in, and nearest to a secondary image-formation position side of, the FP lens group to a surface located in the N lens group and on a secondary image-formation position side, an axial distance, drr, from a surface located in the N lens group and on a secondary image-formation position side to a surface located in, and nearest to a primary image-formation position side of, the RP lens, and an axial distance, ds, from a surface located in the RP lens group and on a secondary image-formation position side to the secondary image-formation position:

$$0.3 < dl/flr < 3 \quad (3\text{-}1)$$

$$0.2 < drf/drr < 0.8 \quad (3\text{-}2)$$

$$0.5 < ds/flr < 2 \quad (3\text{-}3)$$

The fifth finder optical system according to the third aspect of the invention is characterized in that in any one of the $1^{st}$ to the $4^{th}$ finder optical system, a relay optical system auxiliary lens is located between the surface located in the positive RP lens group and on the secondary image-formation position side and the secondary image-formation position in such a way as to satisfy condition (3-4):

$$0.25 < dh/ds < 0.75 \quad (3\text{-}4)$$

where:

dh is an axial distance from the surface located in the RP lens group and on the secondary image-formation position side to a side of the relay optical system auxiliary lens facing an RP lens group side, and ds is an axial distance from the surface located in the RP lens group and on the secondary image-formation position side to the secondary image-formation position.

The advantage of, and the requirement for, the above fifth finder optical system arrangement is now explained.

As some distance is set between the RP lens group and the relay optical system auxiliary lens, it allows an axial light beam to be so separated from an off-axis light beam that effects on correction of off-axis aberrations can grow more. It also provides a backup to a condenser function and a pupil aberration correction function during the secondary image-formation operation. Being shy of the lower limit of 0.25 to condition (3-4) will render the separation between the axial light beam and the off-axis light beam insufficient, and exceeding the upper limit of 0.75 will cause them to come too close to the image-formation positions, rendering it difficult to obtain any effect on correction of image-formation aberrations. Preferably, the relay optical system auxiliary lens should be a positive lens.

Regarding the above condition (3-4), the lower limit should preferably be set at 0.3, especially 0.4, and the upper limit should preferably be set at 0.6, especially 0.5.

The sixth finder optical system according to the third aspect of the invention is characterized in that in the fifth finder optical system, the relay optical system auxiliary lens has an aspheric surface applied to at least one surface.

The advantage of, and the requirement for, the above sixth finder optical system is now explained.

As the aspheric surface is applied to the relay optical system auxiliary lens, an easy-to-separate off-axis light beam is effectively controllable, adding up to growing effects on correction of off-axis aberrations.

The seventh finder optical system according to the third aspect of the invention is characterized in that in any one of the $1^{st}$ to the $6^{th}$ finder optical system, the RP lens group is composed of a cemented doublet wherein a negative lens and a positive lens are cemented together.

The advantage of, and the requirement for, the above $7^{th}$ finder optical system arrangement is now explained.

Constructing the RP lens group of a cemented doublet helps decrease the sensitivity to decentration, and works for correction of chromatic aberrations. This also help prevent the occurrence of higher-order aberrations with easy lens thickness control.

Any one of the above $1^{st}$ to $7^{th}$ finder optical systems could be used together with a focal plane plate located at the primary image-formation position into a single-lens reflex camera that enables a subject to be well viewed even with a small image pickup device.

In accordance with the third aspect of the invention as described above, it is possible to achieve a compact relay type finder optical system that is improved in refractive power symmetry and well corrected for aberrations. It is thus possible to provide a compact relay type finder optical system well compatible with a single-lens reflex camera using a relatively small image pickup device and a single-lens reflex camera incorporating it.

Next, reference is made to the fourth aspect of the invention.

The first embodiment of the fourth aspect of the invention is directed to an eyepiece optical system characterized by comprising, in order from a side of the image being viewed, a first lens having negative refracting power, a second lens having positive refracting power, a third lens having positive refracting power and a fourth lens having positive refracting power, and satisfying the following condition:

$$2.5 \leq f123/fA \leq 8 \quad (4\text{-}1)$$

where:

f123 is the composite focal length of the first lens, the second lens and the third lens, and fA is the focal length of the whole eyepiece optical system.

The advantage of, and the requirement for, the above first embodiment is now explained.

In this eyepiece optical system comprising the first to the fourth lens, there is a −+ sharing of power in order from the side of the image being viewed, so that the principal points are located on the pupil side. This allows the space between the image being viewed and the eyepiece optical system to become so narrow that the total length of the eyepiece optical system including the position of the image being viewed can be minimized.

To improve on the performance of the eyepiece optical system while enhancing this effect and beefing up its power, three positive lenses are located on the side of the negative lens facing the viewer to disperse the refraction of a light beam.

Condition (4-1) is provided to make the eyepiece optical system compact. As the lower limit of 2.5 to condition (4-1) is not reached, it causes the negative power to become weak or the power of the positive lenses to become too strong, resulting in a shift of the principal point positions toward the image side and contributing little to the decrease in the total length of the eyepiece optical system including the position of the image being viewed. This also works against correction of chromatic aberrations. As the upper limit of 8 is exceeded, on the other hand, it causes the negative power to become too strong, resulting in an increase in the outside diameter of the lens. This also works against correction of off-axis aberrations.

Regarding condition (4-1), the lower limit could be set at 3.5, especially 4.0, and the upper limit could be set at 6.5, especially 5.0.

The second embodiment of the fourth aspect of the invention is directed to an eyepiece optical system characterized by comprising, in order from a side of the image being viewed, a first lens having negative refracting power, a second lens having positive refracting power, a third lens having positive refracting power and a fourth lens having positive refracting power, and satisfying the following condition:

$$1 \leq f4/fA \leq 2 \quad (4\text{-}2)$$

where:
 f4 is the focal length of the fourth lens, and
 fA is the focal length of the eyepiece optical system.

The advantage of, and the requirement for, the above second embodiment is now explained.

In this eyepiece optical system comprising the first to the fourth lens, there is a −+ sharing of power in order from the image being viewed, so that the principal points are located on the pupil side. This allows the space between the image being viewed and the eyepiece optical system to become so narrow that the total length of the eyepiece optical system including the position of the image being viewed can be minimized.

To improve on the performance of the eyepiece optical system while enhancing this effect and beefing up its power, three positive lenses are located on the side of the negative lens facing the viewer to disperse the refraction of a light beam.

Condition (4-2) is provided to define the refracting power sharing of the fourth lens group. As the lower limit of 1 to condition (4-2) is not reached, a light beam passing through the third lens group becomes slender, and there is no or little separation of an axial light beam from an off-axis light beam, which renders correction of aberrations difficult. As the upper limit of 2 to condition (4-2) is exceeded, on the other hand, the outside diameter of the lens for getting hold of an eye relief is likely to become large. In addition, the positive power of the fourth lens becomes weak or the refracting powers of the second and third lenses become strong, working against correction of spherical aberrations.

Regarding condition (4-2), the lower limit could be set at 1.4, especially 1.5, and the upper limit could be set at 1.9, especially 1.8.

The third embodiment of the fourth aspect of the invention is directed to an eyepiece optical system characterized by comprising, in order from the image being viewed, a first lens having negative refracting power, a second lens having positive refracting power, a third lens having positive refracting power and a fourth lens having positive refracting power, and satisfying the following condition:

$$0.02 \leq d4/fA \leq 0.2 \quad (4\text{-}3)$$

where:
 d4 is the axial thickness of the fourth lens, and
 fA is the focal length of the eyepiece optical system.

The advantage of, and the requirement for, the above third embodiment is now explained.

In this eyepiece optical system comprising the first to the fourth lens, there is a −+ sharing of power in order from the image being viewed, so that the principal points are located on the pupil side. This allows the space between the image being viewed and the eyepiece optical system to become so narrow that the total length of the eyepiece optical system including the position of the image being viewed can be minimized.

To improve on the performance of the eyepiece optical system while enhancing this effect and beefing up its power, three positive lenses are located on the side of the negative lens facing the viewer to disperse the refraction of a light beam.

Condition (4-3) is provided to define the thickness of the fourth lens. If the lower limit of 0.02 to this condition is not reached, it will be difficult for the fourth lens to have sufficient power and the refracting powers of the second and third lenses will become strong, rendering correction of spherical aberrations difficult. As the upper limit of 0.2 to condition (4-3) is exceeded, it causes a light beam passing through the third lens group to become slender with the result that there is no or little separation of an axial light beam from an off-axis light beam, which renders correction of aberrations difficult. In addition, the total length of the eyepiece optical system becomes long.

Regarding condition (4-3), the lower limit could be set at 0.05, especially 0.09, and the upper limit could be set at 0.17, especially 0.15.

The fourth embodiment according to the fourth aspect of the invention is characterized in that in any one of the $1^{st}$ to the $3^{rd}$ embodiment, the image being viewed is an image or aerial image formed by an image-formation lens.

The advantage of, and the requirement for, the above fourth embodiment is now explained.

If the image being viewed is formed by the image-formation lens, the exit range of a light beam can then be defined by the exit pupil of the image-formation lens or the like. This helps prevent the peripheral portion of an image guided into the viewer's eyeball from becoming dark and cut off unnecessary light with the image-formation lens before the unnecessary light—responsible for flares—is directed into the eyepiece optical system. Thus, the outside diameter of the eyepiece optical system can be made compact while holding back the occurrence of flares.

The fifth embodiment according to the fourth aspect of the invention is directed to a relay type finder optical system comprising a relay optical system operable to re-form a primary image formed through a taking optical system and an eyepiece optical system operable to view an image re-formed through the relay optical system, characterized in that:

the eyepiece optical system comprises, in order from the relay optical system side, a first lens having negative refracting power, a second lens having positive refracting power, a third lens having positive refracting power and a fourth lens having positive refracting power.

The advantage of, and the requirement for, the above fifth embodiment is now explained.

Even when the primary image-formation plane formed by the taking optical system is small, the image formed through the taking optical system is re-formed through the relay optical system, whereby the space between the image being viewed and the eyepiece optical system can be made narrow. It is this possible to achieve a finder optical system with a wide angle of field.

In addition, the eyepiece optical system is configured such that a −+ sharing of power is provided as viewed from the relay optical system to locate the principal points on the pupil side. This enables the space between the re-formed image and the eyepiece optical system to be so narrower that the total length of the eyepiece optical system including the image position can be more reduced.

To improve on the performance of the eyepiece optical system while enhancing this effect and beefing up its power, and to get hold of an eye point while keeping the lens outside diameter compact, three positive lenses are located on the side of the negative lens facing the viewer to disperse the refraction of a light beam.

The sixth embodiment according to the fourth aspect of the invention is characterized in that the fifth embodiment satisfies the following condition:

$$17 \text{ mm} \leq fA \leq 40 \text{ mm} \tag{4-4}$$

where fA is the focal length of the eyepiece optical system.

The advantage of, and the requirement for, the above sixth embodiment is now explained.

Condition (4-4) is provided to define the focal length of the whole eyepiece optical system. If the lower limit of 17 mm to condition (4-4) is not reached, it will be difficult for the primary image-formation plane to have sufficient size while getting hold of an eye point, and aberrations will occur at the eyepiece optical system as well. If the upper limit of 40 mm to condition (4-4) is exceeded, on the other hand, it will be difficult to offer any sensible tradeoff between the sufficient angle of field and the compactness of the secondary image-formation plane.

Regarding condition (4-4), the lower limit could be set at 20 mm, especially 24 mm, and the upper limit could be set at 35 mm, especially 30 mm.

The seventh embodiment according to the fourth aspect of the invention is directed to a relay type finder optical system comprising a relay optical system operable to re-form a primary image formed through a taking optical system and an eyepiece optical system operable to view an image re-formed through the relay optical system, characterized in that:

any one of the $1^{st}$ to the $4^{th}$ embodiment is used as the eyepiece optical system.

The advantage of, and the requirement for, the above seventh embodiment is now explained.

If the eyepiece optical system according to any one of the $1^{st}$ to the $4^{th}$ embodiment is used for the relay type finder optical system, the image formed through the taking optical system is then re-formed by the relay optical system whereby the space between the image being viewed and the eyepiece optical system can be made narrow, even when the primary image-formation plane formed through the taking optical system is small. It is thus possible to achieve a finder optical system with a wide angle of field.

The eighth embodiment according to the fourth aspect of the invention is characterize in that in the relay type finder optical system according to any one of the $5^{th}$ to the $7^{th}$ embodiment, the fourth lens remains fixed, and the first lens, the second lens and the third lens are operable to move together in the optical axis direction, thereby implementing diopter control.

The advantage of, and the requirement for, the above $8^{th}$ embodiment is now explained.

If the first, the second and the third lens are operable to move together for diopter control of the eyepiece optical system, the refracting power of the moving group can then be held back to reduce changes of magnification and aberrations during the diopter control.

With this embodiment, the drive system is simpler in construction than that for driving the whole eyepiece optical system. In addition, a larger amount of movement is applied to the same diopter change as compared with the integral movement of the whole eyepiece optical system, making adjustment easier.

Because the fourth lens remains fixed, it is possible for the fourth lens to have a cover glass function for the viewer side, thereby dispensing with any cover glass.

In particular, this embodiment should preferably have satisfied the above condition (4-1). This works for balancing aberration fluctuations against the amount of movement during the diopter control.

The ninth embodiment according to the fourth aspect of the invention is characterized in that in the relay type finder optical system according to any one of the $1^{st}$ to the $4^{th}$ embodiment, the fourth lens remains fixed, and the first lens, the second lens and the third lens are operable to move together in the optical axis direction, thereby implementing diopter control.

The advantage of, and the requirement for, the above $9^{th}$ embodiment is the same as is the case with the $8^{th}$ embodiment.

The $10^{th}$ embodiment according to the fourth aspect of the invention is characterized in that in any one of the $1^{st}$ to $4^{th}$ embodiment and the $9^{th}$ embodiment, the first lens and the second lens are cemented together into a cemented doublet.

The $11^{th}$ embodiment according to the fourth aspect of the invention is characterized in that in any one of the $5^{th}$ to the $8^{th}$ embodiment, the first lens and the second lens are cemented together into a cemented doublet.

The advantages of, and the requirements for, the above $10^{th}$ and $11^{th}$ embodiments are now explained.

A light beam incident on the first lens group is flipped up by the divergence of the first lens. In the eyepiece optical system and the relay type finder optical system according to the invention, the off-axis light beam is refracted through the three positive lenses subsequent to the first lens. Here, as the space between the first lens and the second lens becomes wide, the off-axis light beam incident on the second, third and fourth lenses gains height, incurring an increase in the size of the eyepiece optical system and having considerable influences on off-axis aberrations and aberrations due to decentration.

Therefore, if the first lens and the second lens are cemented together into a cemented doublet, then the space between the first lens and the second lens can be minimized, contributing to decreasing the size of the eyepiece optical system and reducing its sensitivity to decentration.

The $12^{th}$ embodiment according to the fourth aspect of the invention is characterized in that the relay type finder optical system according to the $8^{th}$ embodiment satisfies the following conditions:

$$2.5 \leq f123/fA \leq 6.5 \tag{4-1}'$$

$$1.4 \leq ff/fA \leq 2 \tag{4-2}'$$

where:

f123 is the composite focal length of the first lens, the second lens and the third lens, f4 is the focal length of the fourth lens, and fA is the focal length of the eyepiece optical system.

The $13^{th}$ embodiment according to the fourth aspect of the invention is characterized in that the eyepiece optical system according to the $9^{th}$ embodiment satisfies the following conditions:

$$2.5 \leq f123/fA \leq 6.5 \tag{4-1}'$$

$$1.4 \leq f4/fA \leq 2 \tag{4-2}'$$

where:

f123 is the composite focal length of the first lens, the second lens and the third lens, f4 is the focal length of the fourth lens, and fA is the focal length of the eyepiece optical system.

The advantages of, and the requirements for, the above 12$^{th}$ and 13$^{th}$ embodiments are now explained.

With these embodiments, it is possible to easily obtain a balance between reducing the changes of magnification during the diopter control and obtaining a long eye point over a wide angle-of-field range. In addition, refracting power balances and aberration balances are improved, too.

In accordance with the fourth aspect of the invention, it is possible to attain an eyepiece optical system that has a relatively wide field, a long eye relief from an eyepiece lens to an eye point and a compact total length including the position of the image being viewed, which is formed by an image-formation lens.

It is also possible to have an eyepiece optical system that is compatible with a single-lens reflex camera using a relatively small image pickup device and suited for use with a compact relay type finder optical system, and a finder optical system for single-lens reflex cameras, which incorporates it.

Next, reference is made to the fifth aspect of the invention.

The first embodiment according to the fifth aspect of the invention is directed to a relay type finder optical system comprising a relay optical system operable to re-form a subject image at a secondary image-formation position wherein the subject image is a primary image formed at a primary image-formation position through an objective optical system and an eyepiece optical system operable to view an image re-formed via the relay optical system, characterized in that:

the relay type finder optical system comprises at least three reflecting surfaces between the primary image-formation position and the secondary image-formation position, and of the at least three reflecting surfaces, two reflecting surfaces lying side by side on an optical axis in an optical path through the relay optical system are internal reflecting surfaces of a one-piece prism P1, wherein two such reflecting surfaces are total-reflection surfaces.

The advantage of, and the requirement for, the above first embodiment arrangement is now explained.

In a relay type finder optical system, given paraxial distances must be between the primary image-formation position and the principal points of a relay optical system and between the principal points of the relay optical system and the secondary image-formation position. When a compact layout is figured out, one possible option is to bend an optical path between the primary image-formation position and the secondary image-formation position.

In the invention, at least three reflecting surfaces are located between the primary image-formation position and the secondary image-formation position, whereby the layout for the relay optical system can be kept compact.

In this case, however, care must be taken of a decrease in the quantity of light at the reflecting surfaces and precise location of the angles between the reflecting surfaces.

In the invention, two out of the reflecting surfaces located between the primary image-formation position and the secondary image-formation position are defined by internal surfaces of a one-piece prism, thereby getting around angle errors at the time of assembling. Here, if two such internal reflecting surfaces are defined by total-reflection surfaces, the decrease in the quantity of light can then be held back.

Preferably, five reflecting surfaces should be located on the viewer side with respect to the primary image-formation position, because a reasonable tradeoff is easily achievable between compactness and getting hold of light quantity.

The second embodiment according to the fifth aspect of the invention is directed to a relay type finder optical system comprising a relay optical system operable to re-form a subject image at a secondary image-formation position wherein the subject image is a primary image formed at a primary image-formation position through an objective optical system and an eyepiece optical system operable to view an image re-formed via the relay optical system, characterized in that:

the relay type finder optical system comprises at least three reflecting surfaces between the primary image-formation position and the secondary image-formation position, and of the at least three reflecting surfaces, two reflecting surfaces lying side by side on an optical axis in an optical path through the relay optical system are internal reflecting surfaces of a one-piece prism P1, wherein two such reflecting surfaces are total-reflection surfaces, and the angle of incidence of the optical axis on two such internal reflecting surfaces is greater than 45°.

The advantage of, and the requirement for, the above second embodiment arrangement is now explained.

In a relay type finder optical system, given paraxial distances must be between the primary image-formation position and the principal points of a relay optical system and between the principal points of the relay optical system and the secondary image-formation position. When a compact layout is figured out, one possible option is to bend an optical path between the primary image-formation position and the secondary image-formation position.

In the invention, at least three reflecting surfaces are located between the primary image-formation position and the secondary image-formation position, whereby the layout for the relay optical system can be kept compact.

In this case, however, care must be taken of a decrease in the quantity of light at the reflecting surfaces and precise location of the angles between the reflecting surfaces.

In the invention, two of the reflecting surfaces located between the primary image-formation position and the secondary image-formation position are defined by internal surfaces of a one-piece prism, thereby getting around angle errors at the time of assembling. Here, if the angle of incidence of the optical axis on two such internal reflecting surfaces is set at greater than 45°, the decrease in the quantity of light can then be held back.

Preferably, five reflecting surfaces should be located on the viewer side with respect to the primary image-formation position, because a reasonable tradeoff is easily achievable between compactness and getting hold of light quantity.

The third embodiment according to the fifth aspect of the invention is characterized in that in the 1$^{st}$ or the 2$^{nd}$ embodiment, the number of reflecting surfaces between the objective optical system and the primary image-formation position is an even number, the total of reflecting surfaces located between the subject image formed at the primary image-formation position and the image re-formed at the secondary image-formation position is five, a positive lens group RL comprising at least one positive lens is located between the primary image-formation position and the secondary image-formation position, two or more out of the five reflecting surfaces are located on the side of the positive lens group RL facing a primary image-formation plane, two or more out of the five reflecting surfaces are located on the side of the positive lens group RL facing a secondary image-formation plane, the prism P1 comprises a set PM of back-to-back two reflecting surfaces in the five reflecting surfaces, and one out of the five reflecting surfaces is located between the positive lens group RL and the set PM of two reflecting surfaces.

The advantage of, and the requirement for, the above third embodiment arrangement is now explained.

With the relay type finder optical system including an objective optical system, an even number of reflections could be implemented to obtain an erected image.

If five reflecting surfaces are located between the primary image-formation position and the secondary image-formation position and, at the same time, two or more reflecting surfaces are located on each side of the positive lens group RL that forms the whole or a part of the relay optical system, it is then possible to attain a decreased total-length, compact layout including the eyepiece optical system.

Here, if one reflecting surface is located between the set PM of two reflecting surfaces in the prism P1 and the positive lens group RL, it is then possible to attain a more compact layout.

The prism P1 could be such that it has only one set PM of two internal reflecting surfaces or, alternatively, it could have one set PM of two internal reflecting surfaces plus three of the aforesaid reflecting surfaces.

Preferably for the purpose of improving on the quality of the image being viewed, the positive lens group RL should have at least one positive lens, at least one negative lens and at least one positive lens as viewed from the primary image-formation plane side.

The fourth embodiment according to the fifth aspect of the invention is characterized in that in any one of the $1^{st}$ to the $3^{rd}$ embodiment, the total of reflecting surfaces located between the subject image formed at the primary image-formation position and the image re-formed at the secondary image-formation position is five, a positive lens group RL comprising at least one positive lens is located between the primary image-formation position and the secondary image-formation position, two or more out of the five reflecting surfaces are located on the side of the positive lens group RL facing a primary image-formation plane, two or more out of the five reflecting surfaces are located on the side of the positive lens group RL facing a secondary image-formation plane, the prism P1 comprises a set PM of back-to-back two reflecting surfaces in the five reflecting surfaces, one out of the five reflecting surfaces is located between the positive lens group RL and the set PM of two reflecting surfaces, and a reflecting surface of the two reflecting surfaces with the positive lens group RL intervened, wherein said reflecting surface faces away a prism P1 side, is operable to reflect an optical axis at an acute angle and at least one positive lens SR is located between the two or more reflecting surfaces faces away a positive lens group RL side on which the prism P1 is located.

The advantage of, and the requirement for, the above fourth embodiment arrangement is now explained.

If five reflecting surfaces are located between the primary image-formation position and the secondary image-formation position and, at the same time, two or more reflecting surfaces are located on each side of the positive lens group RL that forms the whole or a part of the relay optical system, it is then possible to attain a decreased total-length, compact layout including the eyepiece optical system.

Here, if one reflecting surface is located between the set PM of two reflecting surfaces in the prism P1 and the positive lens group RL, it is then possible to attain a more compact layout.

Further, if at least one of the two reflecting surfaces with the positive lens group RL intervened is operable to reflect an optical axis at an acute angle, it is then possible to attain a more compact layout. In this arrangement, that surface cannot be configured into a total-reflection surface. However, because the positive lens SR can be positioned between the two or more reflecting surfaces including an acute reflecting surface, the image-formation capability and total length of the relay optical system can be well adjusted. If a part of the condenser function is given to that positive lens SR, the whole finder can be kept compact with high performance.

The prism P1 could be such that it has only one set PM of two internal reflecting surfaces or, alternatively, it could have one set PM of two internal reflecting surfaces plus three of the aforesaid reflecting surfaces.

Preferably for the purpose of improving on the quality of the image being viewed, the positive lens group. RL should have at least one positive lens, at least one negative lens and at least one positive lens as viewed from the primary image-formation plane side.

The fifth embodiment according to the fifth aspect of the invention is characterized in that in any one of the $1^{st}$ to the $4^{th}$ embodiment, the prism P1 is located on the side of the positive lens group RL facing the primary image-formation plane.

The advantage of, and the requirement for, the above $5^{th}$ embodiment arrangement is now explained.

With that arrangement, the relay type finder optical system is easily configured such that its size does not grow large toward the subject side (that faces away the viewer side). It is thus easy to set up a generally compact single-lens reflex camera or a single-lens reflex camera that provides no or little restriction on the objective lens to be used.

The sixth embodiment according to the fifth aspect of the invention is characterized in that the optical function surfaces of the prism P1 are each composed of a plane.

The advantage of, and the requirement for, the above $6^{th}$ embodiment arrangement is now explained. With that arrangement, it is possible to improve on the productivity of the prism P1 and its ability to be built in a camera body.

The seventh embodiment according to the fifth aspect of the invention is characterized in that the prism P1 has optical power.

The advantage of, and the requirement for, the above $7^{th}$ embodiment arrangement is now explained.

If optical power is given to the prism P1, it is then easy to set up a finder system that is of higher performance, composed of fewer lenses or of more compact size. If power is given to the prism P1 at a position near to the positive lens group RL, it then contributes to the performance of the relay optical system, and if power is given to the prism P1 at a position near to the primary or secondary image-formation plane, it then contributes to a condenser function. The power could be given to the entrance or exit surface in the form of a lens surface or the reflecting surface. Note here that when the power is imparted to the reflecting surface, it is preferable to apply a rotationally asymmetric lens function surface to at least another surface.

The eighth embodiment according to the fifth aspect of the invention is characterized in that in any one of the $1^{st}$ to the $5^{th}$ embodiment, an optical axis exiting from the prism P1 is more inclined toward the subject side than an optical axis incident on the prism P1.

The advantage of the above 8th embodiment arrangement is that it works for compactness.

The ninth embodiment according to the fifth aspect of the invention is characterized in that in any one of the 1st to the 5th embodiment, on a side of the primary image-formation position on which light rays are incident, there is located one optical path splitter reflecting surface operable to reflect an optical axis, the reflecting surfaces located between the primary image-formation position and the second image-formation position are defined by five reflecting surfaces including, in order of a reflection optical path, a first reflecting surface, a second reflecting surface, a third reflecting surface, a fourth reflecting surface and a fifth reflecting surface, and when the optical axis of the relay type finder optical system is projected on a plane including optical axes incident on and reflected at the optical path splitter reflecting surface with the direction of reflection of light at the optical path splitter reflecting surface set as a counterclockwise direction, the first reflecting surface reflects an optical axis in the counterclockwise direction, an optical axis is bent at the second reflecting surface, the third reflecting surface and the fourth reflecting surface in a clockwise direction, and an optical axis is bent at the fifth reflecting surface in the counterclockwise direction.

The advantage of, and the requirement for, the above 9th embodiment arrangement is now explained. With that arrangement, the optical path from the primary image-formation position up to the secondary image-formation position can be compactly folded back.

The 10th embodiment according to the fifth aspect of the invention is directed to a single-lens reflex camera characterized by comprising the relay type finder optical system according to any one of the 1st to the 9th embodiment.

The advantage of, and the requirement for, the above 10th embodiment arrangement is now explained. By relying upon the relay type finder optical system of the invention, the optical path through the finder optical system can be turned back with fewer reflecting surfaces. Thus, a single-lens reflex camera that is compact yet reduced in terms of light quantity drops can be set up albeit having a secondary image-formation type finder. Further, a single-lens reflex camera having a high finder magnification can be built up.

In accordance with the fifth aspect of the invention, it is possible to achieve a relay type finder optical system wherein reflecting surfaces are located before and after a lens element in a relay optical system so that it can be kept compact in both the height direction of a finder optical system and the optical axis direction of an objective optical system while decreases in the quantity of light are held back. It is also possible to provide a relay type finder optical system that is compatible even with a single-lens reflex camera using a relatively small image pickup device, and compact with a little light quantity drop as well, and a single-lens reflex camera incorporating it.

Specific embodiments are given of the inventive optical system, finder optical system, relay type finder optical system, eyepiece optical system and single-lens reflex camera in this order.

The first aspect of the invention is now explained with reference to the embodiments of the optical system.

First of all, examples of how to shift the whole relay lens RL for anti-shake purposes are explained.

Figure 3:
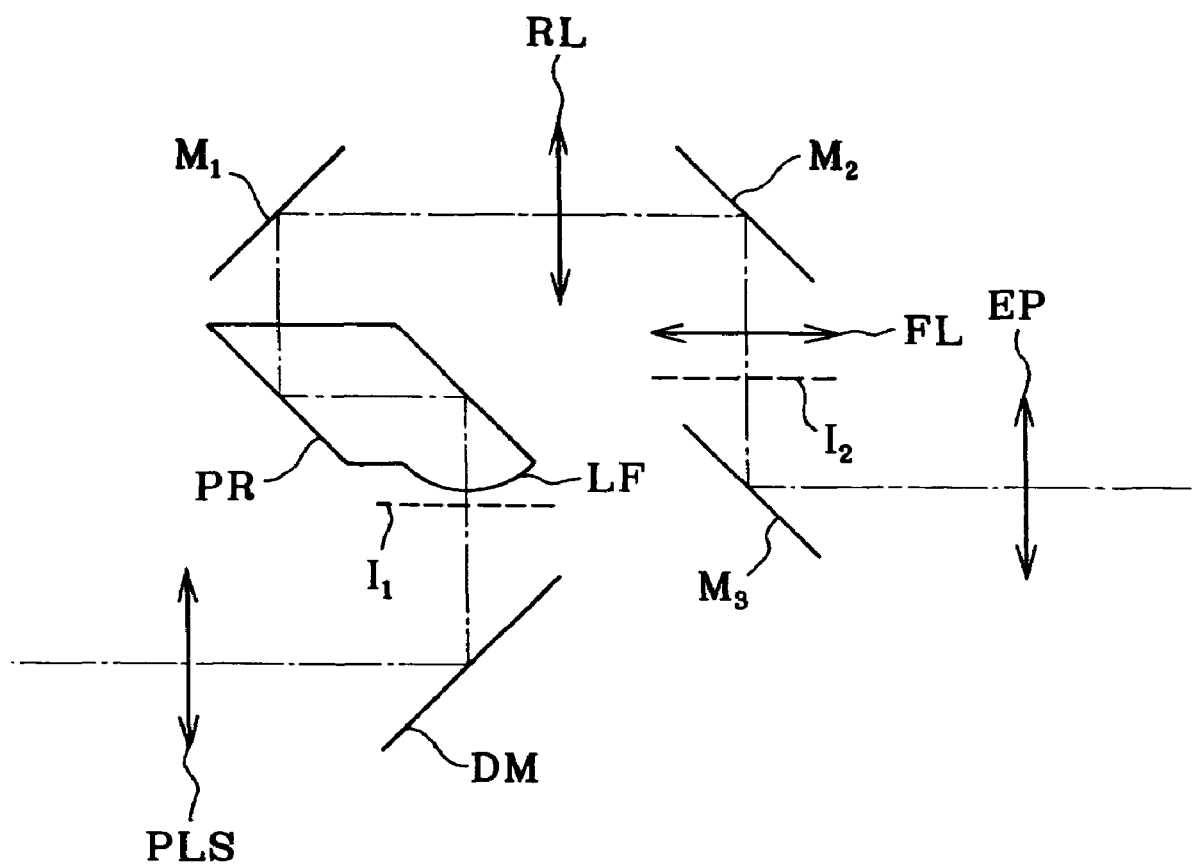
FIG. 3 is illustrative of a modification to that layout.
Figure 4:
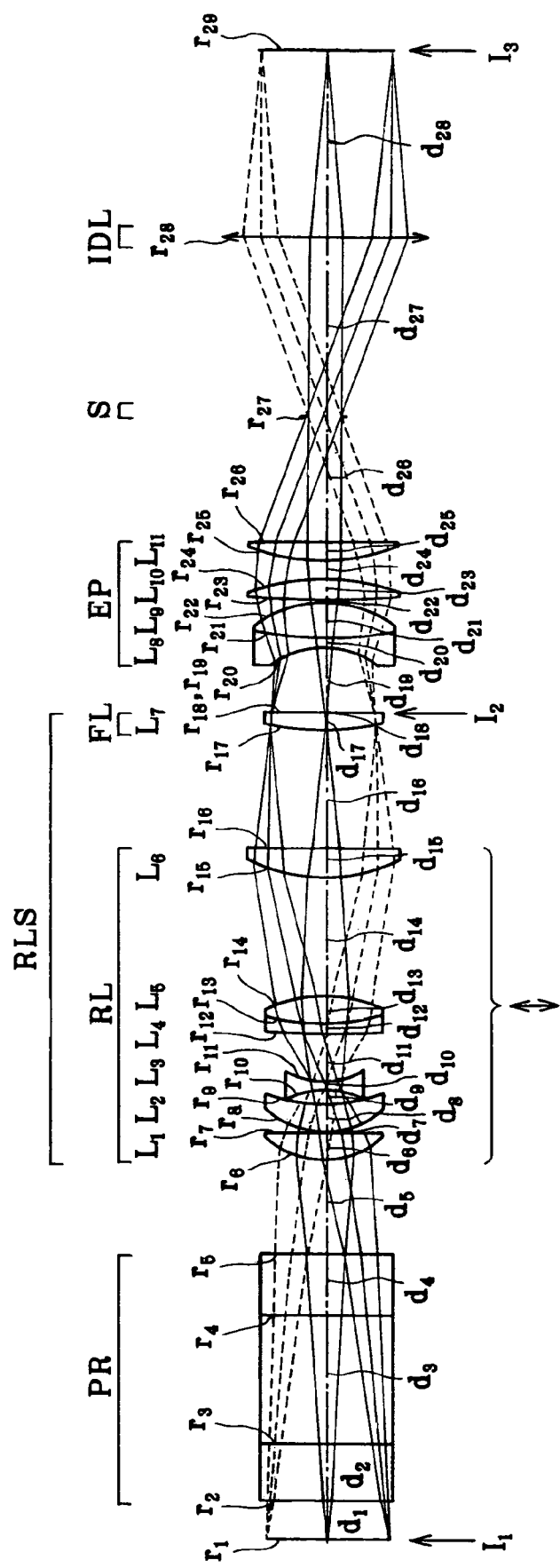
FIG. 4 is illustrative of the lenses to be shifted for anti-shake in the finder optical system of Embodiment 1.
Figure 5:
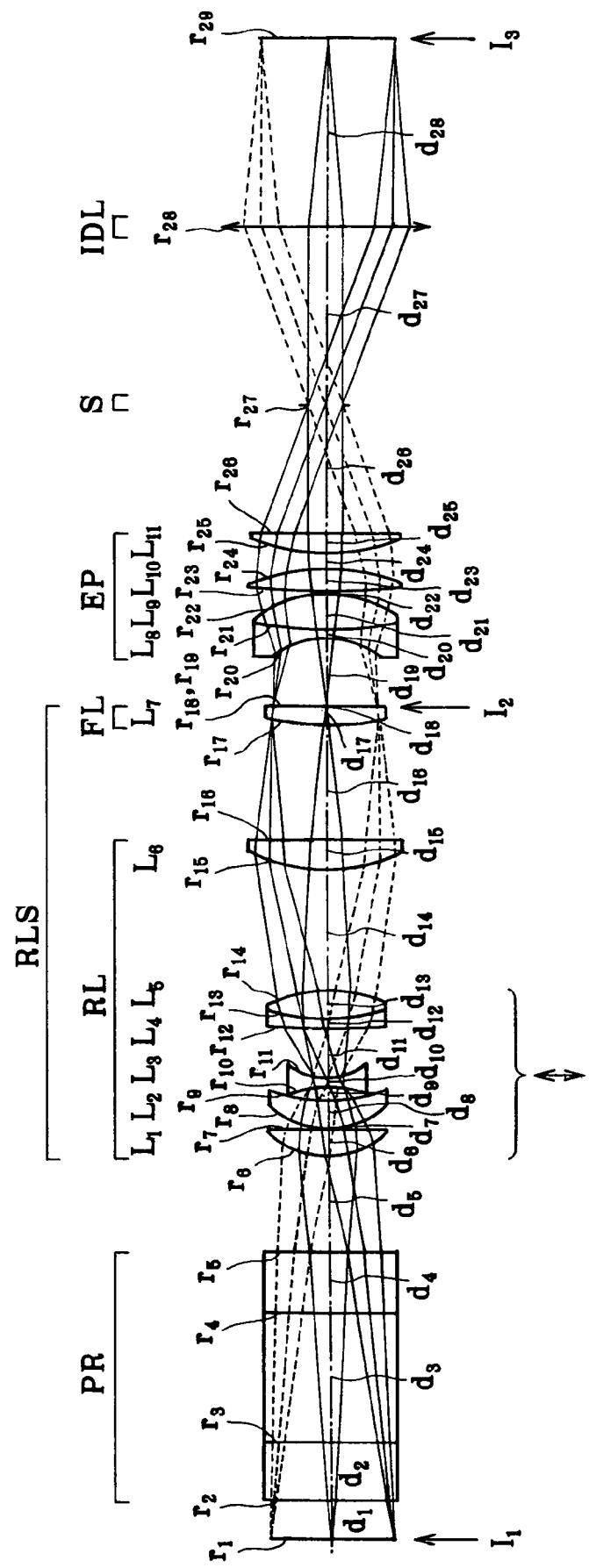
FIG. 5 is illustrative of the lenses to be shifted for anti-shake in the finder optical system of Embodiment 2.

FIG. 1 is an optical path diagram for the finder optical system common to Embodiments 1-5, from which a taking optical system and an optical path splitter means for splitting an optical path into the finder optical system are removed (in this regard, see FIG. 3).

In this finder optical system, a primary image formed through the taking optical system (not shown) is formed on a primary image-formation plane $I_1$, then re-formed as a secondary image on a secondary image-formation plane $I_2$ via a relay optical system RLS, and viewed as a virtual image through an eyepiece lens EP. In the optical path diagram of FIG. 1, that virtual image is formed as a real image on an image plane $I_3$ through an ideal lens IDL.

In that finder optical system, the relay optical system RLS is made up or six groups or seven lenses, specifically, a positive meniscus lens $L_1$ convex on its object side, a positive meniscus lens $L_2$ convex on its object side, a double-concave negative lens $L_3$, a cemented doublet consisting of a negative meniscus lens $L_4$ convex on its object side and a double-convex positive lens $L_5$, a double-convex positive lens $L_6$ and a plano-convex positive lens $L_7$, wherein a relay lens RL is built up of five groups or six lenses, i.e., lenses $L_1$ to $L_6$, and the plano-convex positive lens $L_7$ is a field lens. The secondary image-formation plane $I_2$ is in alignment with the image-side plane position of the plano-convex positive lens $L_7$. Note here that the object-side surface of the positive meniscus lens $L_1$, both surfaces of the double-convex positive lens $L_6$ and the object-side surface of the plano-convex positive lens $L_7$ are each defined by an aspheric surface. The eyepiece lens EP is made up of three groups or four lenses, specifically, a cemented doublet consisting of a double-concave negative lens $L_8$ and a double-convex positive lens $L_9$, a double-convex positive lens $L_{10}$ and a double-convex positive lens $L_{11}$. In FIG. 1, note that a plane-parallel plate group located between the primary image-formation plane $I_1$ and the relay optical system RLS, for instance, is an optical path bending prism, and a stop S is located at an eye point position between the eyepiece lens EP and the ideal lens IDL.

Lens data on this finder optical system will be given later.

Figure 2:
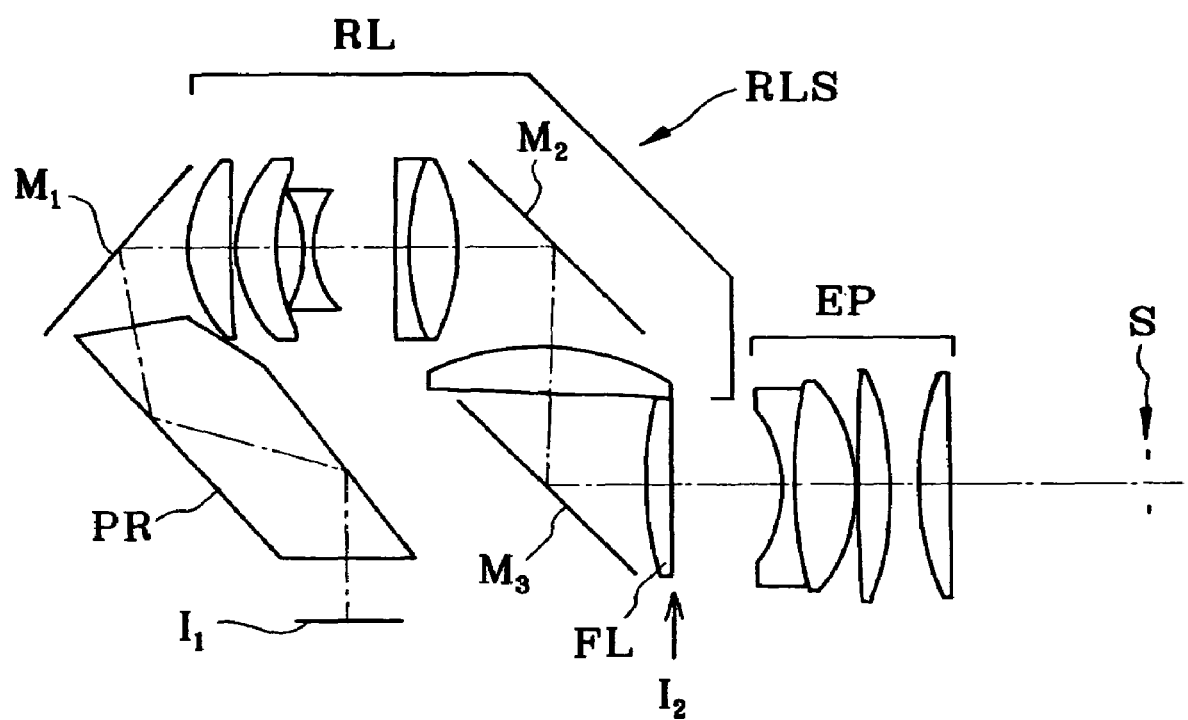
FIG. 2 is illustrative of one exemplary practical layout of the finder optical system of FIG. 1.

FIG. 2 is illustrative of one exemplary actual layout. In this finder optical system, the optical path is bent by an optical path bending prism PR and mirrors $M_1$, $M_2$ and $M_3$ to keep it compact. These are indicated in a straight line optical path diagram form in FIG. 1.

In addition to the modification of FIG. 2, there are some possible modifications to FIG. 1. For instance or preferably, if the field lens FL is spaced far away from the secondary image-formation plane $I_2$, dust deposited onto a focusing screen, a field frame or the like is much less visible. Alternatively, as shown in FIG. 3, the entrance or exit surface of the optical path bending prism PR could be configured as a lens LF. In FIG. 3, the entrance surface of the optical path bending prism PR is configured as a convex surface that has a field lens function for the primary image-formation plane $I_1$. Note here that PLS stands for a taking optical system. This taking optical system PLS comprises an optical path splitter means DM for splitting the optical path into the finder optical system, and is operable to form a primary image of the subject on the primary image-formation plane $I_1$ via the optical path splitter means DM.

In the finder optical system of FIG. 1, some lenses $L_8$, $L_9$ and $L_{10}$ of the lenses forming the eyepiece lens EP are moved in the optical axis direction to implement diopter control. With a position of −1 diopter set as a reference, a 2.18 mm movement of $L_8$, $L_9$ and $L_{10}$ toward the secondary image-formation plane $I_2$ results in −3 diopter, and a 2.16 mm movement of $L_8$, $L_9$ and $L_{10}$ in such a way to face away from the secondary image-formation plane $I_2$ results in +1 diopter.

Figure 9:
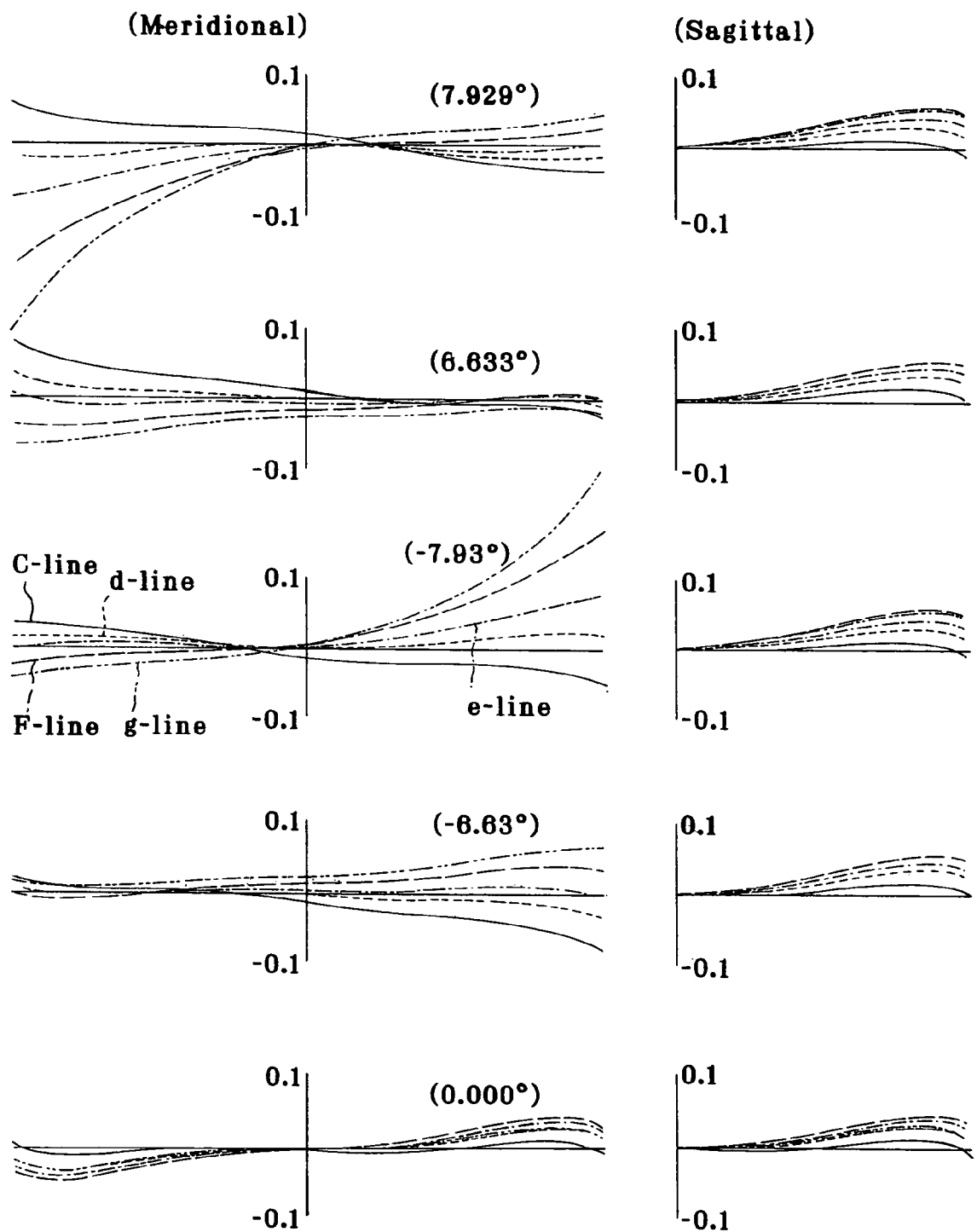
FIG. 9 is a collection of transverse aberration diagrams in a blur-free state for the finder optical system of FIG. 1.

FIG. 9 is a collection of transverse aberration diagrams for a shake-free state on a real image plane $I_3$ formed by the ideal lens IDL. In this aberration diagrams, angles at the center indicate angles of view in the vertical direction; FIG. 9 is indicative of transverse aberrations at those angles in the meridional and sagittal directions. The same shall apply hereinafter.

Next, consider the case where the finder optical system of FIG. 1 is inclined with the position of the primary image-formation position $I_1$ shifted 0.5 mm down. Then, the position of the secondary image-formation plane $I_2$ is shifted 1.43 mm up. Here, as the relay lens RL is shifted 0.23 mm down in FIG. 1, it allows an image misalignment on the secondary image-formation plane $I_2$ to be so corrected that a shake-free image can be viewed.

Figure 10:
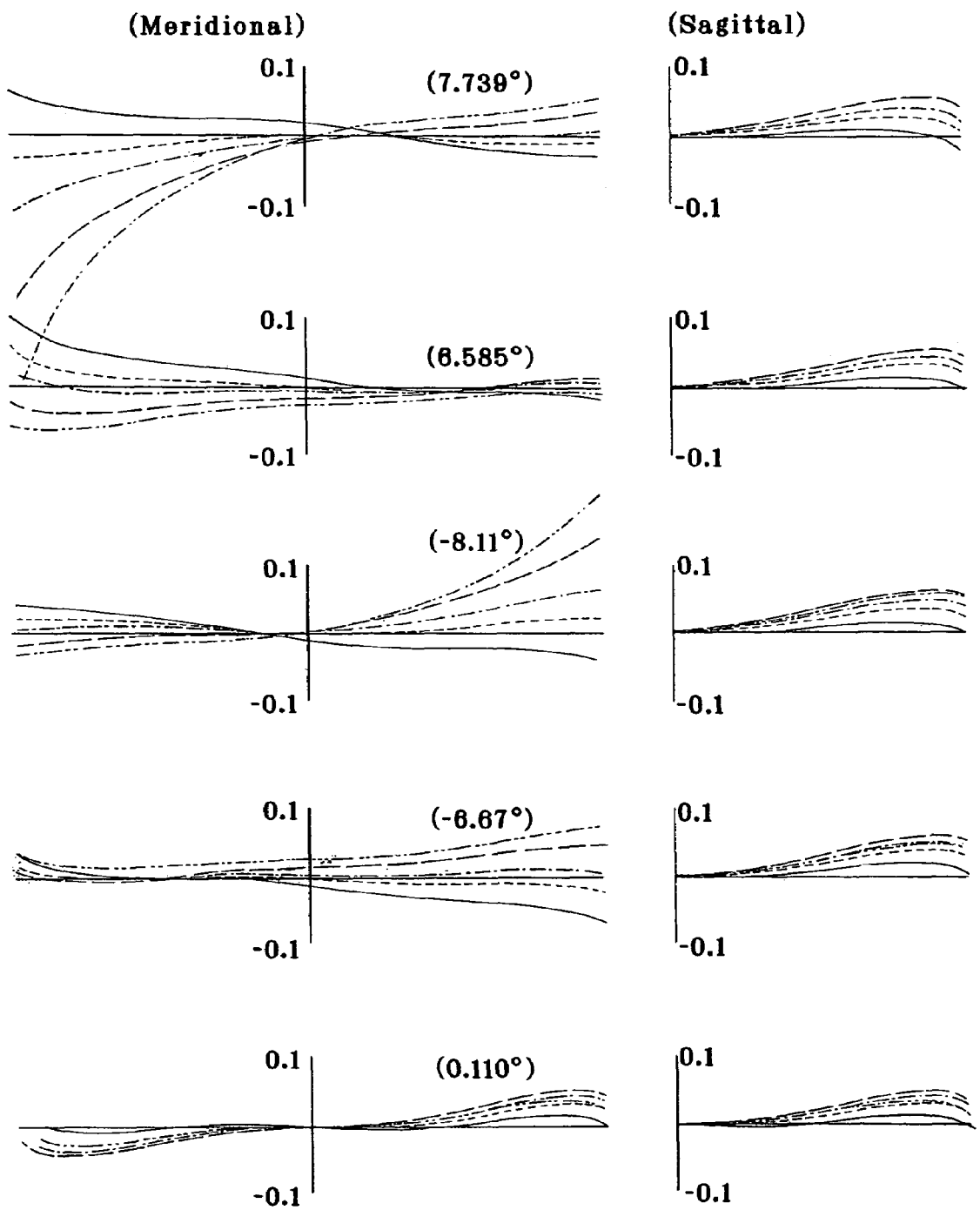
FIG. 10 is a collection of transverse aberration diagrams after anti-shake operation by Embodiment 1.

FIG. 10 is illustrative of transverse aberrations after anti-shake operation in Embodiment 1. From a comparison with FIG. 9, it is seen that underperformance due to anti-shake operation is reduced.

As in this embodiment 1, it is preferable to isolate the diopter control lens (some lenses $L_8$, $L_9$ and $L_{10}$ of the lenses forming the eyepiece lens EP) from the anti-shake lens (RL), because it is easy to get hold of precision of both and locate actuators for both.

Embodiment 2, i.e., an example of how to shift lenses $L_1$ to $L_5$ forming the relay lens RL for anti-shake purposes is now explained.

Consider here the case where the optical system of FIG. 1 is inclined with the position of the primary image-formation plane $I_1$ shifted 0.5 mm down. Then, the position of the secondary image-formation plane $I_2$ is shifted 0.43 mm up. Here, as lenses $L_1$ to $L_5$ forming the relay lens RL are shifted 0.32 mm down in FIG. 1, it allows an image misalignment on the secondary image-formation plane $I_2$ to be so corrected that a shake-free image can be viewed.

Figure 11:
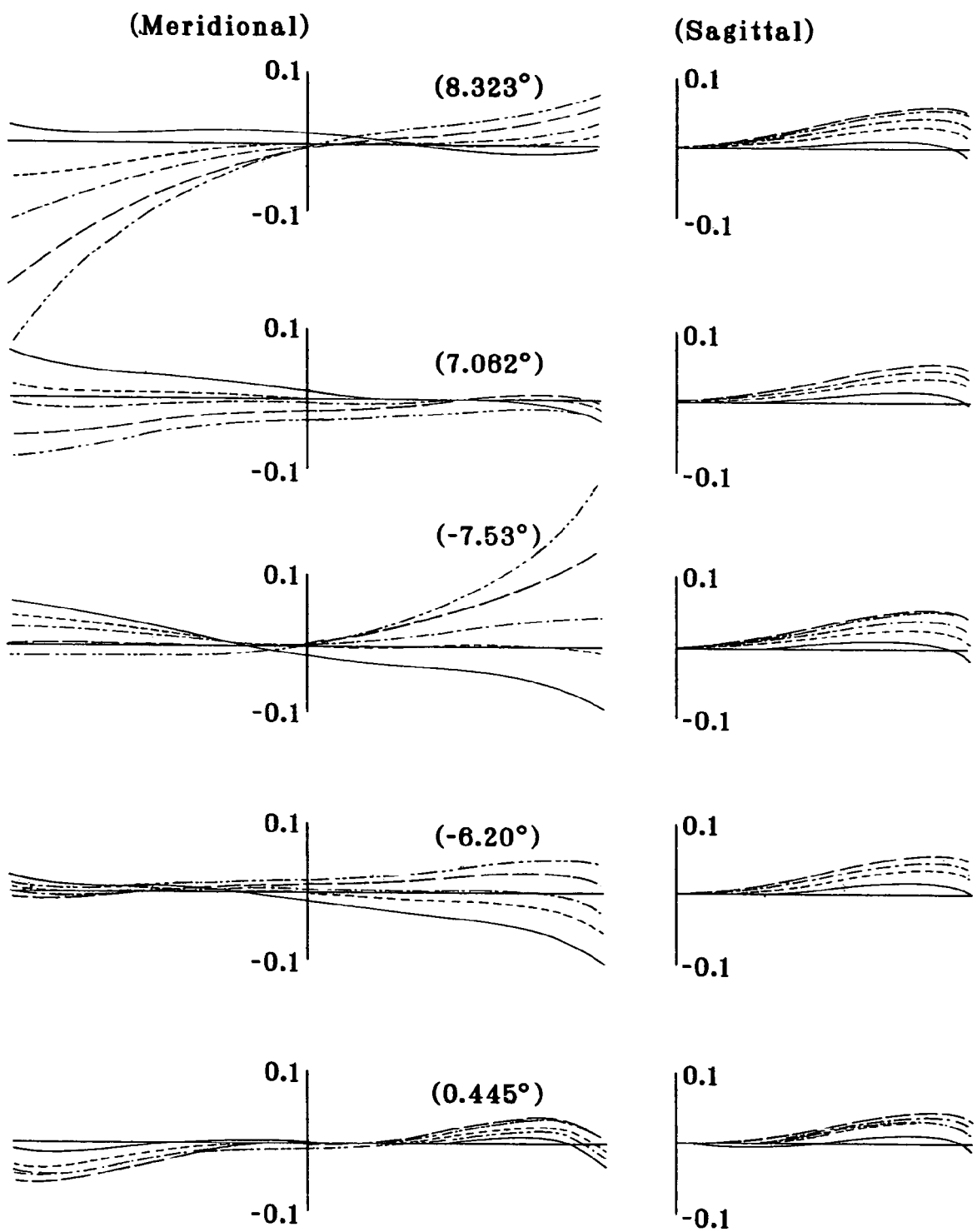
FIG. 11 is a collection of transverse aberration diagrams after anti-shake operation by Embodiment 2.

FIG. 11 is illustrative of transverse aberrations after anti-shake operation in Embodiment 2. From a comparison with FIG. 9, it is seen that underperformance due to anti-shake operation is reduced.

In this embodiment, the anti-shake operation is implemented with the lenses $L_1$ to $L_5$ other than the lens $L_7$ that is the field lens and the lens $L_6$ that has a role analogous to the field lens; the effective diameter and weight of the anti-shake group can be reduced.

It is preferable to shift the optical system including the pupil (that is formed near the lens $L_3$) for anti-shake purposes as in this embodiment, because the effective diameter of the optical system near the pupil and the weight of the anti-shake group can be reduced to lessen loads on an actuator for shifting the anti-shake group.

Note here that this embodiment could be modified such that another field lens is added on the primary image-formation plane $I_1$ side with respect to the anti-shake group so as to obtain a further reduction in the effective diameter of the anti-shake group. The same shall apply to the following embodiments.

Figure 6:
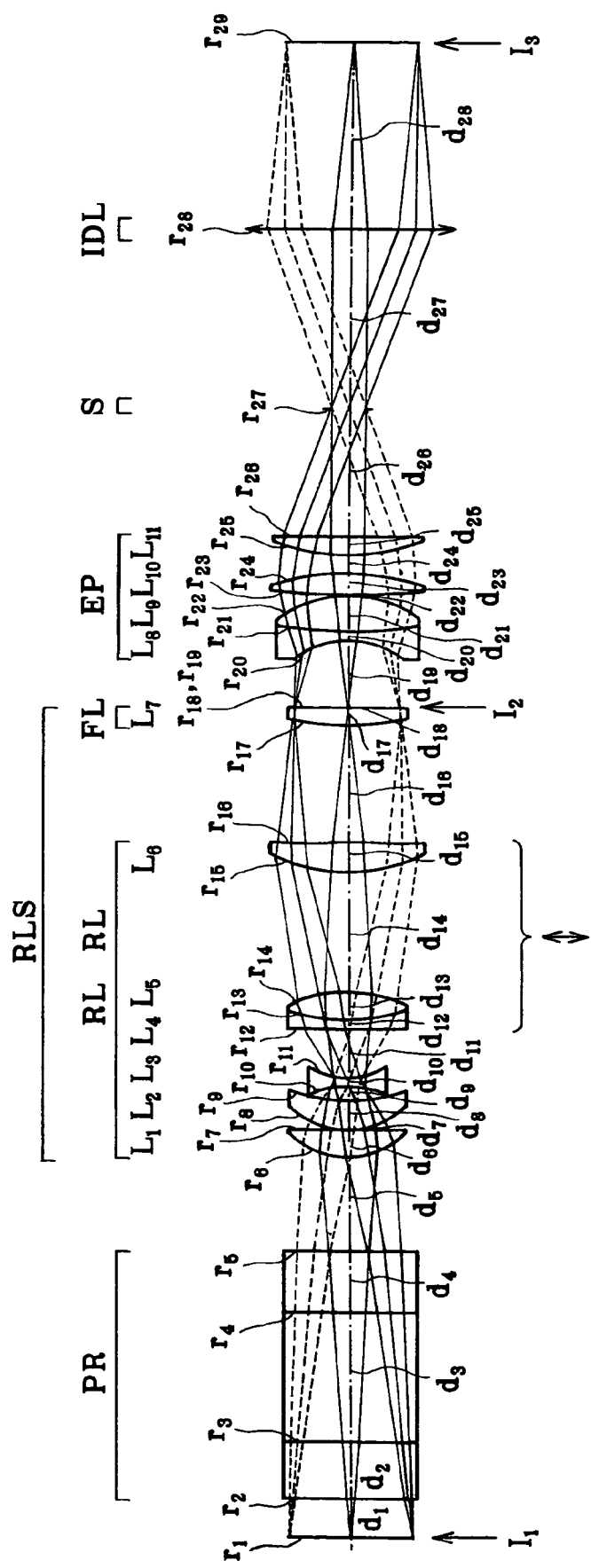
FIG. 6 is illustrative of the lenses to be shifted for anti-shake in the finder optical system of Embodiment 3.

Embodiment 3, i.e., an example of how to shift lenses $L_4$ to $L_6$ forming the relay lens RL for anti-shake purposes as shown in FIG. 6 is now explained.

Consider here the case where the optical system of FIG. 1 is inclined with the position of the primary image-formation plane $I_1$ shifted 0.5 mm down. Then, the position of the secondary image-formation plane $I_2$ is shifted 0.43 mm up. Here, as lenses $L_4$ to $L_6$ forming the relay lens RL are shifted 0.21 mm down in FIG. 1, it allows an image misalignment on the secondary image-formation plane $I_2$ to be so corrected that a shake-free image can be viewed.

Figure 12:
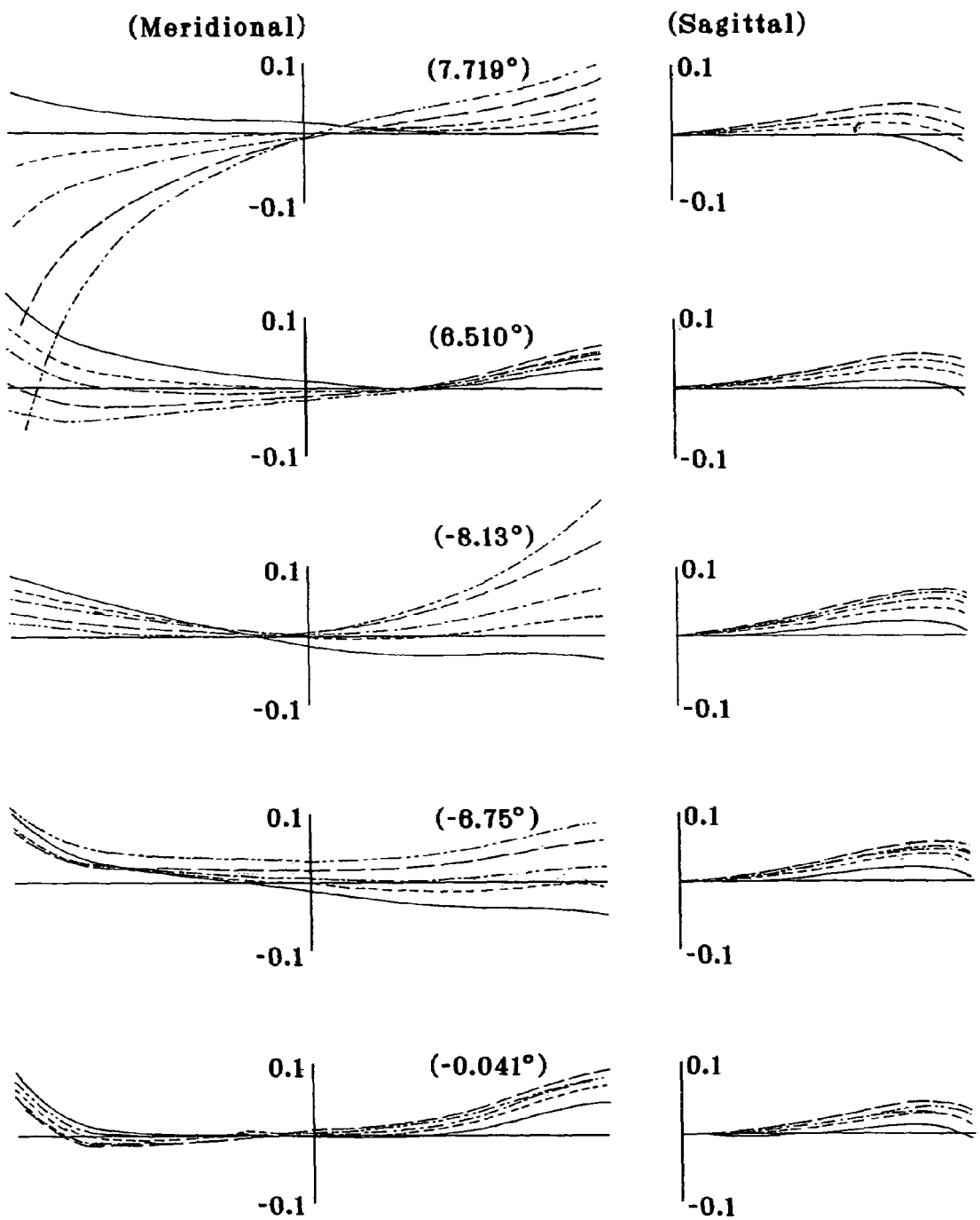
FIG. 12 is a collection of transverse aberration diagrams after anti-shake operation by Embodiment 3.

FIG. 12 is illustrative of transverse aberrations after anti-shake operation in Embodiment 3. From a comparison with FIG. 9, it is seen that underperformance due to anti-shake operation is reduced.

A comparison of Embodiment 3 with 2 teaches that the transverse magnification $\beta_a$ of the anti-shake group plunges from 1.82 down to 1.04, but the transverse magnification $\beta_b$ of the relay lens group on the image side with respect to the anti-shake group climbs from 0.47 up to 0.98. As a result, the anti-shake sensitivity jumps from 1.33 up to 2.0.

Figure 7:
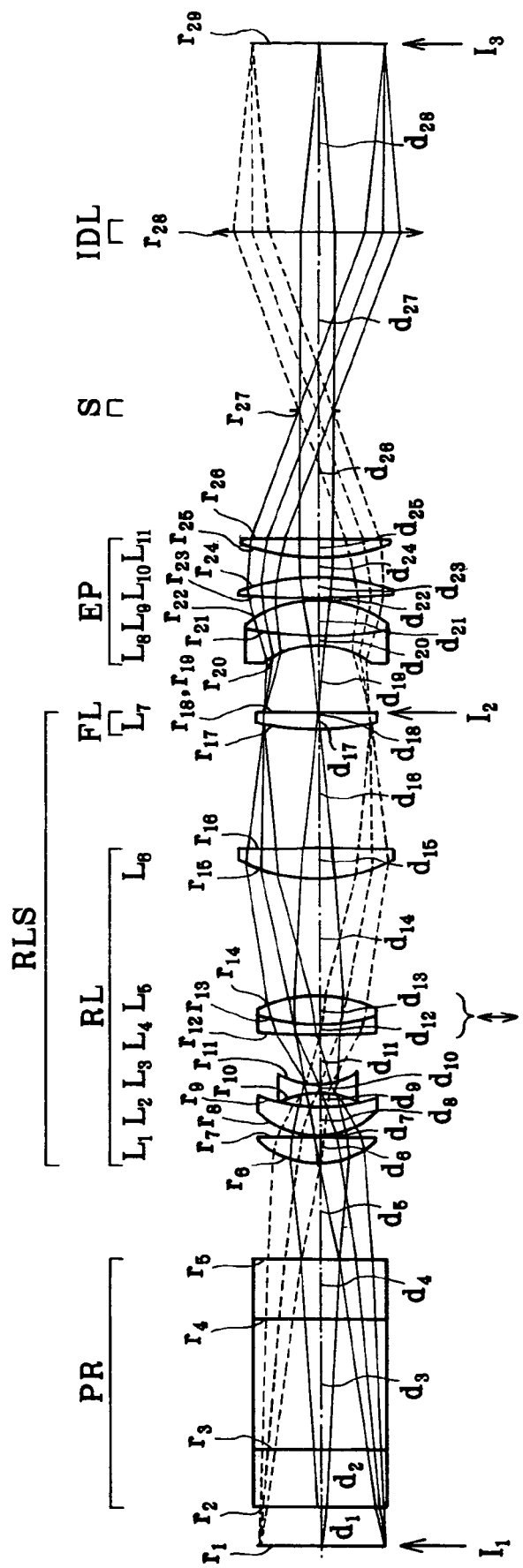
FIG. 7 is illustrative of the lenses to be shifted for anti-shake in the finder optical system of Embodiment 4.

Embodiment 4, i.e., an example of how to shift lenses $L_4$ to $L_5$ forming the relay lens RL for anti-shake purposes as shown in FIG. 7 is now explained.

Consider here the case where the optical system of FIG. 1 is inclined with the position of the primary image-formation plane $I_1$ shifted 0.5 mm down. Then, the position of the secondary image-formation plane $I_2$ is shifted 0.43 mm up. Here, as a cemented doublet composed of lenses $L_4$ to $L_5$ forming the relay lens RL are shifted 0.29 mm down in FIG. 1, it allows an image misalignment on the secondary image-formation plane $I_2$ to be so corrected that a shake-free image can be viewed.

Figure 13:
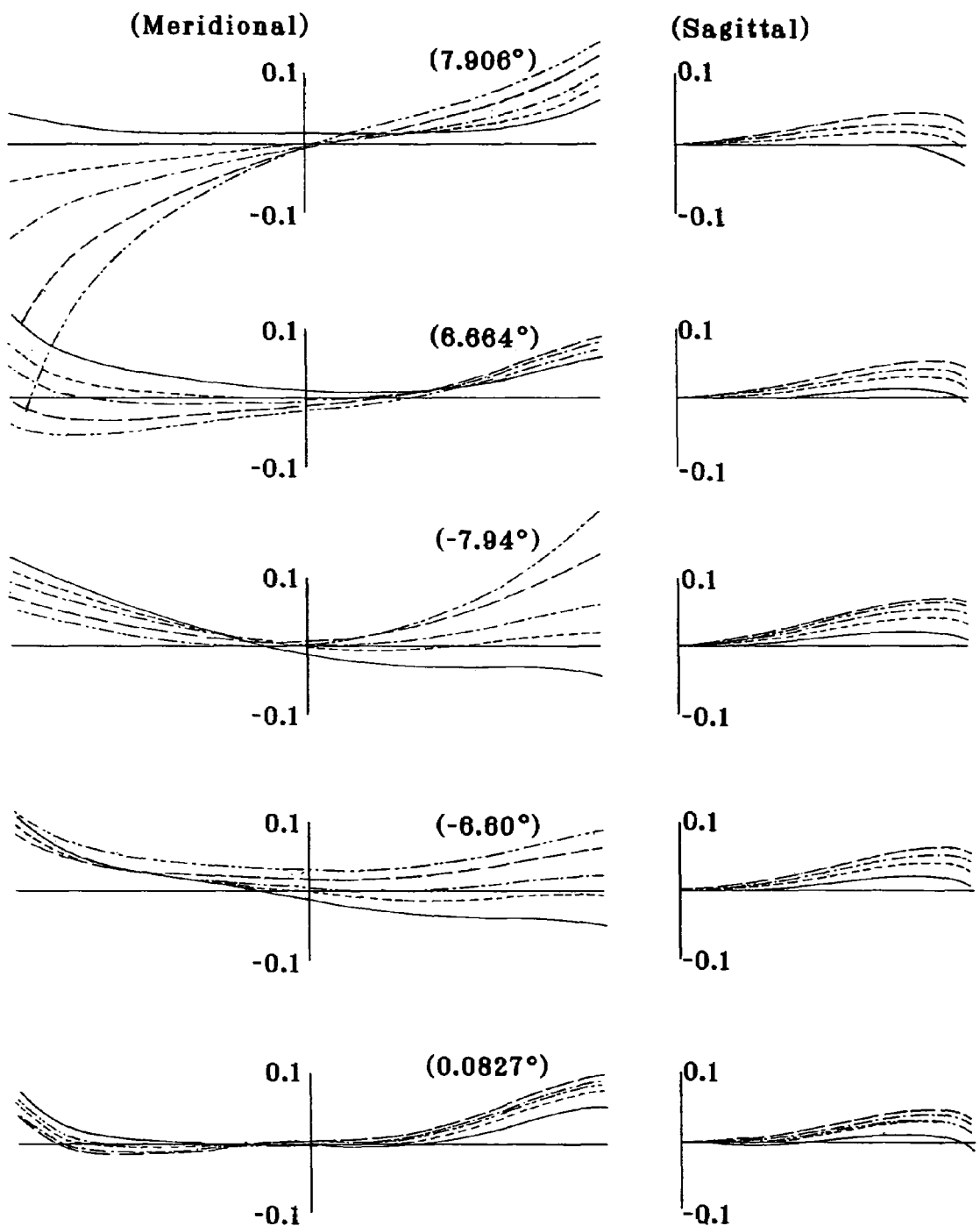
FIG. 13 is a collection of transverse aberration diagrams after anti-shake operation by Embodiment 4.

FIG. 13 is illustrative of transverse aberrations after anti-shake operation in Example 4. From a comparison with FIG. 9, it is seen that underperformance due to anti-shake operation is reduced.

As in this embodiment, it is preferable for the anti-shake group to include a positive lens and a negative lens for correction of chromatic aberrations, because deterioration in chromatic aberrations is reduced during the anti-shake operation. Here, if the anti-shake group includes a cemented doublet composed of a positive lens and a negative lens, it is then more preferable because of being less likely to be affected by fabrication errors such as thickness errors and decentration errors.

Figure 8:
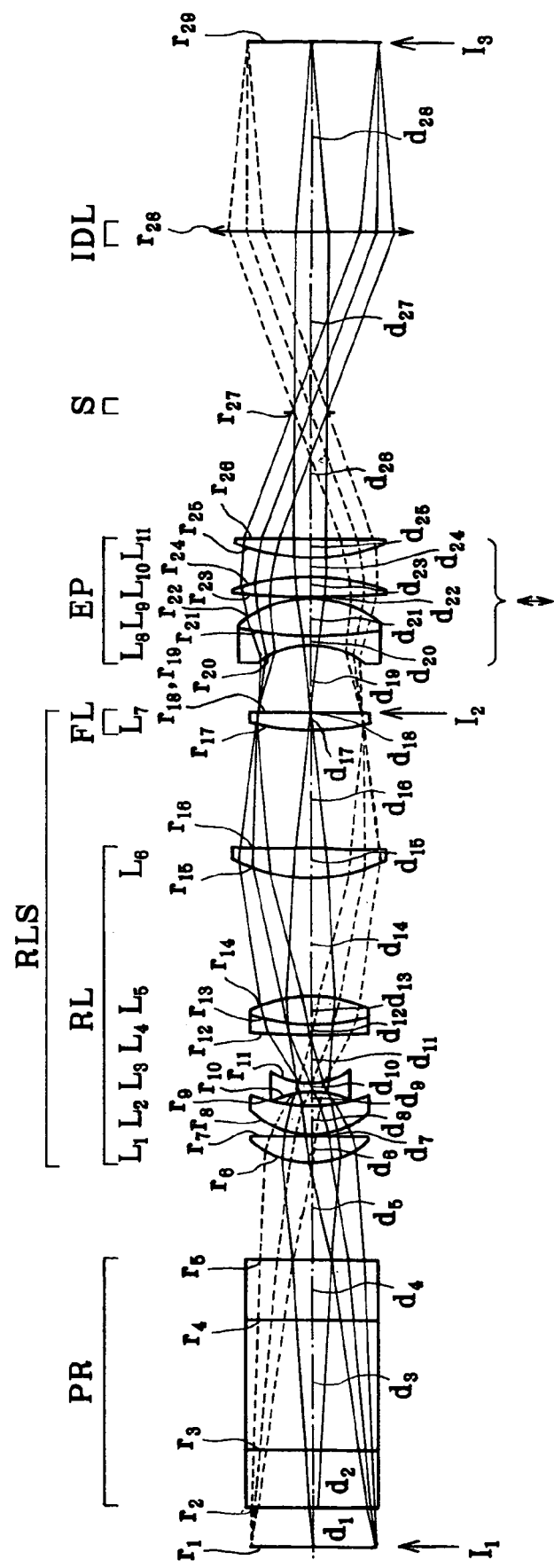
FIG. 8 is illustrative of the lenses to be shifted for anti-shake in the finder optical system of Embodiment 5.

Embodiment 5, i.e., an example of how to shift the eyepiece lens EP for anti-shake purposes as shown in FIG. 8 is now explained.

Consider here the case where the optical system of FIG. 1 is inclined with the position of the primary image-formation plane $I_1$ shifted 0.5 mm down. Then, the position of the secondary image-formation plane $I_2$ is shifted 0.43 mm up. Here, as the eyepiece lens EP is shifted 0.44 mm down in the drawing, it allows an image misalignment on the secondary image-formation plane $I_2$ to be so corrected that a shake-free image can be viewed.

Figure 14:
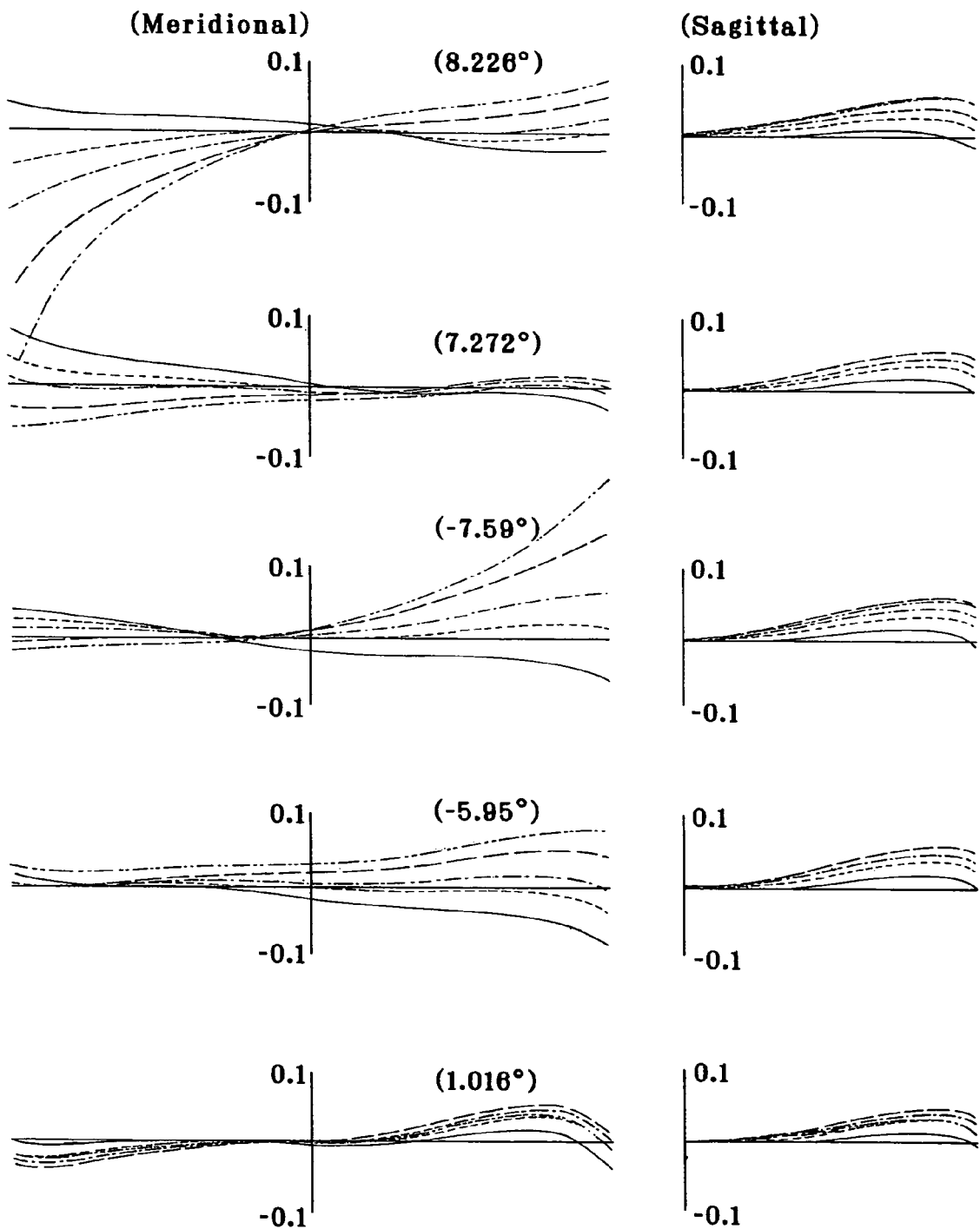
FIG. 14 is a collection of transverse aberration diagrams after anti-shake operation by Embodiment 5.

FIG. 14 is illustrative of transverse aberrations after anti-shake operation in Embodiment 5. From a comparison with FIG. 9, it is seen that underperformance due to anti-shake operation is reduced.

Lens data on the finder optical system of FIG. 1 is given as Numerical Embodiment 0, wherein $r_1$, $r_2$, etc. are the radii of curvature of the respective lens surfaces, $d_1$, $d_2$, etc. are the spaces between adjacent lens surfaces, $n_{d1}$, $n_{d2}$, etc. are the d-line refractive indices of the respective lens surfaces, and $v_{d1}$, $v_{d2}$, etc. are the Abbe constants of the respective lenses. Here let x represent an optical axis with the proviso that the direction of travel of light is taken as positive, and y stand for a direction orthogonal to the optical axis. Then, aspheric shape is given by $$x=(y^2/r)/[1+\{1-(K+1)(y/r)^2\}^{1/2}]+A_4y^4$$

where r is a paraxial radius of curvature, K is a conical coefficient, and $A_4$ is the fourth-order aspheric coefficient.

| Numerical embodiment: 0 | | | |
|---|---|---|---|
| $r_1 = \infty$ (I$_1$) | $d_1 = 7.00$ | | |
| $r_2 = \infty$ | $d_2 = 10.00$ | $n_{d1} = 1.5163$ | $v_{d1} = 64.1$ |
| $r_3 = \infty$ | $d_3 = 22.80$ | $n_{d2} = 1.5163$ | $v_{d2} = 64.1$ |
| $r_4 = \infty$ | $d_4 = 10.80$ | $n_{d3} = 1.5163$ | $v_{d3} = 64.1$ |
| $r_5 = \infty$ | $d_5 = 16.80$ | | |
| $r_6 = 14.94$(Aspheric) | $d_6 = 4.72$ | $n_{d4} = 1.6935$ | $v_{d4} = 53.2$ |
| $r_7 = 200.43$ | $d_7 = 0.44$ | | |
| $r_8 = 14.06$ | $d_8 = 4.81$ | $n_{d5} = 1.8040$ | $v_{d5} = 46.6$ |
| $r_9 = 25.38$ | $d_9 = 2.84$ | | |
| $r_{10} = -14.50$ | $d_{10} = 1.10$ | $n_{d6} = 1.8467$ | $v_{d6} = 23.8$ |
| $r_{11} = 10.42$ | $d_{11} = 8.92$ | | |
| $r_{12} = 300.05$ | $d_{12} = 1.60$ | $n_{d7} = 1.7174$ | $v_{d7} = 29.5$ |
| $r_{13} = 26.50$ | $d_{13} = 5.46$ | $n_{d8} = 1.8040$ | $v_{d8} = 46.6$ |
| $r_{14} = -22.88$ | $d_{14} = 22.93$ | | |
| $r_{15} = 30.04$(Aspheric) | $d_{15} = 5.55$ | $n_{d9} = 1.5254$ | $v_{d9} = 55.8$ |
| $r_{16} = -276.45$(Aspheric) | $d_{16} = 21.67$ | | |
| $r_{17} = 56.07$(Aspheric) | $d_{17} = 3.05$ | $n_{d10} = 1.5254$ | $v_{d10} = 55.8$ |
| $r_{18} = \infty$ | $d_{18} = 0.00$ | | |
| $r_{19} = \infty$ (I$_2$) | $d_{19} = 12.48$ | | |
| $r_{20} = -14.70$ | $d_{20} = 1.37$ | $n_{d11} = 1.8467$ | $v_{d11} = 23.8$ |
| $r_{21} = 66.77$ | $d_{21} = 6.56$ | $n_{d12} = 1.6031$ | $v_{d12} = 60.6$ |
| $r_{22} = -20.00$ | $d_{22} = 0.50$ | | |
| $r_{23} = 244.69$ | $d_{23} = 3.62$ | $n_{d13} = 1.7859$ | $v_{d13} = 44.2$ |
| $r_{24} = -39.79$ | $d_{24} = 3.36$ | | |
| $r_{25} = 37.54$ | $d_{25} = 3.30$ | $n_{d14} = 1.8340$ | $v_{d14} = 37.2$ |
| $r_{26} = \infty$ | $d_{26} = 23.00$ | | |
| $r_{27} = \infty$ (S) | $d_{27} = 31.62$ | | |
| $r_{28} = \infty$ (IDL) | $d_{28} = 32.62$ | | |
| $r_{29} = \infty$ (I$_3$) | | | |

Aspherical Coefficients

6th surface $K = 1.1550 \times 10^{-1}$
$A_4 = 6.4822 \times 10^{-6}$

15th surface $K = -8.4040 \times 10^{-1}$
$A_4 = 1.3875 \times 10^{-5}$

16th surface $K = 8.4052 \times 10^{1}$
$A_4 = 1.2911 \times 10^{-5}$

17th surface $K = -6.6270 \times 10^{-1}$
$A_4 = 3.0506 \times 10^{-5}$

Tabulated below are the values of conditions (1-1), (1-2) and (1-3) in Embodiments 1, 2, 3 and 4.

| | Condition | | |
|---|---|---|---|
| | (1-1) | (1-2) | (1-3) |
| Embodiment 1 | 1.857 | 1.000 | −0.857 |
| Embodiment 2 | 1.328 | 2.948 | −1.820 |
| Embodiment 3 | 2.004 | 5.002 | −1.040 |
| Embodiment 4 | 2.493 | 4.802 | −2.170 |
| Embodiment 5 | −0.974 | — | — |

The finder optical system and single-lens reflex camera according to the second aspect of the invention are now explained with reference to some embodiments.

Figure 15:
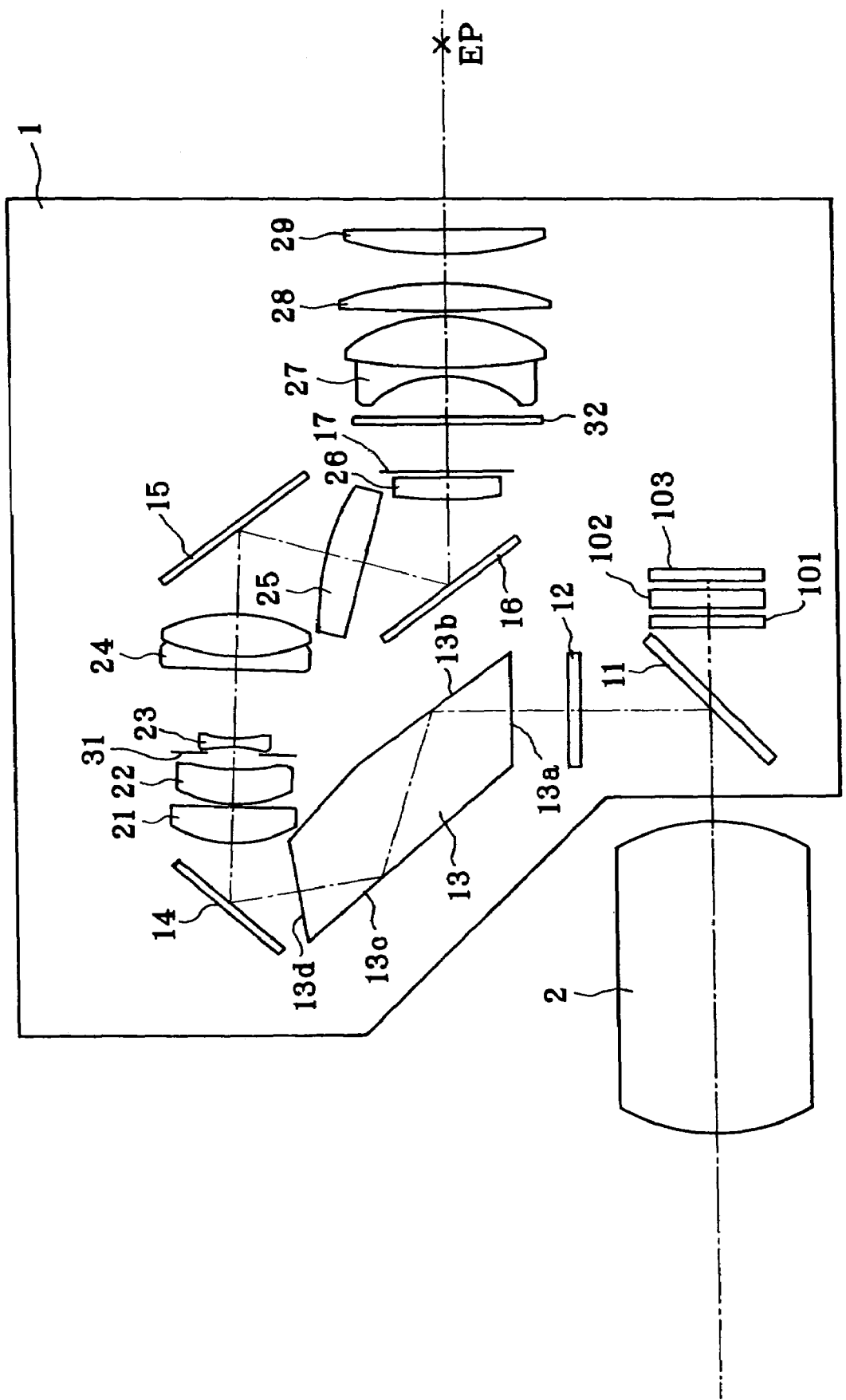
FIG. 15 is illustrative in section of the construction of a single-lens reflex camera that incorporates the finder optical system of one embodiment according to the second aspect of the invention.

FIG. 15 is illustrative in section of the construction of a single-lens reflex camera that incorporates the finder optical system according to one example of the invention. In FIG. 15, reference numeral 1 stands for a single-lens reflex camera that incorporates the finder optical system according to one embodiment of the invention, and reference numeral 2 indicates an inter-changeable taking lens. Note here that the taking lens 2 could be made integral with a camera body.

Reference is now made with reference to the order of travel of a light beam emanating from a subject and exiting from the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

Figure 16:
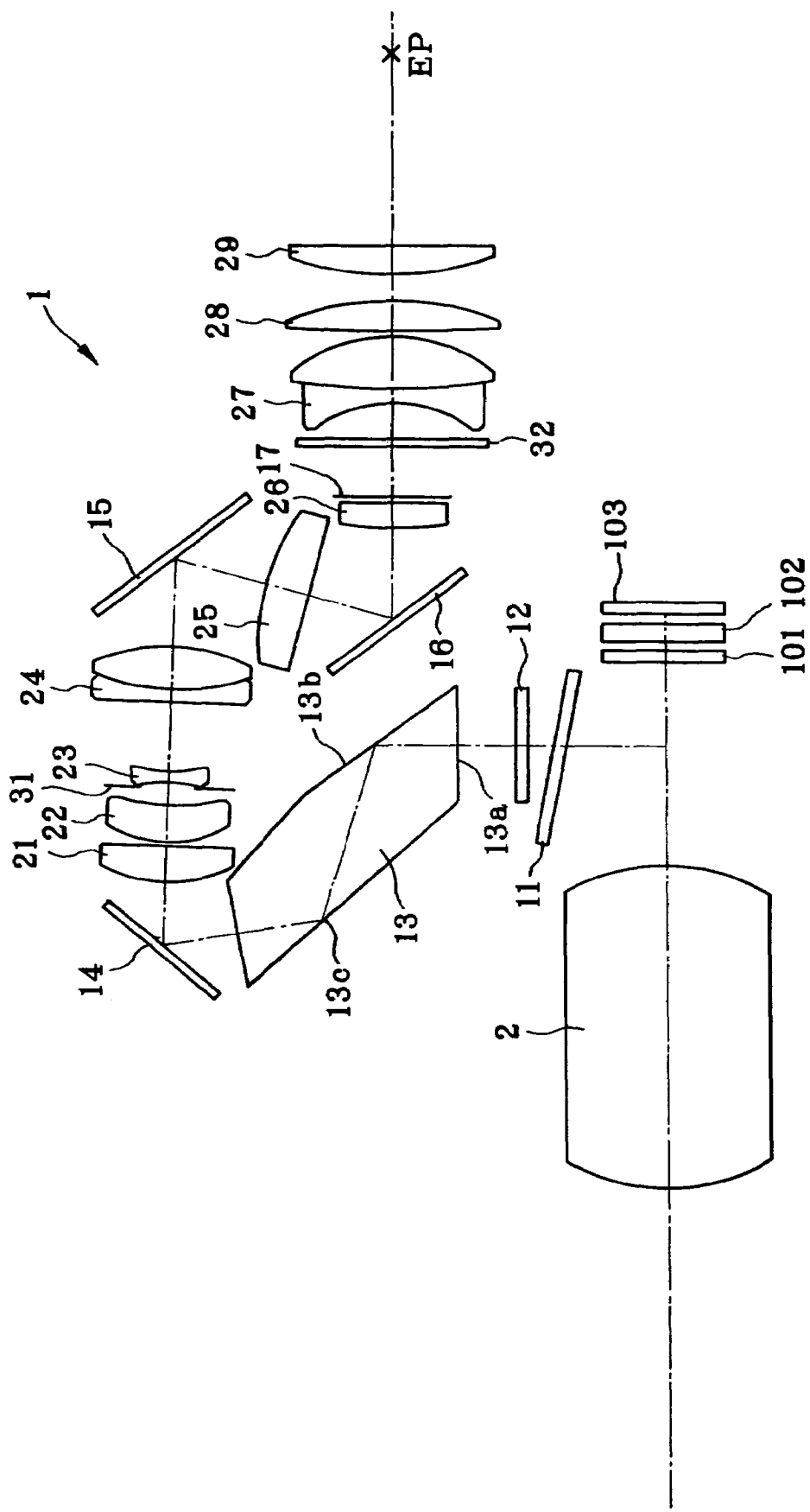
FIG. 16 is illustrative of in what state the single-lens reflex camera of FIG. 15 is during taking operation.

The light beam reflected at the quick return mirror 11 is incident on a focal plane plate 12 placed at a position optically equivalent (conjugate) to an image pickup device 103 to be described later. Referring here to FIG. 16 to be described later, when a subject image is formed on the image pickup device 103, it is also formed on the focal plane plate 12. The focal plane plate 12 could also have a condenser lens function.

The light beam exiting from the focal plane plate 12 is incident on a prism 13. The prism 13 has an entrance surface 13a, a reflecting surface 13b, a reflecting surface 13c and an exit surface 13d. Desirously, the entrance surface 13a is vertical to the axis of incident light. The light beam incident on the entrance surface 13a is reflected at the reflecting surface 13b in the subject direction. Light quantity losses here can be reduced by the satisfaction of the total-reflection condition. The reflecting surface 13b is tantamount to the aforesaid F3 reflecting surface. Further, the light beam is reflected in the upward direction such that the optical axis has components in the upward direction and subject direction at the reflecting surface 13c (that is, the optical axis direction lies between the subject direction and the upward direction). Light quantity losses here can be reduced by the satisfaction of the total-reflection condition. The reflecting surface 13c is tantamount to the aforesaid F2 reflecting surface. Further, the light beam leaves the prism 13 through the exit surface 13d. The exit surface 13d here is desirously vertical to the optical axis.

The light beam exiting from the prism 13 is further reflected at a mirror 14 in the viewer direction, with the optical axis substantially parallel with the optical axis of the taking lens 2. The mirror 14 is tantamount to the aforesaid F1 reflecting surface.

Then, the light beam transmits through lens 21, lens 22, lens 23 and lens 24 where it is subjected to lens actions. In Embodiment 1 of FIG. 15, the lens 21 is a positive meniscus lens tightly convex on its subject side, the lens 22 is a positive meniscus lens tightly convex on its subject side, the lens 23 is a double-concave negative lens, and the lens 24 is a cemented doublet composed of a negative meniscus lens convex on its subject side and a double-convex positive lens and having a positive composite power.

The lens groups here are arranged such that their composite power turns positive, and must work as a substantial part of the relay optical system. Specific lens arrangement should preferably be designed while taking aberrations, etc. into account.

Preferably, at least one positive lens (corresponding to the lens 21 or 22 in Embodiment 1 of FIG. 15) is provided, at least one negative lens (corresponding to the lens 23 in Embodiment 1 of FIG. 15) is located on the side of that positive lens facing the R1 reflecting surface, and at least one positive lens (corresponding to the positive lens providing the lens 24 in Embodiment 1 of FIG. 15) is located on the side of that negative lens facing the R1 reflecting surface, whereby the principal points can be set within this region and given magnification and optical performance can be easily attainable as well. Note here that an aperture stop 31 is located near that negative lens for efficient pupil transmission.

Next, the light beam is reflected at a mirror 15 to bend the optical axis in the subject direction and a downward direction. The mirror 15 is tantamount to the aforesaid R1 reflecting surface.

Further, the optical axis is reflected at a mirror 16 in the viewer direction. Here, a positive lens 25 is located between the mirrors 15 and 16, thereby improving on the image-formation capability and pupil transmission capability of the relay optical system.

The light beam reflected at the mirror 16 is incident on a condenser lens 26 placed near a secondary image-formation position 17. In Embodiment 1 of FIG. 15, the condenser lens 26 is a plano-convex positive lens convex on its subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming the eyepiece optical system, exiting from a camera body. Finally, the light beam is guided to the eye of the viewer.

FIG. 16 is illustrative of in what state the single-lens reflex camera of FIG. 15 is operated. Note however that the outline indicative of a camera body is not drawn.

Upon operation, the quick return mirror 11 is retracted back from the optical path, and a light beam leaving the taking lens 2 transmits successively through a filter 101 and a filter 102, entering the image pickup device 103. The filers 101 and 102 are each imparted with some functions such as an infrared cut filter function, a low-pass filter function and a dust-preventive filter function, and their number is not necessarily limited to two. The image pickup device 103 is an electronic image pickup device such as CCS or C-MOS, or a silver halide film.

Figure 17:
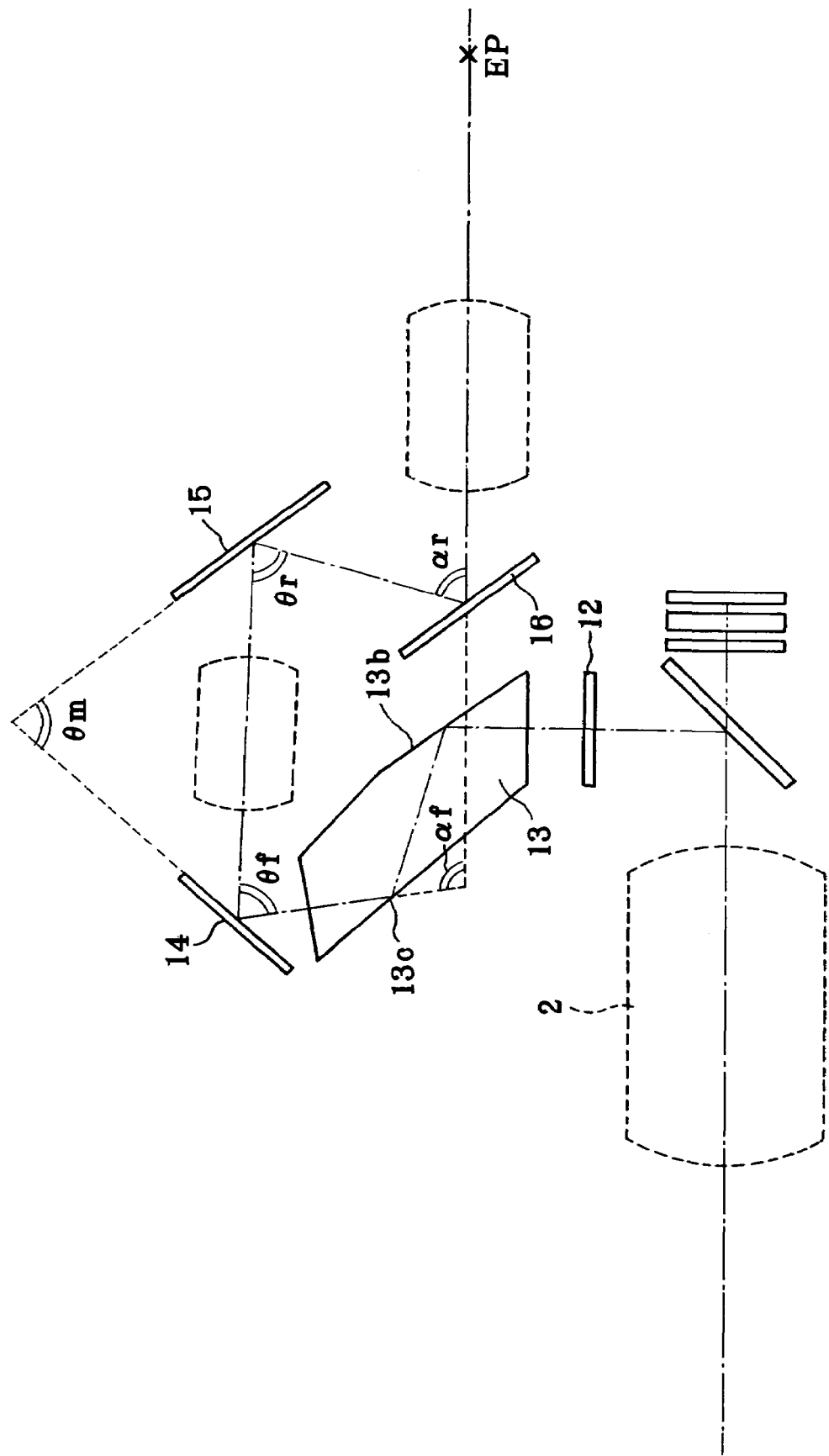
FIG. 17 is a more schematic representation of FIG. 15.

FIG. 17 is a more schematic representation of FIG. 15, indicative of the aforesaid angles $\alpha_f$, $\theta_f$, $\theta_m$, $\theta_r$ and $\alpha_r$.

Figure 18:
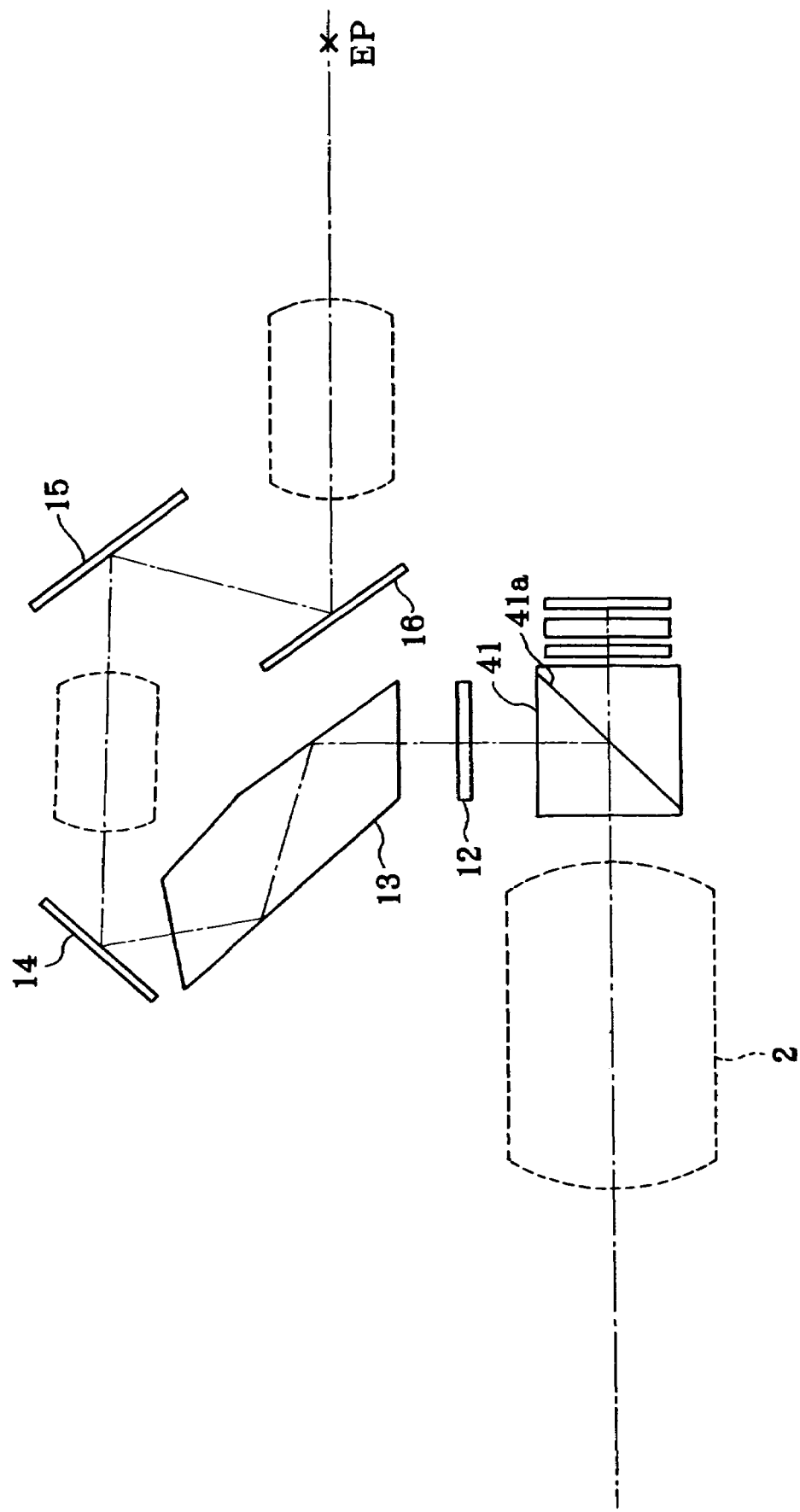
FIG. 18 is illustrative in schematic of one embodiment wherein a prism group having a half-silvered mirror surface is used in plane of the quick return mirror in FIGS. 15-17.

FIG. 18 is illustrative in schematic of a specific embodiment wherein the quick return mirror of FIGS. 15-17 is replaced by a prism group 41 having a half-silvered mirror surface 41a. This embodiment is otherwise the same as those of FIGS. 15-17, and so will not be detailed (about the lens system in particular). With this embodiment, the finder can be used to check up a subject and, at the same time, take an image of the subject.

Figure 19:
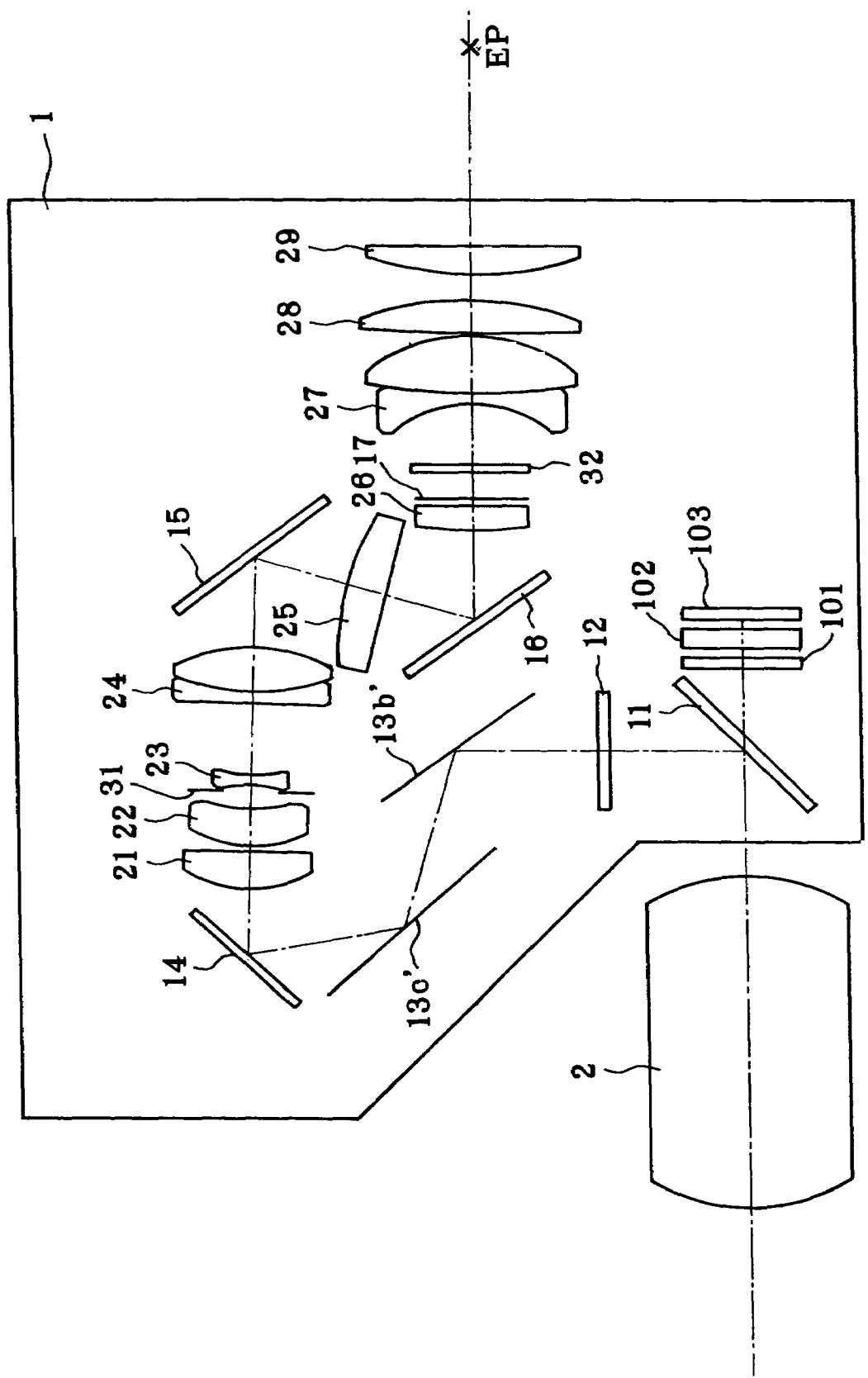
FIG. 19 is illustrative of a modification to the construction of FIG. 15 wherein two plane mirrors are used for the prism in FIG. 15.

FIG. 19 is illustrative of a modification to the single-lens reflex camera 1 shown in FIG. 15, wherein two plane mirrors 13b' and 13c' are used in place of the prism 13.

Of the two plane mirrors 13b' and 13c', the reflecting mirror 13b' on the primary image-formation plane (focal plane plate 12) side corresponds to the F3 reflecting surface, and the other reflecting surface 13c' corresponds to the F2 reflecting surface. The angle of reflection of light at the two plane mirrors 13b' and 13c' lies in the same direction as is the case with the reflecting surfaces 13b and 13a in FIG. 15. That modification is otherwise the same as in FIGS. 15-17, and so will not be detailed.

Figure 20:
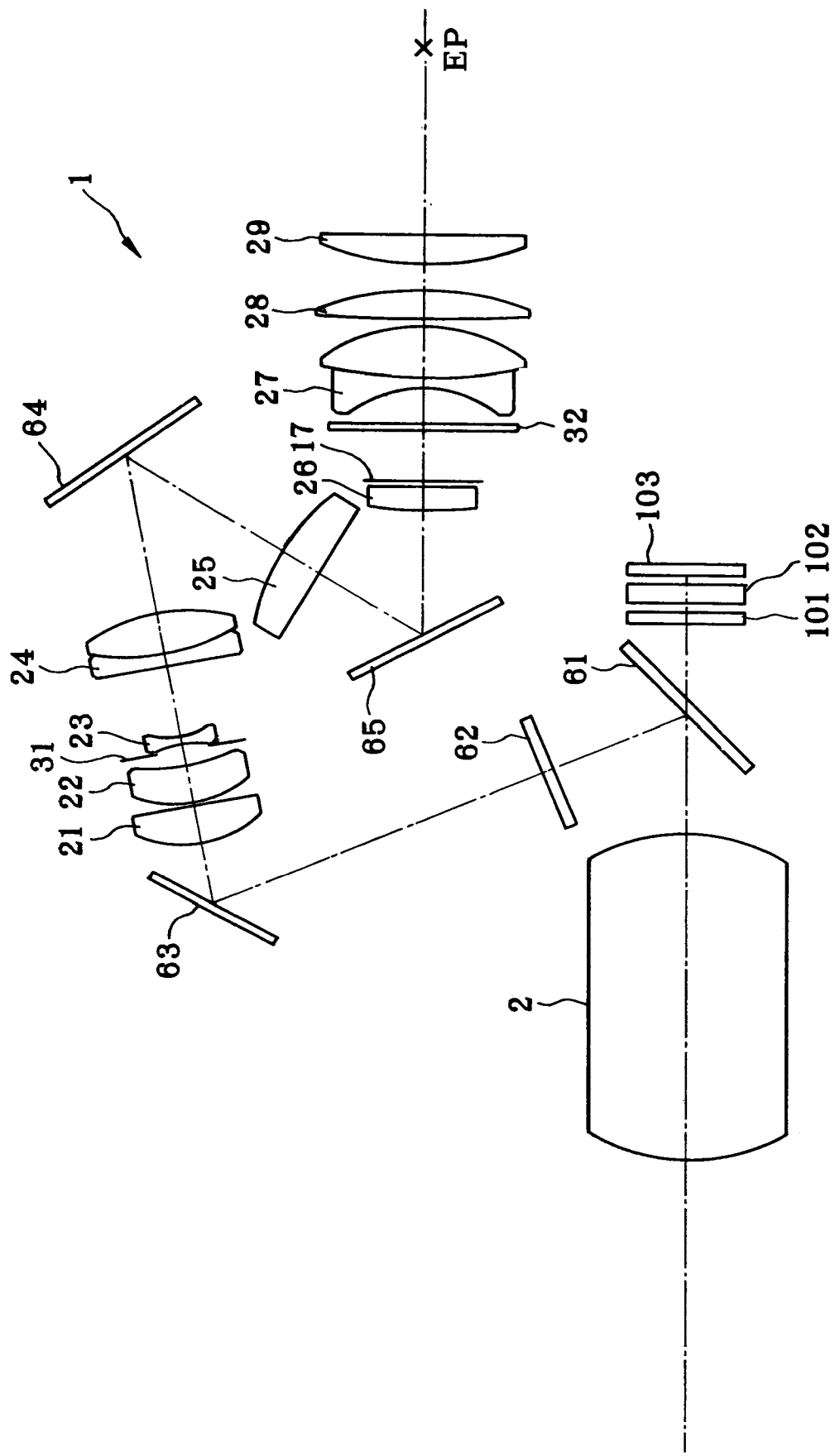
FIG. 20 is illustrative of a modification to the construction of the single-lens reflex camera of FIG. 15, wherein the prism is removed and the angle of the quick return mirror with respect to the optical axis is an acute angle.

FIG. 20 is illustrative of a modification to the single-lens reflex camera of FIG. 15, wherein the prism 13 is dispensed with, and the angle of a quick return mirror 61 with respect to the optical axis during viewing is acute.

A light beam reflected at the quick return mirror 61 is incident on a focal plane plate 62 placed at the primary image-formation position. The light beam passing through the focal plane plate 62 is incident along the optical axis on a mirror 63 (corresponding to the F1 reflecting surface).

The optical axis incident on the mirror 63 is reflected there at an acute angle in the viewer direction and the upward direction such that it comes parallel with and close to the optical axis of the taking lens 2. Then, the light beam passes through the lens 21, lens 22, lens 23 and lens 24 shown in FIG. 15, where it is subjected to lens actions.

The axis of incident light on a mirror 64 (the R1 reflecting surface) is reflected there at an acute angle in the subject direction and the downward direction.

The surfaces of the mirrors 63 and 64 subtend at an acute angle.

The optical axis is reflected at the mirror 65 in the viewer direction. Here, if the positive lens 25 is located between the mirrors 64 and 65, it is then possible to improve on the image-formation capability and pupil transmission capability of the relay optical system.

The light beam reflected at the mirror 65 is incident on the condenser lens 26 located near the secondary image-formation position 17. In FIG. 20, the condenser lens 26 is a plano-convex positive lens convex on the subject side with a plane side substantially in alignment with the secondary image-formation position 17.

Further, the light beam passes through the dust preventive glass 32. The dust preventive glass 32 cooperates with other frame, etc. to prevent dust or the like from deposition onto a lens surface near the secondary image-formation position 17.

Finally, the light beam is subjected to lens actions at the lens 27, the lens 28 and the lens 29 that form together an eyepiece optical system, leaving the camera body and arriving at the eye of the viewer.

With such arrangement, the optical axis incident on the mirror 63 (tantamount to the aforesaid F1 reflecting surface) can be inclined in the subject direction without recourse to the prism 13 of FIG. 15.

Figure 21:
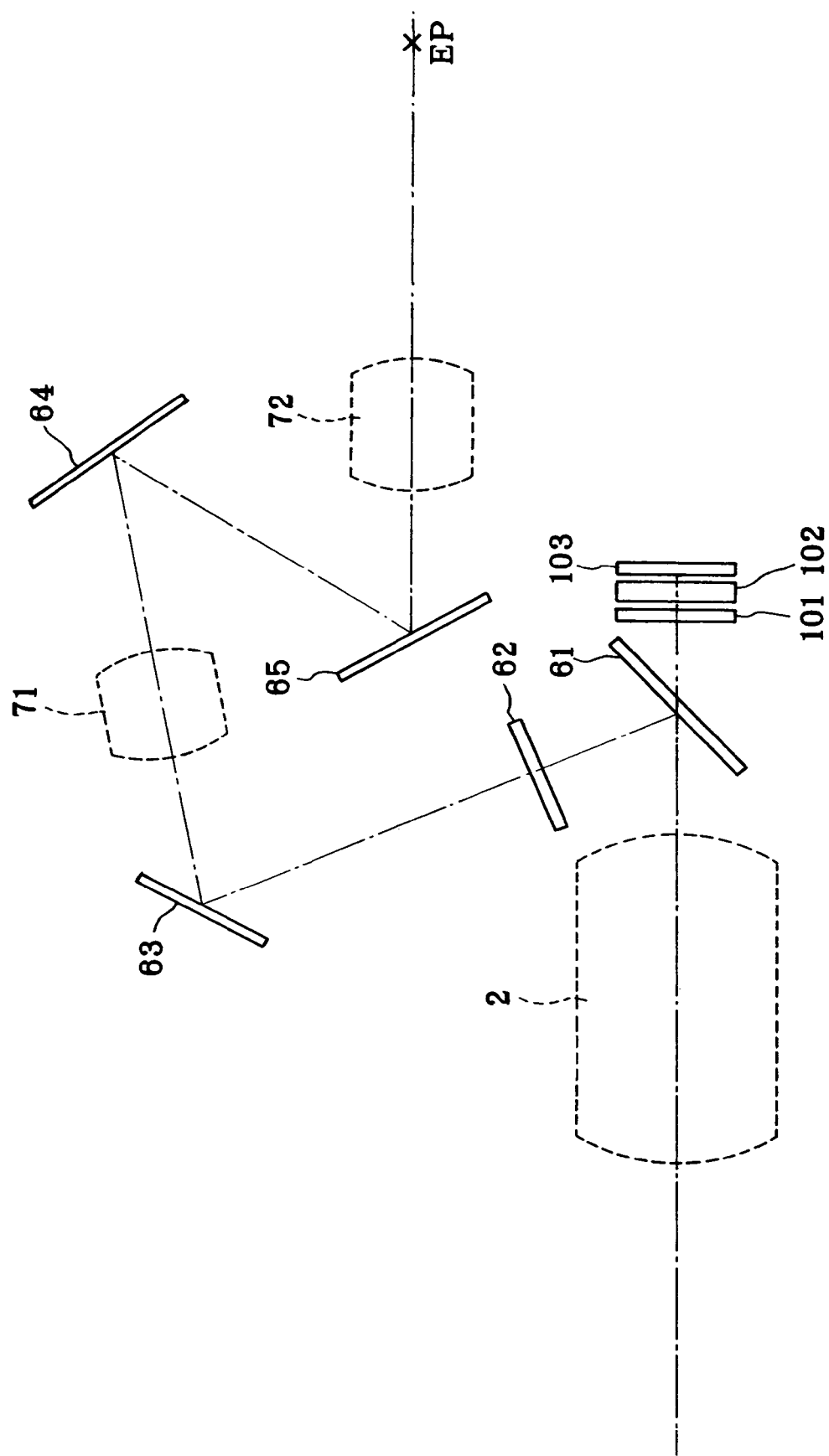
FIG. 21 is a more schematic representation of FIG. 20.

FIG. 21 is a more schematic representation of FIG. 20, indicating that it is only required to locate a lens group 71 of positive power between the mirrors 63 and 64 and a lens group 72 of positive power between the mirror 65 and the viewer. Note that the secondary image-formation position is preferably found between the mirror 65 and the lens group 72.

Numerical Embodiments 1 and 2 of the lens system contemplated in FIG. 15 are now given. Note that the lens surface shapes in FIG. 15 correspond to those in Numerical Embodiment 1.

Figure 22:
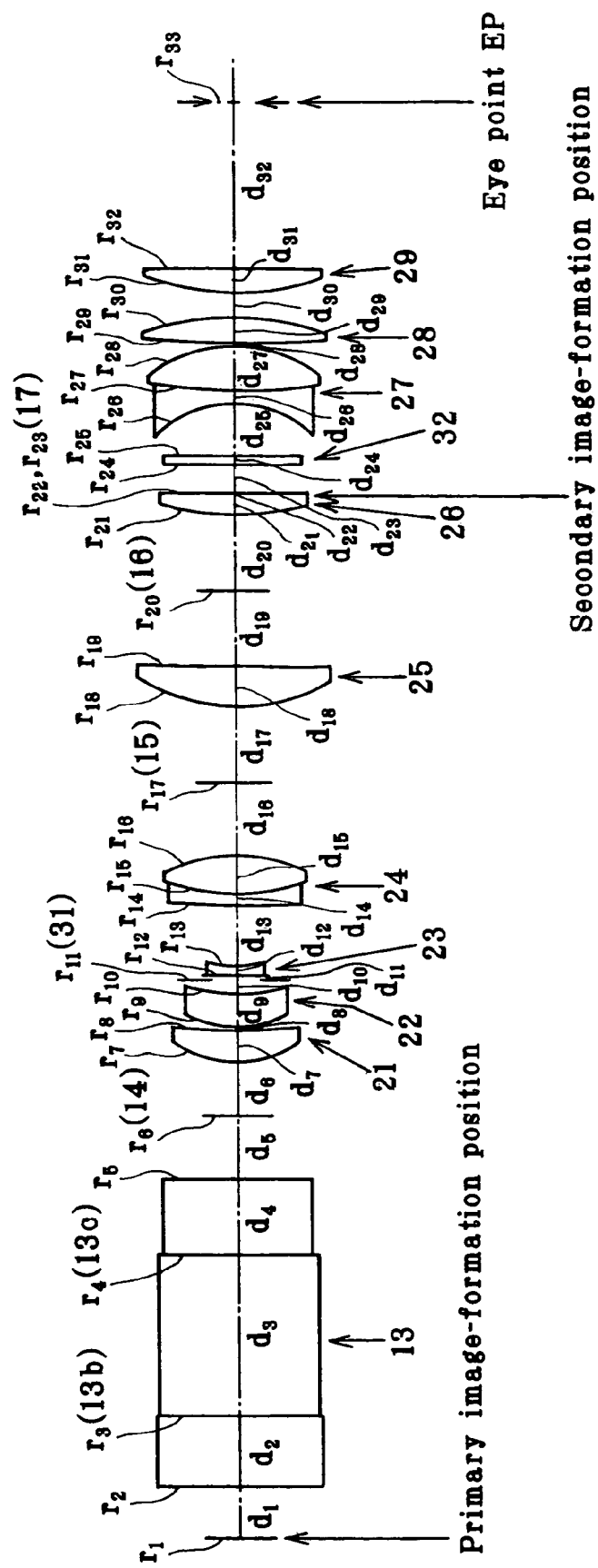
FIG. 22 is illustrative of in section of the finder optical system of Numerical Embodiment 1 according to the second aspect of the invention, as taken apart along its optical axis.

FIG. 22 is a sectional view of the finder optical system of Numerical Embodiment 1 as taken apart along its optical axis, with its numerical data given later.

In FIG. 22, the optical members in FIG. 15, too, are indicated by reference numerals. Referring specifically to this, the surface $r_1$ corresponds to the primary image-formation position on the focal plane plate 12, and the surfaces $r_2$ to $r_5$ correspond to the prism 13: $r_2$, $r_3$, $r_4$ and $r_5$ correspond to the entrance surface 13a, the reflecting surface 13b, the reflecting surface 13c and the exit surface 13d, respectively.

The surface $r_6$ corresponds to the mirror 14, the surface $r_7$ to $r_8$ to the lens 21, the surface $r_9$ to $r_{10}$ to the lens surface 22, the surface $r_{11}$ to the aperture stop 31, the surface $r_{12}$ to $r_{13}$ to the lens surface 23, and the surface $r_{14}$ to $r_{16}$ to the lens 24.

Likewise, the surface $r_{17}$ corresponds to the mirror 15, the surfaces $r_{18}$ to $r_{19}$ to the positive lens 25, the surface $r_{20}$ to the mirror 16, the surfaces $r_{21}$ to $r_{22}$ to the condenser lens 26, and the surface $r_{23}$ in alignment with the surface $r_{22}$ to the secondary image-formation position 17.

Finally, the surfaces $r_{24}$ to $r_{25}$ corresponds to the dust preventive glass 32, the surfaces $r_{26}$ to $r_{28}$ to the lens 27 that provides an eyepiece optical system, the surfaces $r_{29}$ to $r_{30}$ to the lens 28, the surfaces $r_{31}$ to $r_{32}$ to the lens 29, and the surface $r_{33}$ to the pupil of the viewer, viz., the eye point EP.

In this embodiment, the relay optical system is made up of lenses 21, 22, 23, 24, 25 and 26, wherein the lens 21 is a positive meniscus lens convex on the primary image-formation position side, the lens 22 is a positive meniscus lens convex on the primary image-formation position side, the lens 23 is a double-concave negative lens, the lens 24 is a cemented lens consisting of a negative meniscus lens convex on the primary image-formation position side and a double-convex positive lens, the lens 25 is a positive meniscus lens convex on the primary image-formation position side, and the lens 26 is a condenser lens consisting of a plano-convex positive lens. The eyepiece optical system is made up of lenses 27, 28 and 29, wherein the lens 27 is a cemented lens consisting of a double-concave negative lens and a double-convex positive lens, the lens 28 is a double-convex positive lens, and the lens 29 is a plano-convex positive lens.

Aspheric surfaces are used at the surface $r_7$ of the lens 21 on the primary image-formation position side, both surfaces $r_{18}$ and $r_{19}$ of the positive lens 25 and the surface $r_{21}$ of the condenser lens 26 on the primary image-formation position side.

Note that in the numerical data given later, the relations of diopter to the diopter control surface spaces $d_{23}$ and $d_{30}$ are shown, and the angles of the optical axes reflected at the reflecting surfaces 13b, 13c and the mirrors 14, 15 and 16 are indicated.

Figure 23:
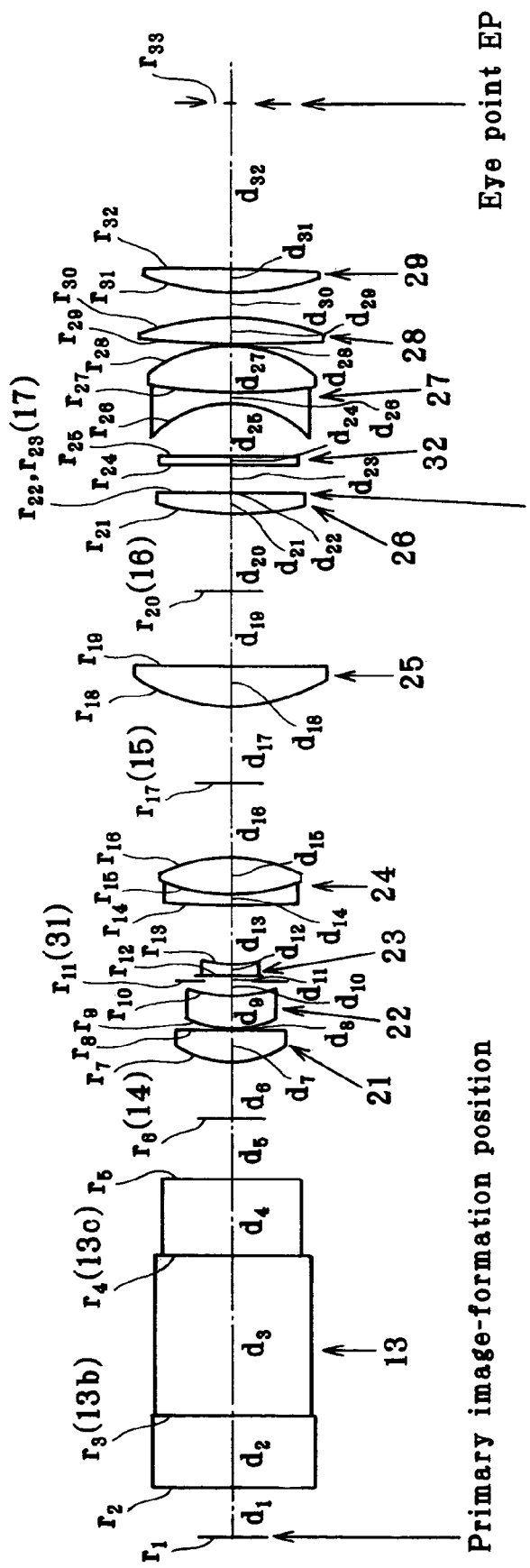
FIG. 23 is illustrative of in section of the finder optical system of Numerical Embodiment 2 according to the second aspect of the invention, as taken apart along its optical axis.

FIG. 23 is a section view of the finder optical system of Numerical Embodiment 2 as taken apart along its optical axis, with its numerical data given later. In FIG. 23, the optical members in the arrangement of FIG. 15, too, are indicated by reference numerals. The relay optical system is made up of lenses 21, 22, 23, 24, 25 and 26, wherein the lens 21 is a positive meniscus lens convex on the primary image-formation position side, the lens 22 is a positive meniscus lens convex on the primary image-formation position side, the lens 23 is a double-concave negative lens, the lens 24 is a cemented lens consisting of a negative meniscus lens convex on the primary image-formation position side and a double-convex positive lens, the lens 25 is a double-convex positive lens, and the lens 26 is a condenser lens consisting of a plano-convex positive lens. The eyepiece optical system is made up of lenses 27, 28 and 29, wherein the lens 27 is a cemented lens consisting of a double-concave negative lens and a double-convex positive lens, the lens 28 is a double-convex positive lens, and the lens 29 is a double-convex positive lens.

In this embodiment, aspheric surfaces are used at both surfaces $r_8$ and $r_{19}$ of the positive lens 25, and the surface $r_{21}$ of the condenser lens 26 on the primary image-formation position side.

Note that in the numerical data given later, the relations of diopter to the diopter control surface spaces $d_{25}$ and $d_{30}$ are shown, and the angles of the optical axes reflected at the reflecting surfaces 13b, 13c and the mirrors 14, 15 and 16 are indicated.

In the numerical embodiments enumerated just below, the symbols used hereinafter but not hereinbefore have the following meanings:

$r_1, r_2$, etc.: radius of curvature of each lens surface (optical surface), $d_1, d_2$, etc.: space between adjacent lens surfaces (optical surfaces), $n_{d1}, n_{d2}$, etc.: d-line refractive index of each lens (optical medium), and $\nu_{d1}, \nu_{d2}$, etc.: Abbe constant of each lens (optical medium).

Here let x stand for an optical axis provided that the direction of travel of light is taken as positive and y indicate a direction orthogonal to the optical axis. Then, aspheric shape is given by $$x=(y^2/r)/[1+\{1-(K+1)(y/r^2)^{1/2}\}]+A_4 y^4+A_6 y^6$$

where r is a paraxial radius of curvature, K is a conical coefficient, and $A_4$ and $A_6$ are the fourth- and the sixth-order coefficients, respectively.

Numerical embodiment: 1 (−1 diopter)

| | | | |
|---|---|---|---|
| $r_1 = \infty$ | $d_1 = 7.00$ | | |
| (First image plane) | | | |
| $r_2 = \infty$ | $d_2 = 10.00$ | $n_{d1} = 1.51633$ | $\nu_{d1} = 64.14$ |
| $r_3 = \infty$ (F3) | $d_3 = 22.80$ | $n_{d2} = 1.51633$ | $\nu_{d2} = 64.14$ |
| $r_4 = \infty$ (F2) | $d_4 = 10.80$ | $n_{d3} = 1.51633$ | $\nu_{d3} = 64.14$ |
| $r_5 = \infty$ | $d_5 = 8.92$ | | |
| $r_6 = \infty$ (F1) | $d_6 = 7.88$ | | |
| $r_7 = 14.94$ (Aspheric) | $d_7 = 4.72$ | $n_{d4} = 1.69350$ | $\nu_{d4} = 53.21$ |
| $r_8 = 200.43$ | $d_8 = 0.44$ | | |
| $r_9 = 14.06$ | $d_9 = 4.81$ | $n_{d5} = 1.80400$ | $\nu_{d5} = 46.57$ |
| $r_{10} = 25.38$ | $d_{10} = 2.09$ | | |
| $r_{11} = \infty$ (Stop) | $d_{11} = 0.75$ | | |
| $r_{12} = -14.50$ | $d_{12} = 1.10$ | $n_{d6} = 1.84666$ | $\nu_{d6} = 23.78$ |
| $r_{13} = 10.42$ | $d_{13} = 8.92$ | | |
| $r_{14} = 300.05$ | $d_{14} = 1.60$ | $n_{d7} = 1.71736$ | $\nu_{d7} = 29.52$ |
| $r_{15} = 26.50$ | $d_{15} = 5.46$ | $n_{d8} = 1.80400$ | $\nu_{d8} = 46.57$ |
| $r_{16} = -22.88$ | $d_{16} = 10.71$ | | |
| $r_{17} = \infty$ (R1) | $d_{17} = 11.22$ | | |
| $r_{18} = 30.04$ (Aspheric) | $d_{18} = 5.55$ | $n_{d9} = 1.52542$ | $\nu_{d9} = 55.78$ |
| $r_{19} = 276.45$ (Aspheric) | $d_{19} = 10.67$ | | |
| $r_{20} = \infty$ (R2) | $d_{20} = 11.00$ | | |
| $r_{21} = 56.07$ (Aspheric) | $d_{21} = 3.05$ | $n_{d10} = 1.52542$ | $\nu_{d10} = 55.78$ |
| $r_{22} = \infty$ | $d_{22} = 0.00$ | | |
| $r_{23} = \infty$ | $d_{23} = 4.14$ | | |
| (Second image plane) | | | |
| $r_{24} = \infty$ | $d_{24} = 1.00$ | $n_{d11} = 1.51633$ | $\nu_{d11} = 64.14$ |
| $r_{25} = \infty$ | $d_{25} = 7.68$ | | |
| $r_{26} = -14.71$ | $d_{26} = 1.37$ | $n_{d12} = 1.84666$ | $\nu_{d12} = 23.78$ |
| $r_{27} = 66.77$ | $d_{27} = 6.56$ | $n_{d13} = 1.60311$ | $\nu_{d13} = 60.64$ |
| $r_{28} = -20.00$ | $d_{28} = 0.50$ | | |
| $r_{29} = 244.69$ | $d_{29} = 3.62$ | $n_{d14} = 1.78590$ | $\nu_{d14} = 44.20$ |
| $r_{30} = -39.79$ | $d_{30} = 3.36$ | | |
| $r_{31} = 37.55$ | $d_{31} = 3.30$ | $n_{d15} = 1.83400$ | $\nu_{d15} = 37.16$ |
| $r_{32} = \infty$ | $d_{32} = 23.00$ | | |
| $r_{33} = \infty$ | | | |
| (Pupil of Observer) | | | |

Aspherical Coefficients

7th surface $K = 0.1155$
$A_4 = 6.48 \times 10^{-6}$

-continued

18th surface

K = −0.8404
$A_4 = 1.39 \times 10^{-5}$

19th surface

K = 84.0521
$A_4 = 1.29 \times 10^{-5}$

21th surface

K = −0.6627
$A_4 = 3.05 \times 10^{-5}$

| Diopter Movement | −1 diopter | −3 diopter | +1 diopter |
|---|---|---|---|
| $d_{25}$ | 7.68 | 5.50 | 9.84 |
| $d_{30}$ | 3.36 | 5.54 | 1.20 |

Reflection Angle of Optical Axis

| | |
|---|---|
| $r_3$ | 106° |
| $r_4$ | 116° |
| $r_6$ | 78° |
| $r_{17}$ | 77° |
| $r_{20}$ | 75° |
| $\alpha_f =$ | 100° |
| $\theta_f =$ | 78° |
| $\theta_r =$ | 77° |
| $\alpha_r =$ | 75° |
| $\theta_m =$ | 77.5° |

Numerical embodiment: 2 (−1 diopter)

| | | | |
|---|---|---|---|
| $r_1 = \infty$ (First image plane) | $d_1 = 7.00$ | | |
| $r_2 = \infty$ | $d_2 = 10.00$ | $n_{d1} = 1.51633$ | $\nu_{d1} = 64.14$ |
| $r_3 = \infty$ (F3) | $d_3 = 22.80$ | $n_{d2} = 1.51633$ | $\nu_{d2} = 64.14$ |
| $r_4 = \infty$ (F2) | $d_4 = 10.80$ | $n_{d3} = 1.51633$ | $\nu_{d3} = 64.14$ |
| $r_5 = \infty$ | $d_5 = 8.92$ | | |
| $r_6 = \infty$ (F1) | $d_6 = 7.88$ | | |
| $r_7 = 14.32$ | $d_7 = 4.64$ | $n_{d4} = 1.71300$ | $\nu_{d4} = 53.87$ |
| $r_8 = 484.25$ | $d_8 = 0.41$ | | |
| $r_9 = 15.50$ | $d_9 = 4.78$ | $n_{d5} = 1.80400$ | $\nu_{d5} = 46.57$ |
| $r_{10} = 23.20$ | $d_{10} = 2.07$ | | |
| $r_{11} = \infty$ (Stop) | $d_{11} = 0.75$ | | |
| $r_{12} = −15.23$ | $d_{12} = 1.33$ | $n_{d6} = 1.84666$ | $\nu_{d6} = 23.78$ |
| $r_{13} = 10.30$ | $d_{13} = 8.86$ | | |
| $r_{14} = 312.27$ | $d_{14} = 1.49$ | $n_{d7} = 1.71736$ | $\nu_{d7} = 29.52$ |
| $r_{15} = 27.57$ | $d_{15} = 5.55$ | $n_{d8} = 1.80400$ | $\nu_{d8} = 46.57$ |
| $r_{16} = −22.16$ | $d_{16} = 10.71$ | | |
| $r_{17} = \infty$ (R1) | $d_{17} = 11.24$ | | |
| $r_{18} = 31.04$ (Aspheric) | $d_{18} = 5.53$ | $n_{d9} = 1.52542$ | $\nu_{d9} = 55.78$ |
| $r_{19} = −291.42$ (Aspheric) | $d_{19} = 10.67$ | | |
| $r_{20} = \infty$ (R2) | $d_{20} = 11.00$ | | |
| $r_{21} = 52.58$ (Aspheric) | $d_{21} = 3.05$ | $n_{d10} = 1.49236$ | $\nu_{d10} = 57.86$ |
| $r_{22} = \infty$ | $d_{22} = 0.00$ | | |
| $r_{23} = \infty$ (Second image plane) | $d_{23} = 4.14$ | | |
| $r_{24} = \infty$ | $d_{24} = 1.00$ | $n_{d11} = 1.51633$ | $\nu_{d11} = 64.14$ |
| $r_{25} = \infty$ | $d_{25} = 7.66$ | | |
| $r_{26} = −14.33$ | $d_{26} = 1.34$ | $n_{d12} = 1.84666$ | $\nu_{d12} = 23.78$ |
| $r_{27} = 75.22$ | $d_{27} = 6.54$ | $n_{d13} = 1.60311$ | $\nu_{d13} = 60.64$ |
| $r_{28} = −20.34$ | $d_{28} = 0.50$ | | |
| $r_{29} = 238.56$ | $d_{29} = 3.80$ | $n_{d14} = 1.78590$ | $\nu_{d14} = 44.20$ |
| $r_{30} = −37.80$ | $d_{30} = 3.31$ | | |
| $r_{31} = 40.09$ | $d_{31} = 3.23$ | $n_{d15} = 1.83400$ | $\nu_{d15} = 37.16$ |
| $r_{32} = −797.23$ | $d_{32} = 23.00$ | | |
| $r_{33} = \infty$ (Pupil of Observer) | | | |

Aspherical Coefficients

18th surface

K = −0.8405
$A_4 = 1.73 \times 10^{-5}$

19th surface

K = 84.0517
$A_4 = 1.64 \times 10^{-5}$

21th surface

K = −0.6627
$A_4 = 4.50 \times 10^{-5}$
$A_6 = −1.81 \times 10^{-7}$

| Diopter Movement | −1 diopter | −3 diopter | +1 diopter |
|---|---|---|---|
| $d_{25}$ | 7.66 | 5.48 | 9.81 |
| $d_{30}$ | 3.31 | 5.49 | 1.16 |

Reflection Angle of Optical Axis

| | |
|---|---|
| $r_3$ | 106° |
| $r_4$ | 116° |
| $r_6$ | 78° |
| $r_{17}$ | 77° |
| $r_{20}$ | 75° |
| $\alpha_f =$ | 100° |
| $\theta_f =$ | 78° |
| $\theta_r =$ | 77° |
| $\alpha_r =$ | 75° |
| $\theta_m =$ | 77.5° |

Figure 24A:
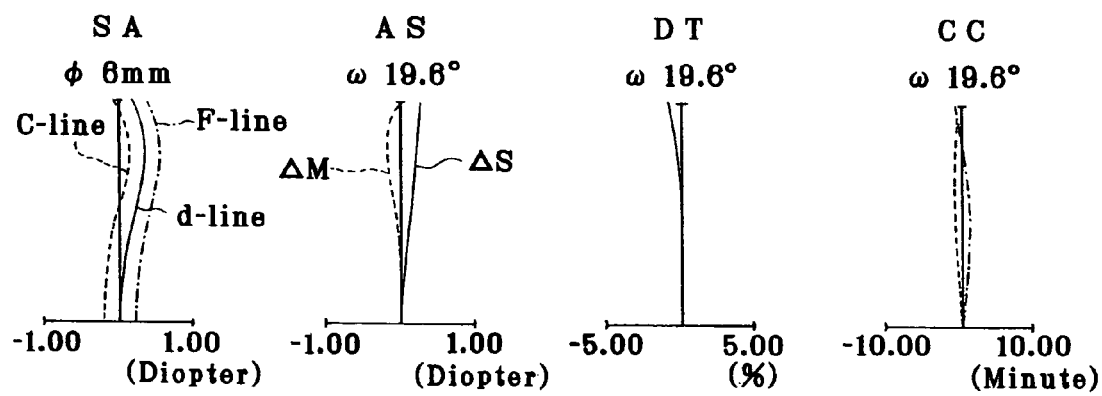
FIG. 24 is a collection of aberration diagrams for Numerical Embodiment 1.
Figure 24B:
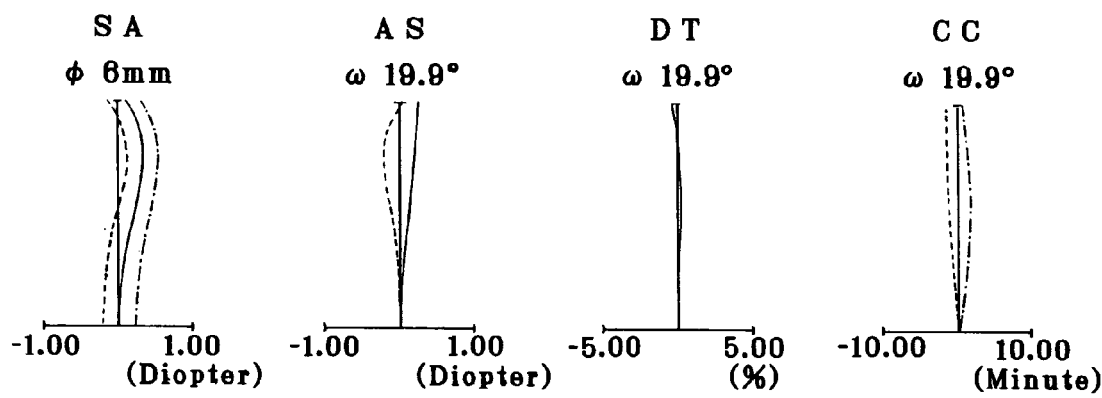
Figure 24C:
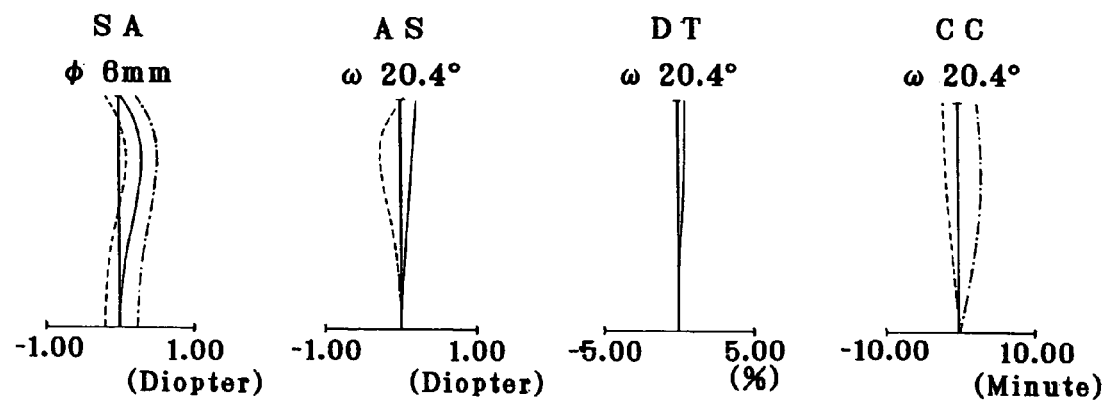
Figure 25A:
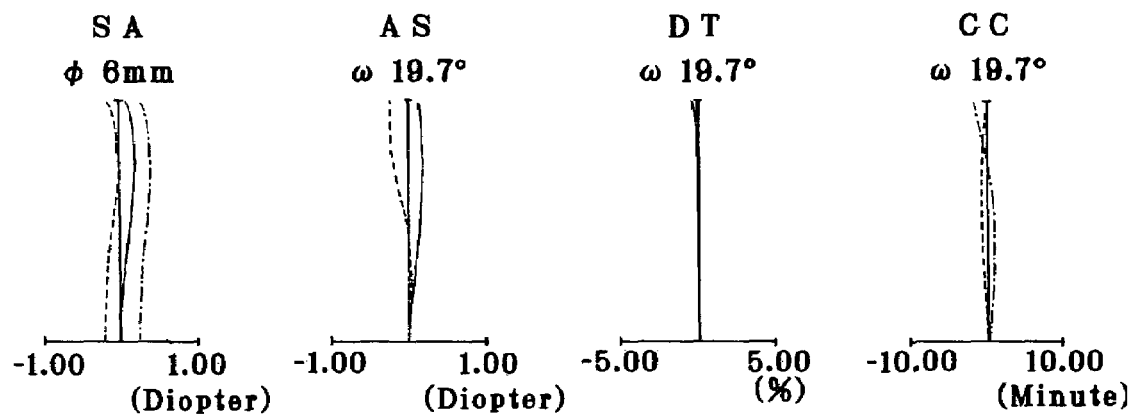
FIG. 25 is a collection of aberration diagrams for Numerical Embodiment 2.
Figure 25B:
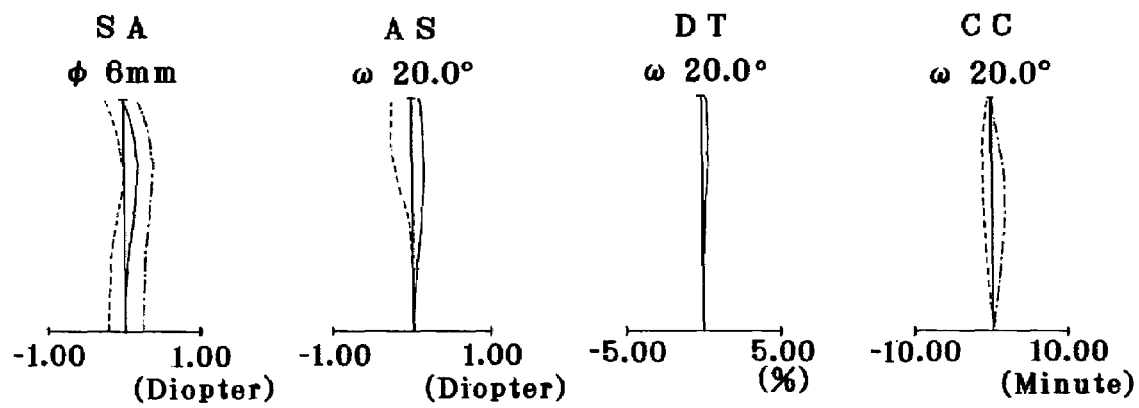
Figure 25C:
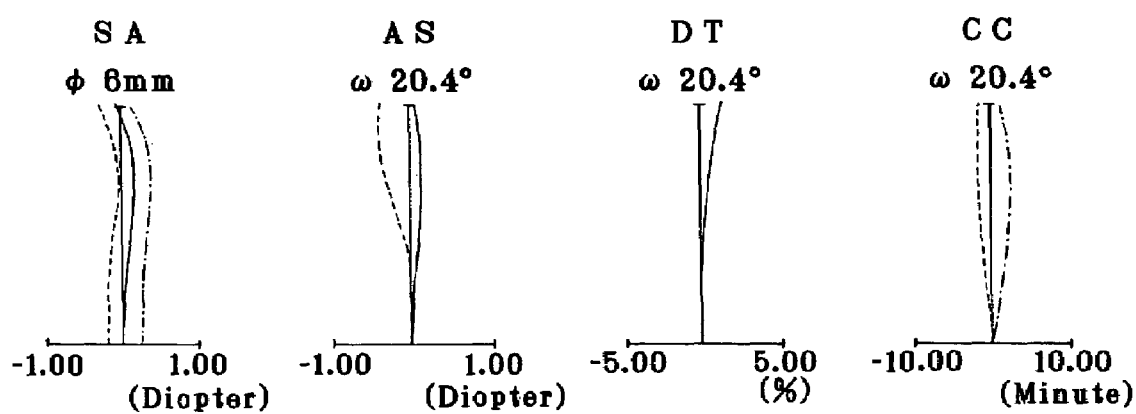

FIG. 24 is a collection of aberration diagrams for Embodiment 1, and FIG. 25 is a collection of aberration diagrams for Embodiment 2. In these aberration diagrams, (a), (b) and (c) are indicative of spherical aberration (SA), astigmatism (AS), distortion (DT) and chromatic aberration of magnification (CC) at the time of +1 diopter, −1 diopter, and −3 diopter, respectively, and "ϕ" and "ω" are indicative of pupil diameter and an exit angle, respectively. Note that the states of aberrations in the aberration diagrams are illustrative of those in the finder optical system after the primary image-formation plane.

The angle of reflection of the optical axis contemplated in the arrangement of FIG. 20 is typically 68° for the quick return mirror 61, 78° for the mirror 63, 48° for the mirror 64, and 58° for the mirror 65.

The finder optical system and single-lens reflex camera according to the third aspect of the invention are now explained with reference to some embodiments.

Figure 26:
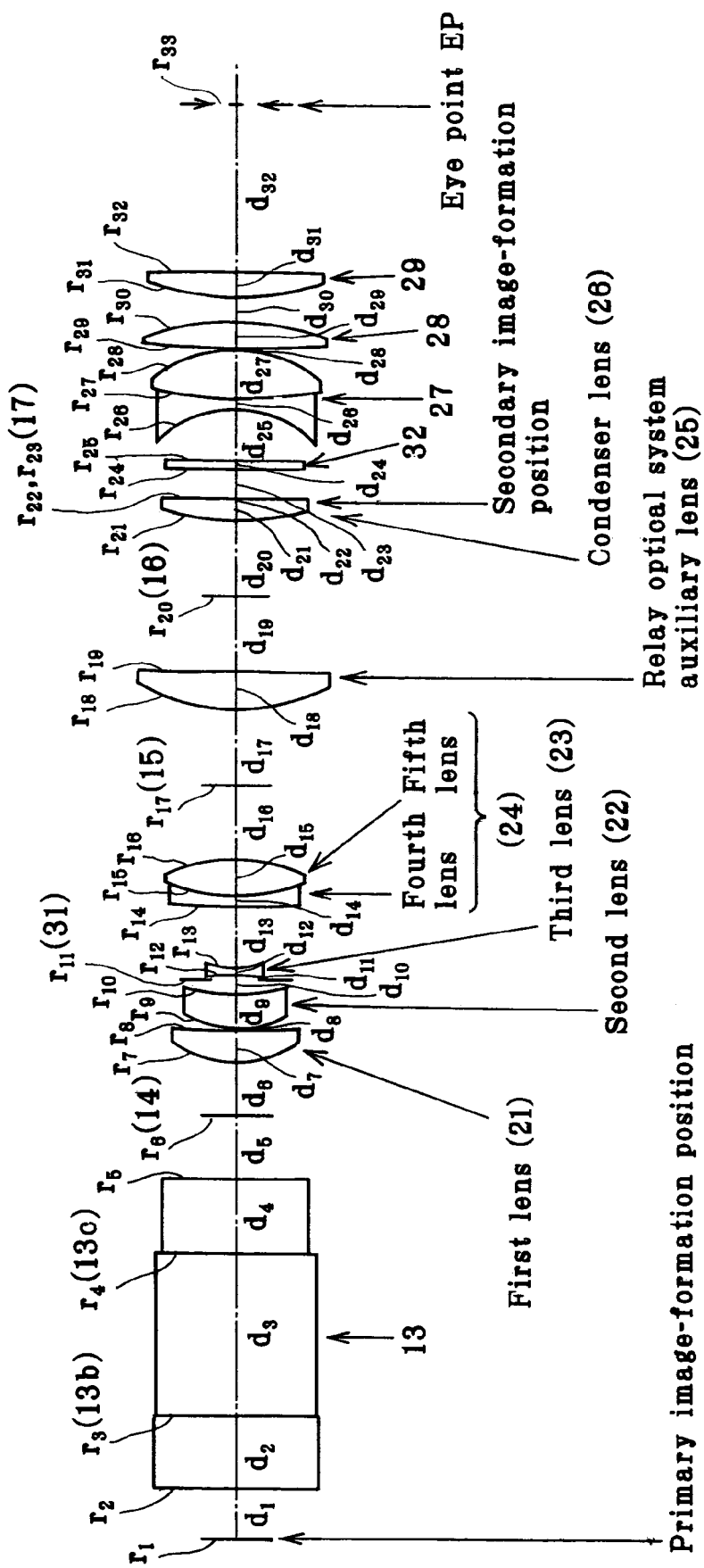
FIG. 26 is illustrative in section of the finder optical system according to one embodiment of the third aspect of the invention, as taken apart along its optical axis.

FIG. 26 is a sectional view of the finder optical system of Embodiment 1 according to the third aspect of the invention, as taken apart along its optical axis. This numerical embodiment is substantially the same as the finder optical system of Numerical Embodiment 1 according to the second aspect of the invention.

Referring to FIG. 26, the finder optical system is made up of a lens group having positive refracting power and consisting of a first lens of positive refracting power indicated at surfaces $r_7$-$r_8$, a second lens of positive refracting power indicated at surfaces $r_9$-$r_{10}$, a third lens of negative refracting power indicated at surfaces $r_{12}$-$r_{13}$, and a cemented doublet consisting of a fourth lens of negative refracting power and a fifth lens of positive refracting power, indicated at surfaces $r_{14}$-$r_{16}$, a relay optical system auxiliary lens of positive refracting power indicated at surfaces $r_{18}$-$r_{19}$, and a condenser lens of positive refracting power indicated at surfaces $r_{21}$-$r_{22}$, wherein a subject image formed as a primary image at the primary image-formation position indicated at surface $r_1$ is re-formed at the secondary image-formation position indicated at surface $r_{23}$, and an aperture stop indicated at surface $r_{11}$ is located between the second lens and the third lens. In this embodiment, the secondary image-formation position defined by surface $r_{23}$ is in alignment with the surface $r_{22}$ of the condenser lens 26 that faces away the primary image-formation side.

The image re-formed at the secondary image-formation position $r_{23}$ is enlarged and viewed through the pupil of the viewer positioned at the surface $r_{33}$, i.e., the eye point EP via an eyepiece optical system made up of a cemented lens consisting of a double-concave negative lens and a double-convex positive lens and indicated at surfaces $r_{26}$-$r_{28}$, a double-convex positive lens indicated at surfaces $r_{29}$-$r_{30}$ and a plano-convex positive lens indicated at surfaces $r_{31}$-$r_{32}$.

In the arrangement of FIG. 26, note that the surfaces $r_2$-$r_5$ between the primary image-formation position and the first lens could be thought of as a prism 13 (referred to later) for bending the optical axis, the surface $r_6$ as a mirror 14 (referred to later) for bending the optical axis, the surface $r_{17}$ between the fifth lens and the relay optical system auxiliary lens as a mirror 15 (referred to later) for bending the optical axis, and the surface $r_{20}$ between the relay optical system auxiliary lens and the condenser lens as a mirror 16 (referred to later) for bending the optical axis. Also note that a plane-parallel plate indicated at surfaces $r_{24}$-$r_{25}$ between the secondary image-formation position and the eyepiece optical system could be thought of as the dust-preventive glass 32 to be referred to later.

Although numerical data in this embodiment are the same as those in Numerical Embodiment 1 according to the second aspect of the invention, it is understood that in the finder optical system, the first lens is a positive meniscus lens convex on the primary image-formation position side, the second lens is a positive meniscus lens convex on the primary image-formation position side, the third lens is a double-concave negative lens, the fourth lens is a negative meniscus lens convex on the primary image-formation position side, and the fifth lens is a double-convex positive lens. The relay optical system auxiliary lens is a positive meniscus lens convex on the primary image-formation position side, and the condenser lens is a plano-convex positive lens.

Aspheric surfaces are used at the surface $r_7$ of the first lens on the primary image-formation position side, both surfaces $r_{18}$ and $r_{19}$ of the relay optical system auxiliary lens and the surface $r_{21}$ of the condenser lens on the primary image-formation position side.

In the numerical data about Numerical Embodiment 1, the relations of diopter to the diopter control surface spaces $d_{25}$ and $d_{30}$ are also shown.

Figure 27:
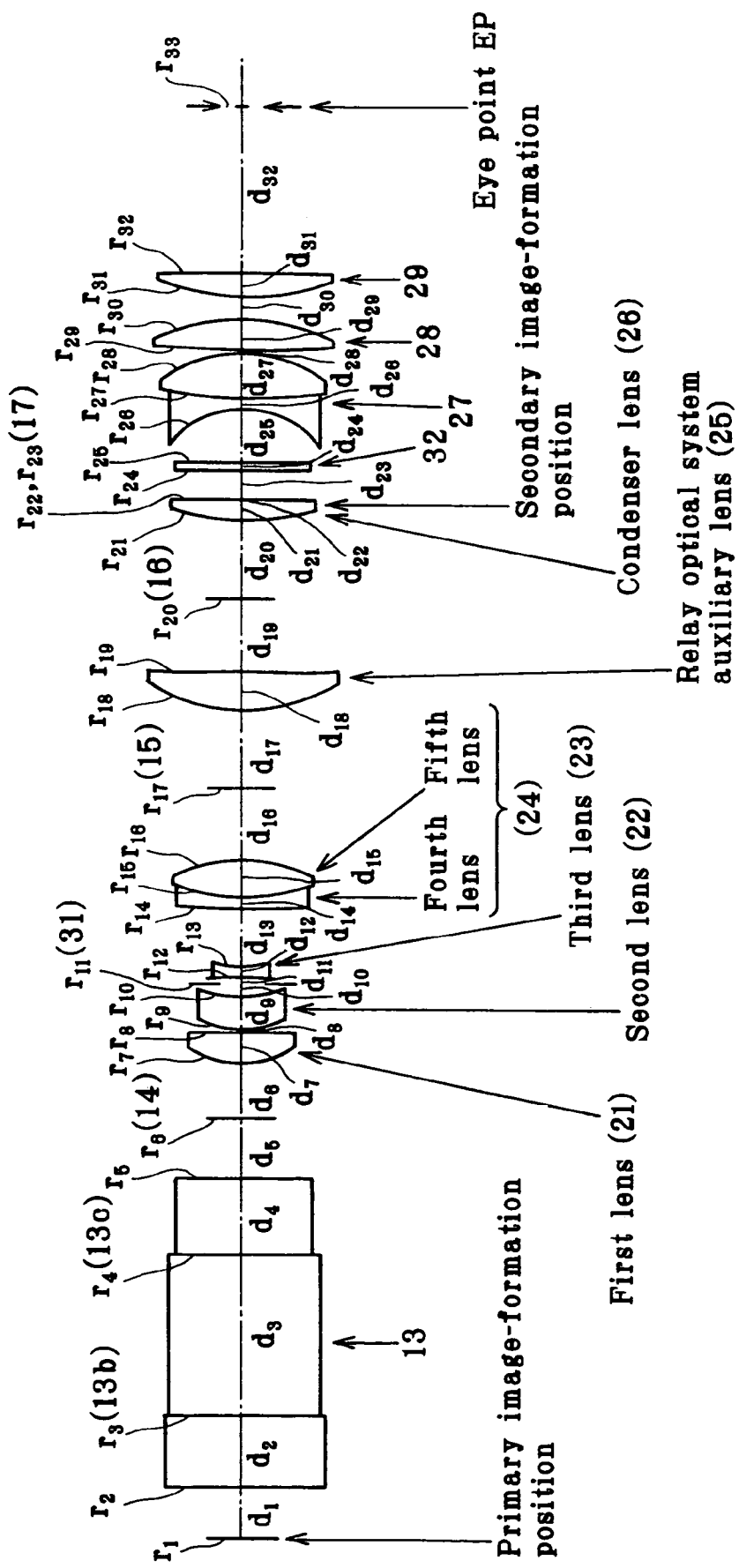
FIG. 27 is illustrative in section of the finder optical system of Embodiment 2 according to the third aspect of the invention, as taken apart along its optical axis.

FIG. 27 is a sectional view of the finder optical system of Embodiment 2 according to the third aspect of the invention, as taken apart along its optical axis. This finder optical system is substantially the same as that of Numerical Embodiment 2 according to the second aspect of FIG. 23.

Basically, this embodiment is much the same as in Embodiment 1 of FIG. 26, except that the relay optical system auxiliary lens is a double-convex positive, the lens located in, and nearest to the eye point side of, the eyepiece optical system is a double-convex positive lens, and three aspheric surfaces are used: two at both surfaces $r_{18}$ and $r_{19}$ of the relay optical system auxiliary lens and one at the surface $r_{21}$ of the condenser lens on the primary image-formation position side.

Aberration diagrams for the above Embodiments 1 and 2 are the same as in FIGS. 24 and 25, respectively.

Tabulated below are the values of conditions (3-1), (3-2), (3-3) and (3-4) in the above Embodiments 1 and 2.

| | Condition | | | |
|---|---|---|---|---|
| | (3-1) dl/flr | (3-2) drf/drr | (3-3) ds/flr | (3-4) dh/ds |
| Embodiment 1 | 1.66 | 0.44 | 1.29 | 0.42 |
| Embodiment 2 | 1.65 | 0.47 | 1.28 | 0.42 |

Figure 28:
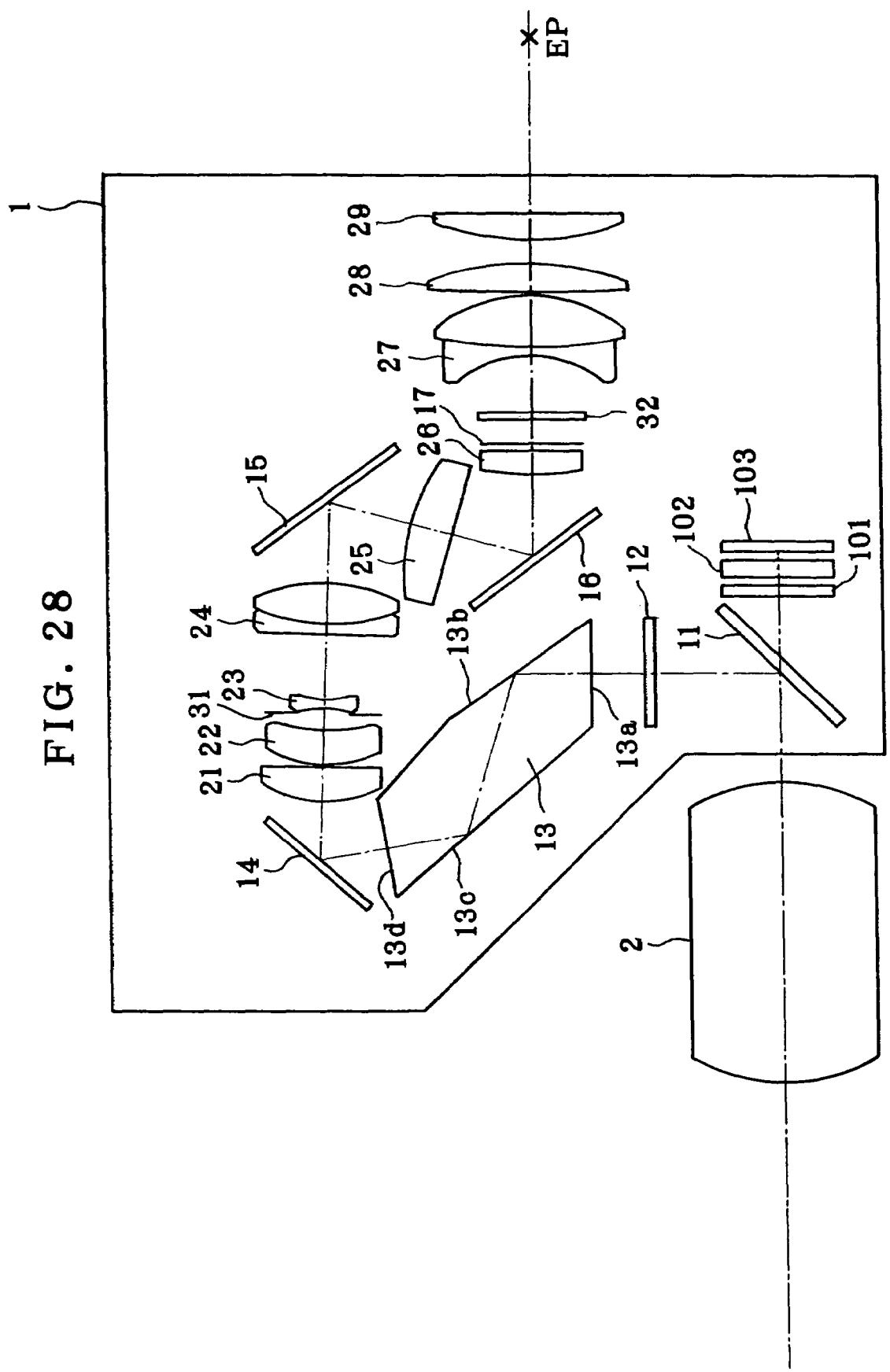
FIG. 28 is illustrative in section of the construction of a single-lens reflex camera that incorporates the finder optical system of Embodiment 1.

Reference is now made to some embodiments of the inventive single-lens reflex camera to which such an exemplified finder optical system is applied. FIG. 28 is illustrative in section of the construction of a single-lens reflex camera that incorporates the finder optical system of Embodiment 1 of according to the third aspect of the invention, as in FIG. 15. Referring now to FIG. 28, reference numeral 1 stands for a single-lens reflex camera that incorporates the finder optical system according to that embodiment of the invention, and reference numeral 2 indicates an interchangeable taking lens. Note here that the taking lens 2 could be made integral with a camera body.

Reference is now made with reference to the order of travel of a light beam emanating from a subject and exiting the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

The light beam reflected at the quick return mirror 11 is incident on a focal plane plate 12 placed at a position optically equivalent (conjugate) to an image pickup device 103 to be described later. Referring here to FIG. 16 to be described later, when a subject image is formed on the image pickup device 103, it is also formed on the focal plane plate 12. The focal plane plate 12 could also have a condenser lens function.

The light beam exiting from the focal plane plate 12 is incident on a prism 13. The prism 13 has an entrance surface 13a, a reflecting surface 13b, a reflecting surface 13c and an exit surface 13d. Desirously, the entrance surface 13a is vertical to the axis of incident light. The light beam incident on the entrance surface 13a is reflected at the reflecting surface 13b in the subject direction. Light quantity losses here can be reduced by the satisfaction of the total-reflection condition. Further, the light beam is reflected in the upward direction such that the optical axis has components in the upward direction and subject direction at the reflecting surface 13c (that is, the optical axis direction lies between the subject direction and the upward direction). Light quantity losses here can be reduced by the satisfaction of the total-reflection condition. Further, the light beam leaves the prism 13 through the exit surface 13d. The exit surface 13d here is desirously vertical to the optical axis.

The light beam exiting the prism 13 is further reflected at a mirror 14 in the viewer direction, with the optical axis substantially parallel with the optical axis of the taking lens 2.

Then, the light beam transmits through lens 21, lens 22, lens 23 and lens 24 that form together the relay optical system where it is subjected to lens actions. In the embodiment of FIG. 28, the lens 21 is a positive meniscus lens tightly convex on the subject side or the first lens in Embodiment 1, and the lens 22 is a positive meniscus lens tightly convex on the subject side or the second lens in Embodiment 1; two such lenses are tantamount to the FP lens group. The lens 23 is a double-concave negative lens or the third lens in Embodiment 1, tantamount to the N lens group. The lens 24 is a cemented doublet composed of a negative meniscus lens convex on the subject side and a double-convex positive lens and having a positive composite power, wherein the negative meniscus lens is the fourth lens, and the double-convex positive lens is the fifth lens in Embodiment 1. This cemented doublet is tantamount to the RP lens group. The lens groups located here are located such that their composite power turns positive, representing a substantial part of the relay optical system.

Note that an aperture stop 31 could be located near the negative lens 23 for efficient pupil transmission.

Next, the light beam is reflected at a mirror 15 to bend the optical axis in the subject direction and a downward direction, and the optical axis is reflected at a mirror 16 in the viewer direction. Here, a positive lens 25 is located between the mirrors 15 and 16, thereby improving on the image-formation capability and pupil transmission capability of the relay optical system. The positive lens 25 is tantamount to the relay optical system auxiliary lens.

The light beam reflected at the mirror 16 is incident on a condenser lens 26 placed near the secondary image-formation position 17. In the embodiment of FIG. 28, the condenser lens 26 is a plano-convex positive lens convex on the subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming together the eyepiece optical system, exiting from a camera body. Finally, the light beam is guided to the eye of the viewer.

Note that affixed to FIGS. 26 and 27 are reference numerals indicative of elements corresponding to those in FIG. 28.

Figure 29:
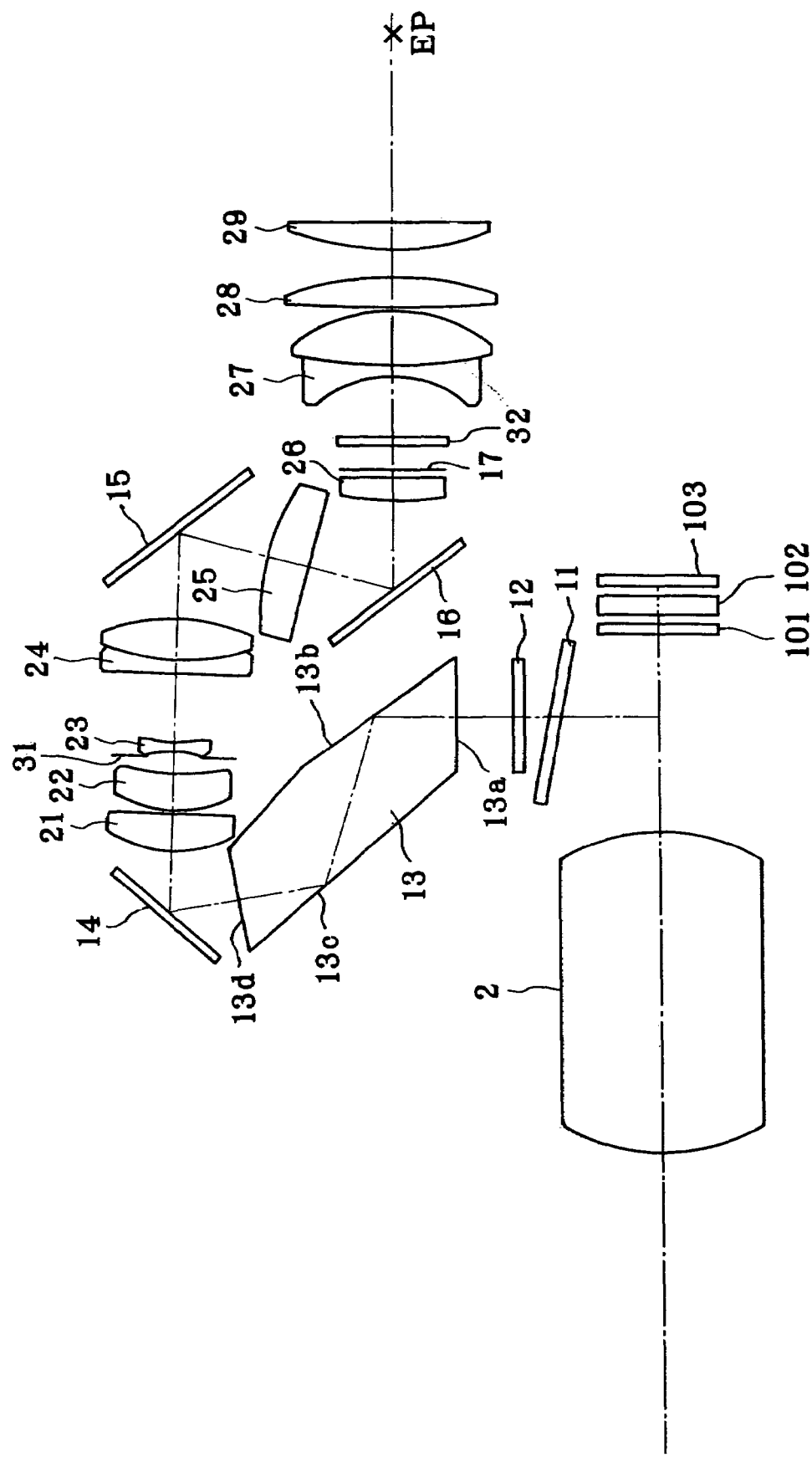
FIG. 29 is illustrative of in what state the single-lens reflex camera of FIG. 28 is during taking operation.

FIG. 29 is illustrative of in what state the single-lens reflex camera of FIG. 28 is operated. Note however that the outline indicative of the camera body is not drawn.

Upon operation, the quick return mirror 11 is retracted back from the optical path, and a light beam leaving the taking lens 2 transmits successively through a filter 101 and a filter 102, entering the image pickup device 103. The filers 101 and 102 are each imparted with some functions such as an infrared cut filter function, a low-pass filter function and a dust-preventive filter function, and their number is not necessarily limited to two. The image pickup device 103 is an electronic image pickup device such as CCS or C-MOS, or a silver halide film.

In the embodiment using the inventive finder optical system, it is understood that misalignments in the conjugate relation between the primary image-formation position and the second image-formation position, if any, could be corrected by control of one or two spaces in the relay optical system.

When two spaces are used, that control could be implemented by axial movement of a part of the relay optical system in such a way as to reduce the sum of control amount down to zero.

Specifically, it is desired to control any one of the following sites. In Numerical Embodiments 1 and 2, for instance, it is desired to control a space $d_6$ between the primary image-formation position $r_1$ and the lens 21 (the first lens), a space $d_{10}+d_{11}$ between the lens 22 (the second lens) and the lens 23 (the third lens), movement of the lens 23 (the third lens) alone, movement of the lens 24 (the fourth+the fifth lens) alone, and a space between the lens 25 (the relay optical system auxiliary lens) and the lens 26 (the condenser lens).

To allow the optical axis of the taking lens 2 to have a given relation to the optical axis of the eyepiece system made up of lenses 27-29, the positions of the mirrors 14-16 located in the relay optical system could be controlled and corrected.

In the invention, a lens function surface could be located near the primary image-formation plane or between the primary image-formation plane and the FP lens group (the first lens+the second lens) to implement condenser or other functions or, alternatively, a lens function surface could be interposed between the RP lens group (the fourth lens+the fifth lens) and the eyepiece lens group (the lenses 27, 28 and 29) to implement condenser or other functions.

The eyepiece optical system and relay type finder optical system according to the fourth aspect of the invention, and a single-lens reflex camera that incorporates them are now explained with reference to their embodiments.

Figure 30:
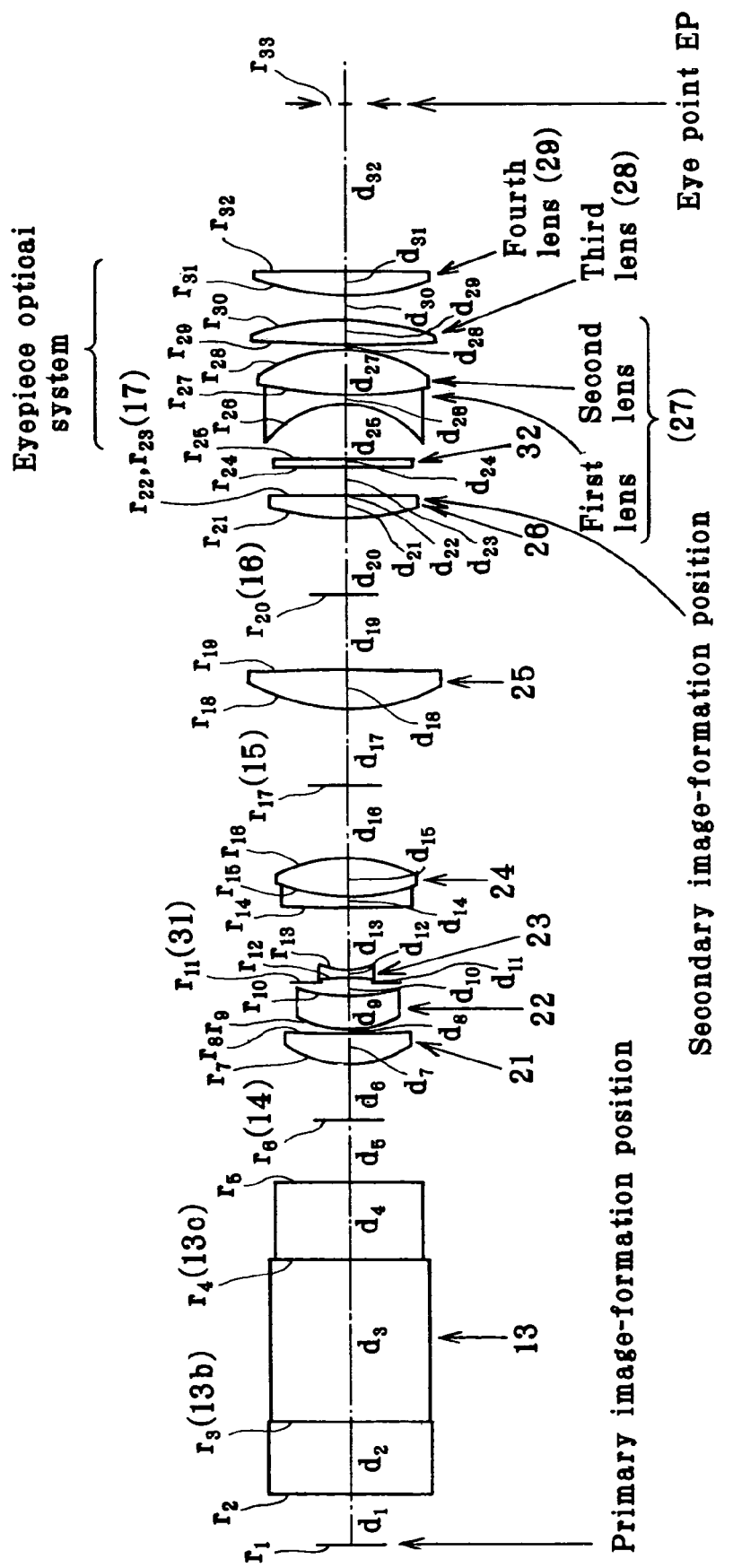
FIG. 30 is illustrative in section of the finder optical system according to one embodiment of the fourth aspect of the invention, as taken apart along its optical axis.

FIG. 30 is a sectional view of the finder optical system of Embodiment 1 according to the fourth aspect of the invention, as taken apart along its optical axis. This embodiment is substantially the same in numerical data as the finder optical system of Numerical Embodiment 1 according to the second aspect of the invention.

Referring to FIG. 30, the relay optical system in this finder optical system is made up of a first lens of positive refracting power indicated at surfaces $r_7$-$r_8$, a second lens of positive refracting power indicated at surfaces $r_9$-$r_{10}$, a third lens of negative refracting power indicated at surfaces $r_{12}$-$r_{13}$, a cemented doublet of positive refracting power composed of a fourth lens of negative refracting power and a fifth lens of positive refracting power and indicated at surfaces $r_{14}$-$r_{16}$, a six lens of positive refracting power indicated at surfaces $r_{18}$-$r_{19}$, and a condenser lens of positive refracting power indicated at surface $r_{21}$-$r_{22}$, and is operable to re-form a subject image at the secondary image-formation position indicated at surface $r_{23}$, wherein the subject image is formed as a primary image on the primary image-formation position indicated at surface $r_1$. Between the second lens and the third lens, there is an aperture stop indicated at surface $r_{11}$. In this embodiment, the secondary image-formation position indicated at surface $r_{23}$ is in alignment with the surface $r_{22}$ of the condenser lens 26 that faces away the primary image-formation side.

The image re-formed at the secondary image-formation position $r_{23}$ is magnified and viewed through the pupil of the viewer positioned at surface $r_{33}$, viz., the eye point EP via the eyepiece optical system made up of a cemented doublet of a first lens consisting of a double-concave negative lens and a second lens consisting of a double-convex positive lens and indicated at surfaces $r_{26}$-$r_{28}$, a third lens consisting of a double-convex positive lens indicated at surfaces $r_{29}$-$r_{30}$, and a fourth lens consisting of a plano-convex positive lens indicated at surfaces $r_{31}$-$r_{32}$.

In the arrangement of FIG. 30, the surfaces $r_2$-$r_5$ between the primary image-formation position and the first lens in the relay optical system could be thought of as a prism 13 (described later) for bending the optical axis, the surface $r_6$ could be thought of as a mirror 14 (described later) for bending the optical axis, the surface $r_{17}$ between the fifth lens and the sixth lens forming together a part of the relay optical system could be thought of as a mirror 15 (described later) for bending the optical axis, and the surface $r_{20}$ between the sixth lens and the condenser lens forming together a part of the relay optical system could be thought of as a mirror 16 (described later) for bending the optical axis. A plane-parallel plate located between the secondary image-formation position and the eyepiece optical system and indicated at surfaces $r_{24}$-$r_{25}$ could be thought of as the dust-preventive glass 32 to be described later.

Numerical data on this embodiment are the same as those on Numerical Embodiment 1 according to the second aspect of the invention. However, the first, the second, the third, the fourth, the fifth, the sixth, and the condenser lens that form together the finder optical system are a positive meniscus lens convex on the primary image-formation position side, a positive meniscus lens convex on the primary image-formation position side, a double-concave negative lens, a negative meniscus lens convex on the primary image-formation position side, a double-convex positive lens, a positive meniscus lens convex on the primary image-formation position side, and a plano-convex positive lens, respectively.

Aspheric surfaces are used at the surface $r_7$ of the first lens in the finder optical system on the primary image-formation position side, both surfaces $r_{18}$ and $r_{19}$ of the sixth lens, and the surface $r_{21}$ of the condenser lens on the primary image-formation position side.

Note that in the numerical data in Numerical Embodiment 1, the relations of diopter to the diopter control surface spaces $d_{25}$ and $d_{30}$ are shown.

Figure 31:
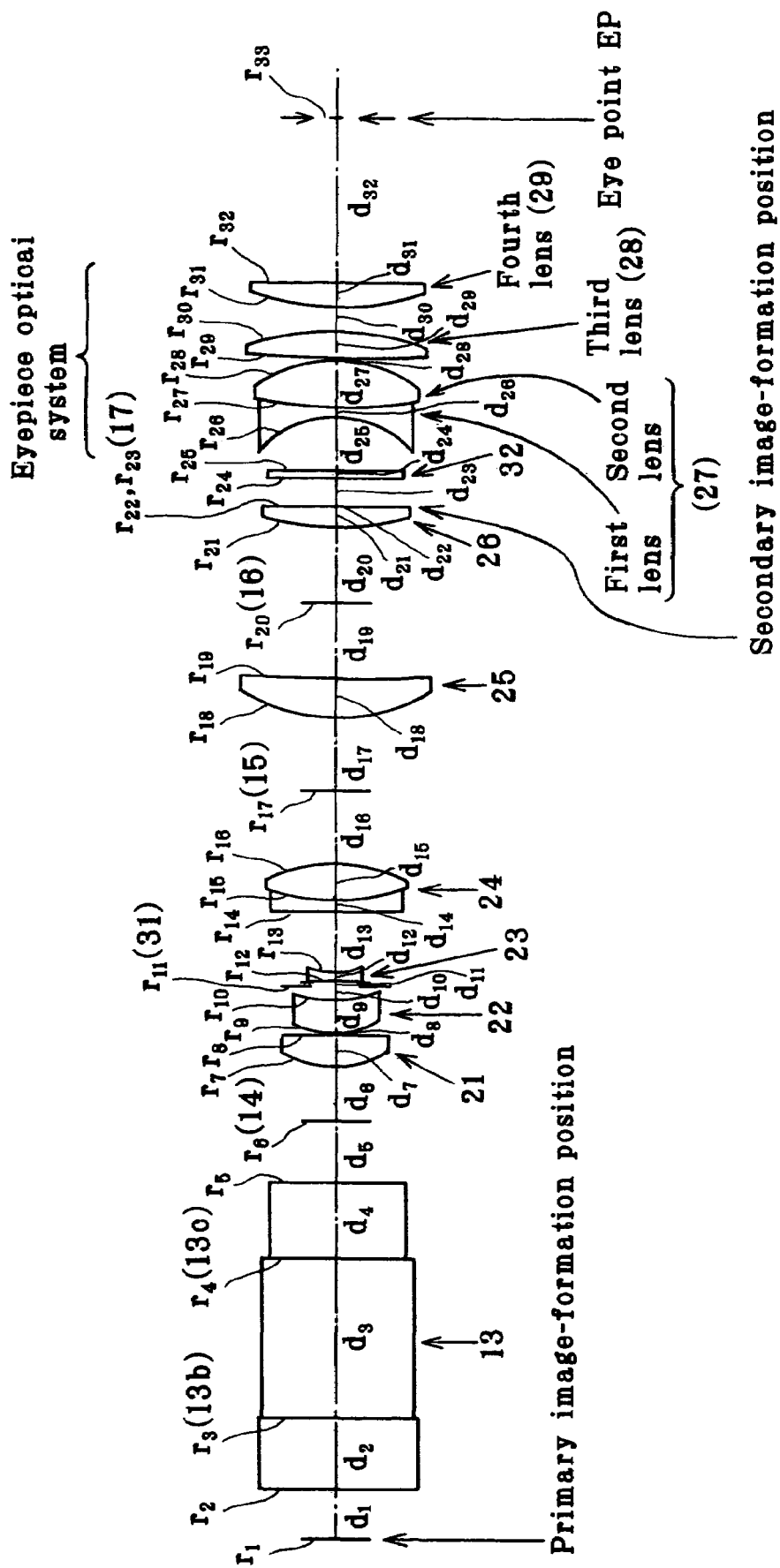
FIG. 31 is illustrative in section of the finder optical system of Embodiment 2 according to the fourth aspect of the invention, as taken apart along its optical axis.

FIG. 31 is a sectional view of the finder optical system of Embodiment 2 according to the fourth aspect of the invention, as taken apart along its optical axis. This embodiment is substantially as the same in numerical data as the finder optical system of Numerical Embodiment 2 according to the second aspect of the invention shown in FIG. 23.

Basically, this embodiment is much the same as that of FIG. 30 except that the sixth lens in the finder optical system is a double-convex positive lens, the fourth lens in the eyepiece optical system is a double-convex positive lens, and three aspheric surfaces are used: two at both surfaces $r_{18}$ and $r_{19}$ of the sixth lens in the finder optical system and one at the surface $r_{21}$ of the condenser lens on the primary image-formation position side.

Figure 32A:
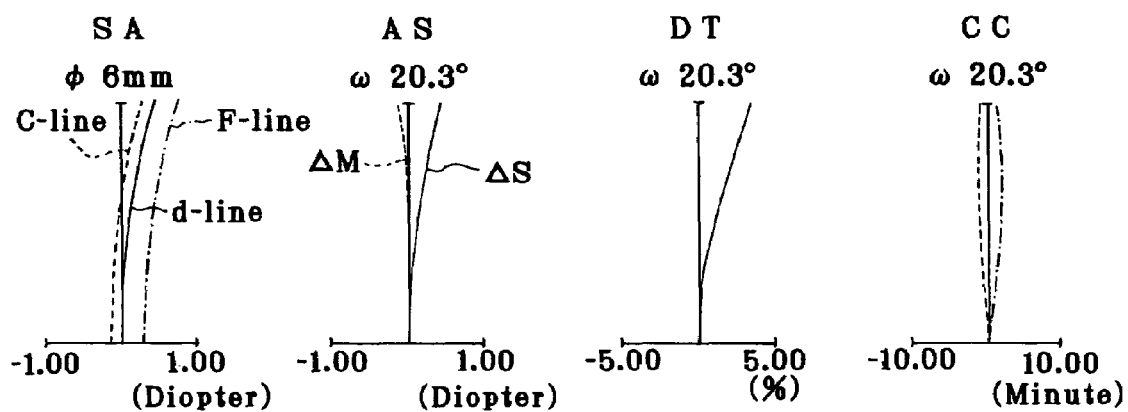
FIG. 32 is a collection of aberration diagrams for only the eyepiece optical system in Numerical Embodiment 1.
Figure 32B:
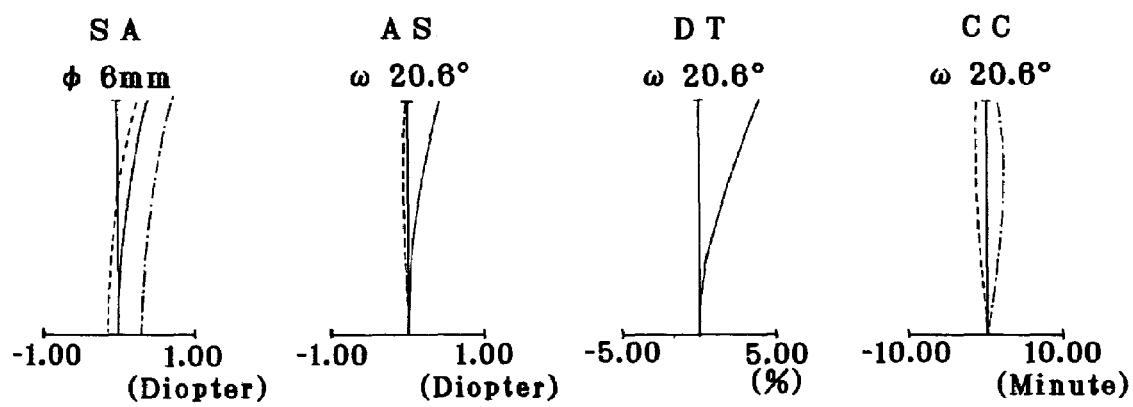
Figure 32C:
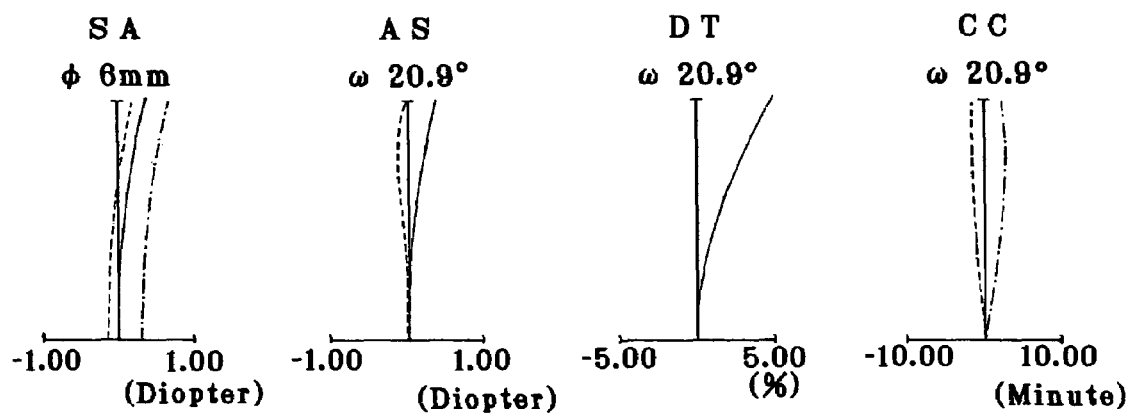
Figure 33A:
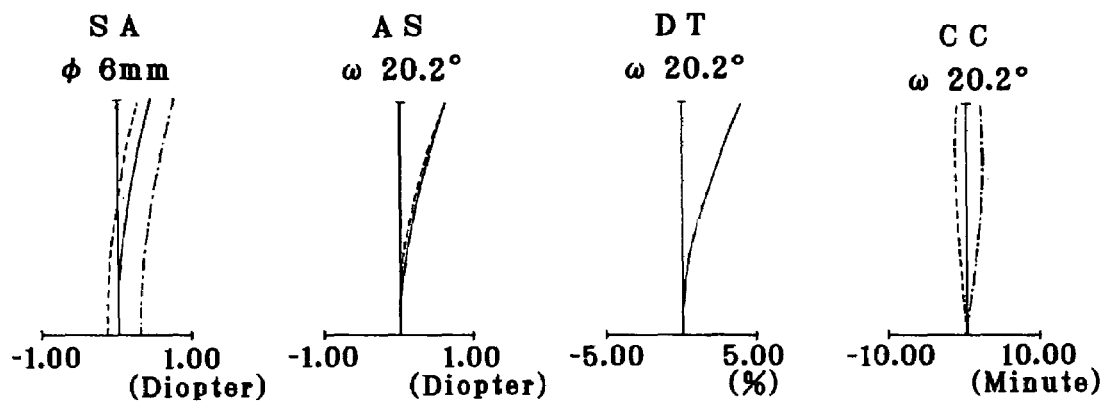
FIG. 33 is a collection of aberration diagrams for only the eyepiece optical system in Numerical Embodiment 2.
Figure 33B:
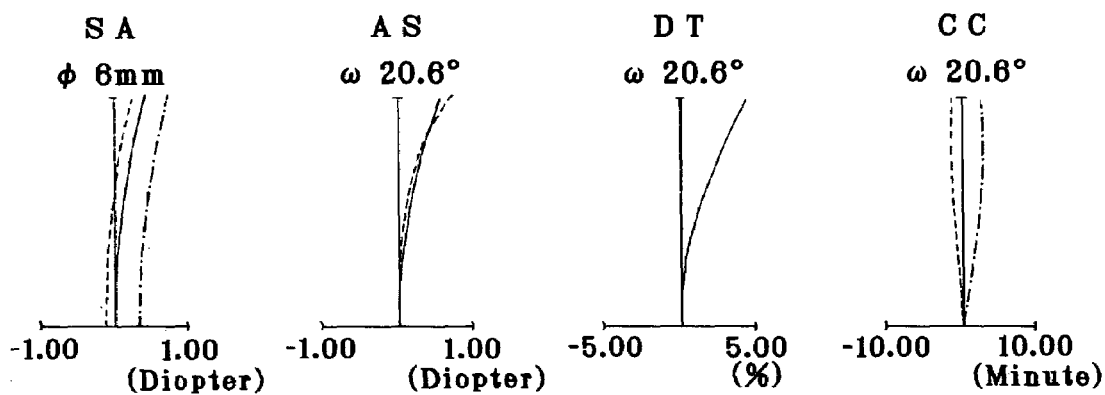
Figure 33C:
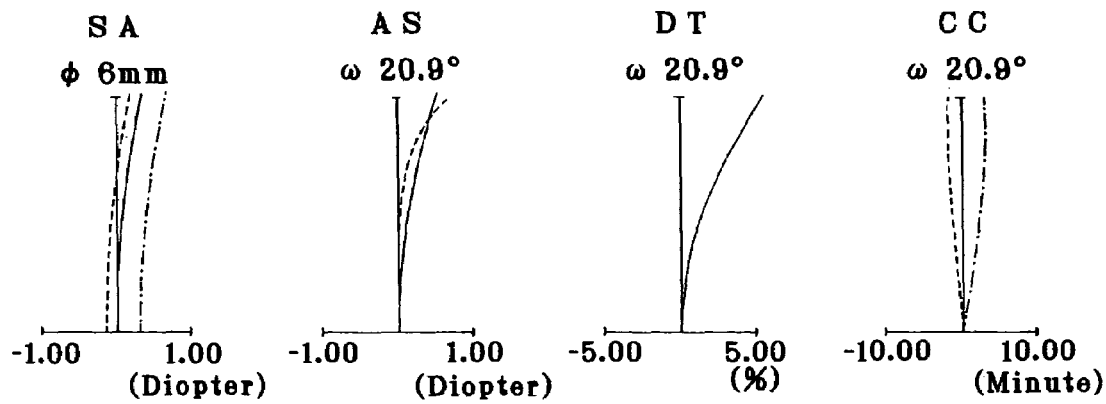

FIGS. 32 and 33 are aberration diagrams for only the eyepiece optical systems in the above Embodiments 1 and 2, respectively. Note that the aberration diagrams for the whole finder optical systems in Embodiments 1 and 2 are the same as in FIGS. 24 and 25, respectively.

In the aberration diagrams of FIGS. 32 and 33, the maximum ray height at the secondary image-formation plane is set at 9.56 mm, and 9.55 mm, respectively, and in the aberration diagrams of FIGS. 24 and 25, the maximum ray height at the primary image-formation plane is set at 11.15 mm. The maximum exit angle in FIGS. 24 and 25 is smaller than that in FIGS. 32 and 33, because presentation of information, etc. around the secondary image-formation plane is taken into consideration.

Tabulated below are the value of conditions (4-1), (4-2), (4-3) and (4-4) in Embodiments 1 and 2 above.

|  | Condition | | | |
| --- | --- | --- | --- | --- |
|  | (4-1) f123/fA | (4-2) f4/fA | (4-3) d4/fA | (4-4) fA |
| Embodiment 1 | 4.50 | 1.69 | 0.12 | 26.66 |
| Embodiment 2 | 4.42 | 1.71 | 0.12 | 26.82 |

Figure 34:
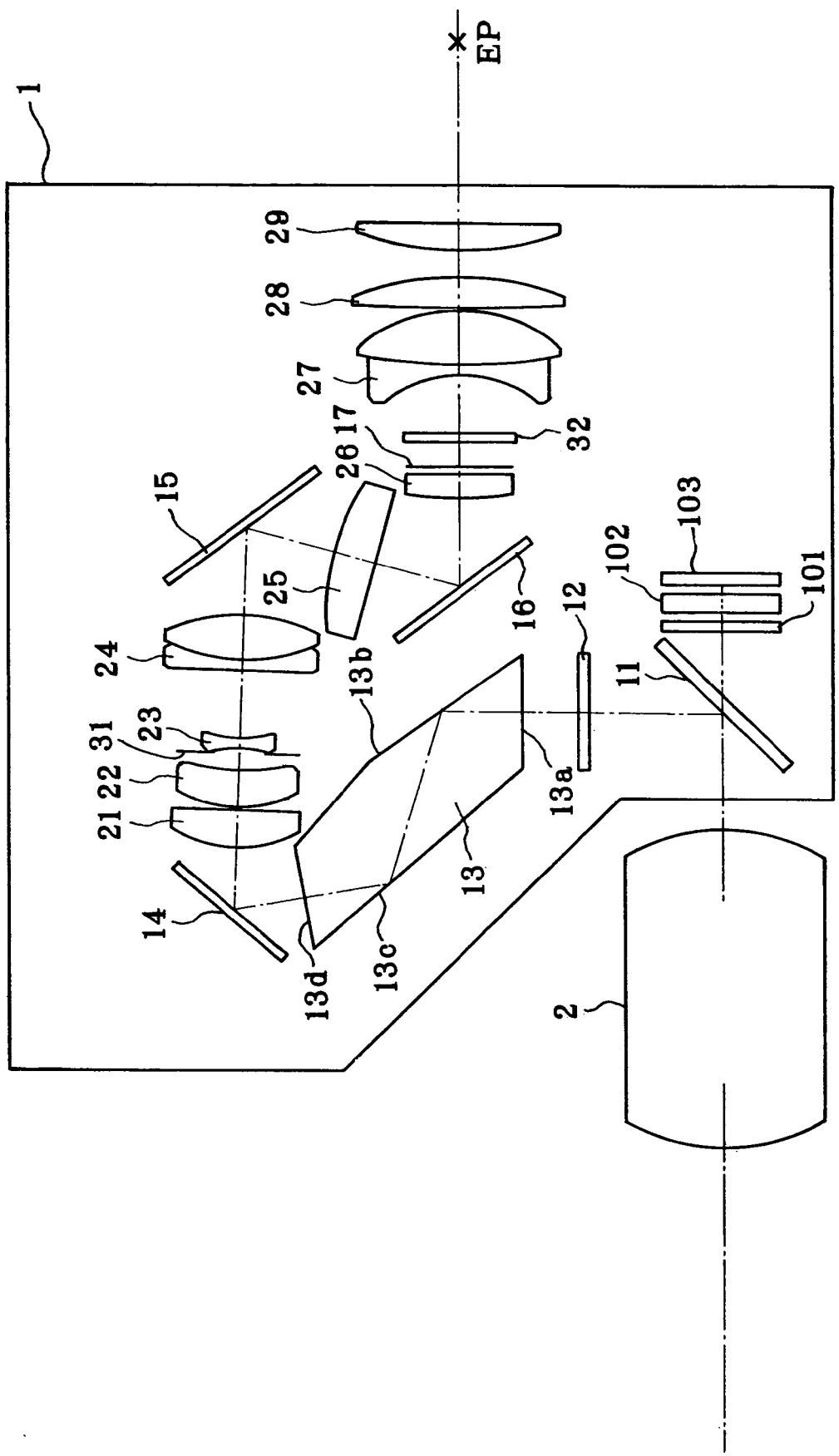
FIG. 34 is illustrative in section of the construction of a single-lens reflex camera that incorporates the finder optical system of Embodiment 1.

Reference is now made to one exemplary single-lens reflex camera to which such a finder optical system as exemplified above is applied according to the invention. FIG. 34 is a sectional view of the arrangement of the single-lens reflex camera that incorporates the finder optical system as exemplified above. In FIG. 34, reference numeral 1 is a single-lens reflex camera that incorporates that finder optical system, and 2 is an interchangeable taking lens. Note that the taking lens 2 could be integral with a camera body.

Reference is now made with reference to the order of travel of a light beam emanating from a subject and exiting the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

Figure 35:
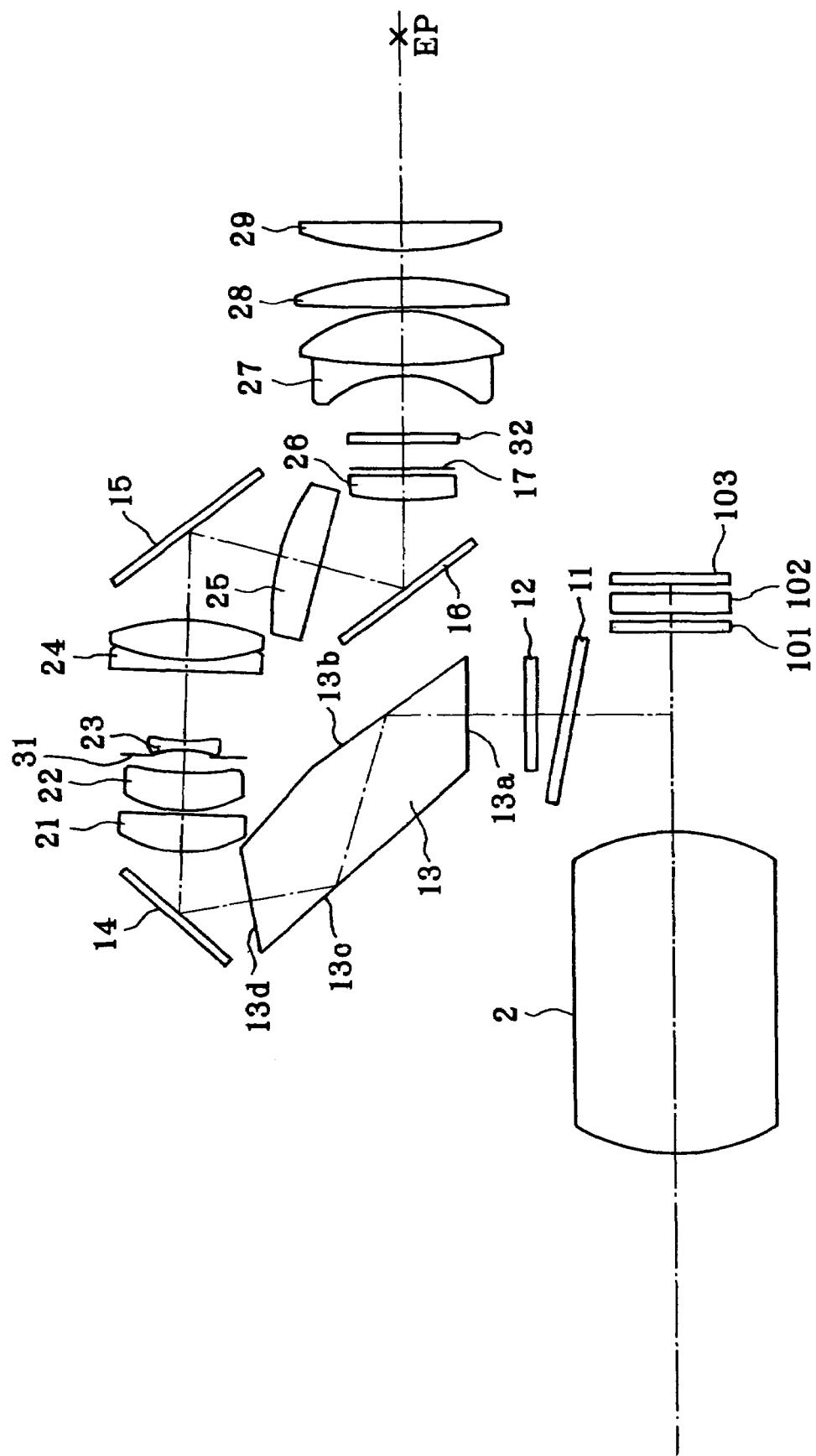
FIG. 35 is illustrative of in what state the single-lens reflex camera of FIG. 34 is during taking operation.

The light beam reflected at the quick return mirror 11 is incident on a focal plane plate 12 placed at a position optically equivalent (conjugate) to an image pickup device 103 to be described later. Referring here to FIG. 35 to be mentioned later, when a subject image is formed on the image pickup device 103, it is also formed on the focal plane plate 12. The focal plane plate 12 could also have a condenser lens function.

The light beam exiting the focal plane plate 12 is incident on a prism 13. The prism 13 has an entrance surface 13a, a reflecting surface 13b, a reflecting surface 13c and an exit surface 13d. Desirously, the entrance surface 13a is vertical to the axis of incident light. The light beam incident on the entrance surface 13a is reflected at the reflecting surface 13b in the subject direction. Light quantity losses here can be reduced by the satisfaction of the total-reflection condition. Further, the light beam is reflected in the upward direction such that the optical axis has components in the upward direction and subject direction at the reflecting surface 13c (that is, the optical axis direction lies between the subject direction and the upward direction). Light quantity losses here can be reduced by the satisfaction of the total-reflection condition. Further, the light beam leaves the prism 13 through the exit surface 13d. The exit surface 13d here is desirously vertical to the optical axis.

The light beam exiting the prism 13 is further reflected at a mirror 14 in the viewer direction, with the optical axis roughly parallel with the optical axis of the taking lens 2.

Then, the light beam transmits through lens 21, lens 22, lens 23 and lens 24 that form together the relay optical system where it is subjected to lens actions. In the embodiment of FIG. 34, the lens 21 is a positive meniscus lens tightly convex on the subject side, the lens 22 is a positive meniscus lens tightly convex on the subject side, the lens 23 is a double-concave negative lens, and the lens 24 is a cemented doublet composed of a negative meniscus lens convex on the subject side and a double-convex positive lens and having a positive composite power.

The lens groups located here are constructed such that their composite power turns positive, and required to represent a substantial part of the relay optical system. A specific lens arrangement should preferably be designed while taking aberrations, etc. into consideration. Note that an aperture stop 31 could be located near the negative lens 23 for efficient pupil transmission.

Next, the light beam is reflected at a mirror 15 to bend the optical axis in the subject direction and a downward direction, and the optical axis is reflected at a mirror 16 in the viewer direction. Here, a positive lens 25 is located between the mirrors 15 and 16, thereby improving on the image-formation capability and pupil transmission capability of the relay optical system.

The light beam reflected at the mirror 16 is incident on a condenser lens 26 placed near the secondary image-formation position 17. In the embodiment of FIG. 34, the condenser lens 26 is a plano-convex positive lens convex on the subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming together the eyepiece optical system, exiting from a camera body. Finally, the light beam is guided to the eye of the viewer.

Note that the lens 27 is tantamount to the cemented doublet of the first lens and the second lens in the eyepiece optical system of the invention. Specifically in Embodiment 1 of FIG. 34, the cemented doublet consists of a double-concave negative lens and a double-convex positive lens. The lens 28 and the lens 29 are tantamount to the third lens and the fourth lens in the eyepiece optical system of the invention, respectively. Referring specifically to Embodiment 1 of FIG. 34, the lens 28 is a double-convex positive lens, and the lens 29 is a plano-convex positive lens.

FIG. 35 is illustrative of in what state the single-lens reflex camera of FIG. 34 is operated. Note however that the outline indicative of the camera body is not drawn.

Upon operation, the quick return mirror 11 is retracted back from the optical path, and a light beam leaving the taking lens 2 transmits successively through a filter 101 and a filter 102, entering the image pickup device 103. The filers 101 and 102 are each imparted with some functions such as an infrared cut filter function, a low-pass filter function and a dust-preventive filter function, and their number is not necessarily limited to two. The image pickup device 103 is an electronic image pickup device such as CCS or C-MOS, or a silver halide film.

In the embodiment using the inventive finder optical system, it is understood that misalignments in the conjugate relation between the primary image-formation position and the second image-formation position, if any, could be corrected by control of one or two spaces in the relay optical system.

When two spaces are used, that control could be implemented by axial movement of a part of the relay optical system in such a way as to reduce the sum of control amount down to zero.

To allow the optical axis of the taking lens 2 to have a given relation to the optical axis of the eyepiece system made up of lenses 27-29, the positions of the mirrors 14-16 located in the relay optical system could be controlled and corrected.

Alternatively, a part or the whole of the eyepiece optical system could be moved in correspondence to the viewer's diopter.

In the invention, a lens function surface could be located near the secondary image-formation plane or between the secondary image-formation plane and the lens group in the eyepiece optical system to implement condenser or other functions.

The relay type finder optical system, and the single-lens reflex camera, according to the fifth aspect of the invention is now explained with reference to one specific embodiment.

Figure 36:
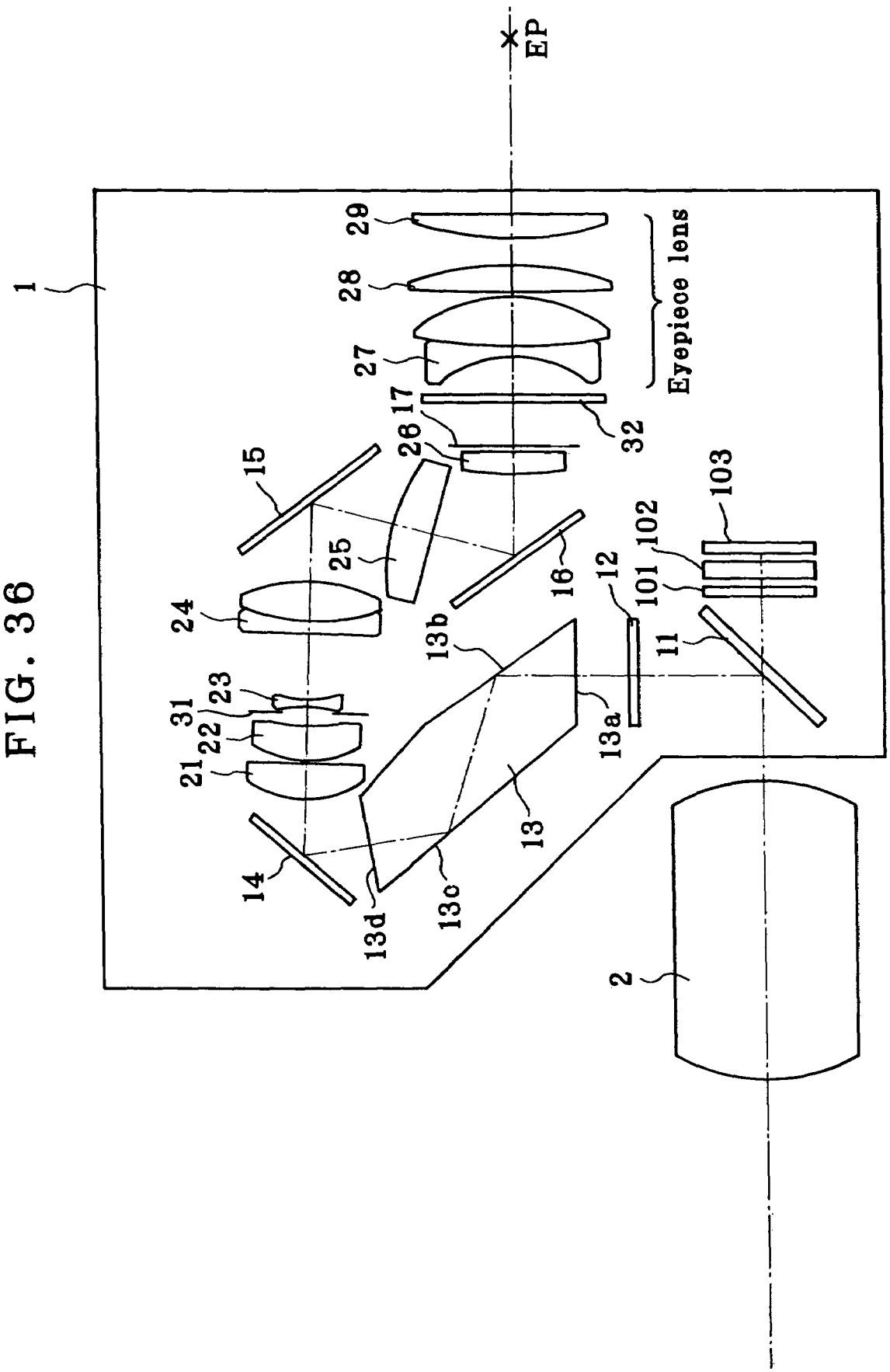
FIG. 36 is illustrative in section of the construction of a single-lens reflex camera that incorporates the relay type finder optical system according to one embodiment according to the fifth aspect of the invention.

FIG. 36 is a sectional view of the arrangement of a single-lens reflex camera on which the relay type finder optical system according to one embodiment of the fourth aspect of the invention. In FIG. 36, reference numeral 1 is a single-lens reflex camera that incorporates that relay type finder optical system, and 2 is an interchangeable taking lens. Note that the taking lens 2 could be integral with a camera body.

Reference is now made with reference to the order of travel of a light beam emanating from a subject and exiting the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

Figure 37:
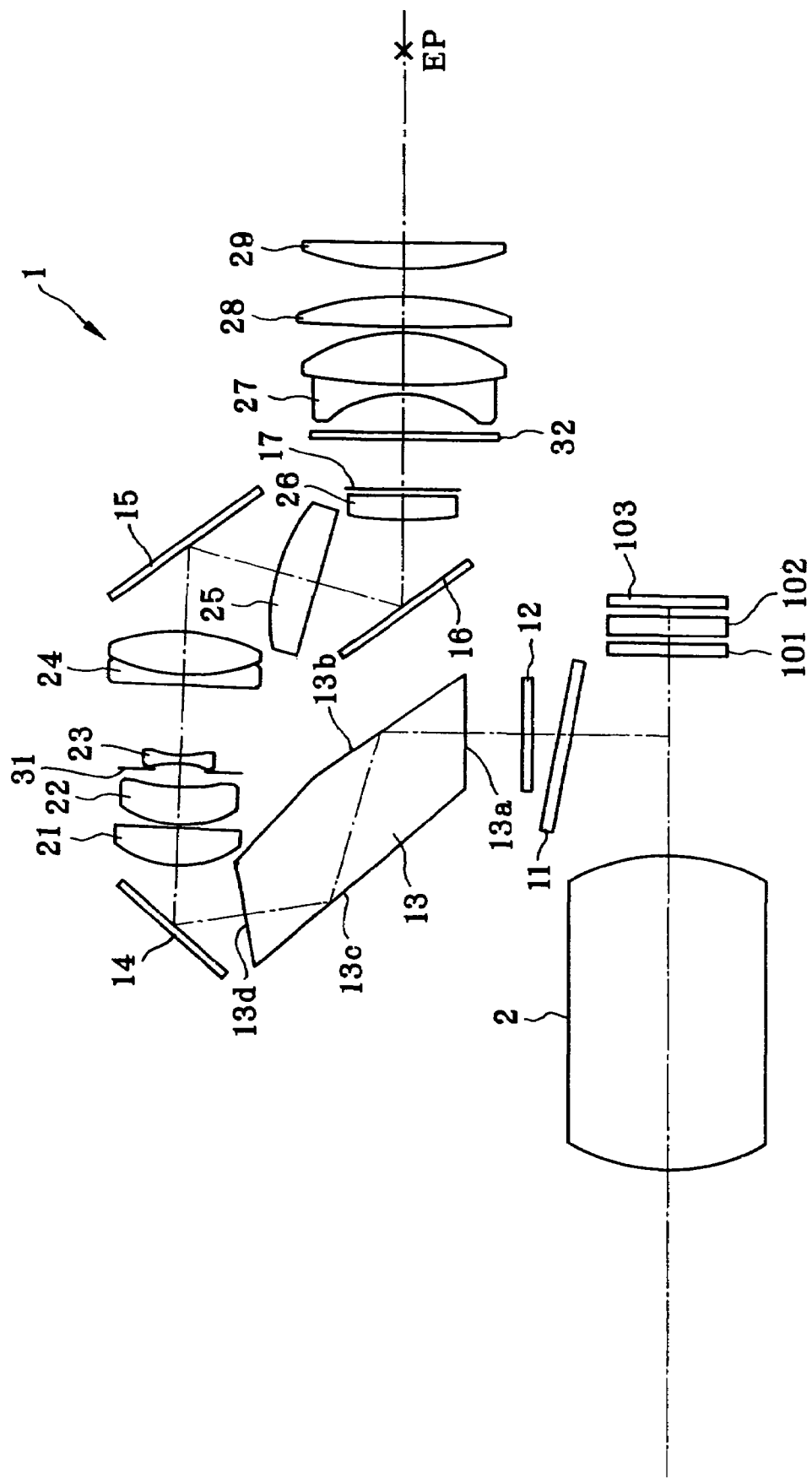
FIG. 37 is illustrative of in what state the single-lens reflex camera of FIG. 36 is during taking operation.

The light beam reflected at the quick return mirror 11 is incident on a focal plane plate 12 placed at a position optically equivalent (conjugate) to an image pickup device 103 to be described later. Referring here to FIG. 37 to be mentioned later, when a subject image is formed on the image pickup device 103, it is also formed on the focal plane plate 12. The focal plane plate 12 could also have a condenser lens function.

The light beam exiting the focal plane plate 12 is incident on a prism 13. Corresponding to the aforesaid prism P1, the prism 13 has an entrance surface 13a, a reflecting surface 13b, a reflecting surface 13c and an exit surface 13d. Desirously, the entrance surface 13a is vertical to the incident optical axis. The light beam incident on the entrance surface 13a is reflected at the reflecting surface 13b in the subject direction. Light quantity losses here can be reduced by the satisfaction of the total-reflection condition. Further, the light beam is reflected in the upward direction such that the optical axis has components in the upward direction and subject direction at the reflecting surface 13c (that is, the optical axis direction lies between the subject direction and the upward direction).

Light quantity losses here can be reduced by the satisfaction of the total-reflection condition. Note that the reflecting surfaces 13b and 13c are tantamount to the aforesaid set PM of back-to-back two reflecting surfaces. Further, the light beam leaves the prism 13 through the exit surface 13d. The exit surface 13d here is desirously vertical to the optical axis.

The light beam exiting the prism 13 is further reflected at a mirror 14 in the viewer direction, with the optical axis roughly parallel with the optical axis of the taking lens 2.

Then, the light beam transmits through lens 21, lens 22, lens 23 and lens 24 that form together the relay optical system where it is subjected to lens actions. In Embodiment 1 of FIG. 36 (corresponding to Numerical Embodiment 2), the lens 21 is a positive meniscus lens tightly convex on the subject side, the lens 22 is a positive meniscus lens tightly convex on the subject side, the lens 23 is a double-concave negative lens, and the lens 24 is a cemented doublet composed of a negative meniscus lens convex on the subject side and a double-convex positive lens and having a positive composite power.

The lens groups located here are constructed such that their composite power turns positive, and required to represent a substantial part of the relay optical system. A specific lens arrangement should preferably be designed while taking aberrations, etc. into consideration.

It is then preferable that at least one positive lens (tantamount to the lens 21 or the lens 22 in Embodiment 1 of FIG. 36) is provided, at least one negative lens (tantamount to the lens 23 in Embodiment 1 of FIG. 36) is located on the side of the positive lens facing the secondary image-formation position, and at least one positive lens (tantamount to the positive lens 24 in Embodiment 1 of FIG. 36) is located on the side of the negative lens facing the secondary image-formation position, because the principal points are set in this region so that magnification and optical performance are easily ensured. Note that an aperture stop 31 could be positioned near that negative lens for efficient pupil transmission.

Next, the light beam is reflected at a mirror 15 to bend the optical axis in the subject direction and a downward direction, and the optical axis is reflected at a mirror 16 in the viewer direction. Here, a positive lens 25 is located between the mirrors 15 and 16, thereby improving on the image-formation capability and pupil transmission capability of the relay optical system.

The light beam reflected at the mirror 16 is incident on a condenser lens 26 placed near the secondary image-formation position 17. In Embodiment 1 of FIG. 36, the condenser lens 26 is a plano-convex positive lens convex on the subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming together the eyepiece optical system, exiting from a camera body. Finally, the light beam is guided to the eye of the viewer.

FIG. 37 is illustrative of in what state the single-lens reflex camera of FIG. 36 is operated. Note however that the outline indicative of the camera body is not drawn.

Upon operation, the quick return mirror 11 is retracted back from the optical path, and a light beam leaving the taking lens 2 transmits successively through a filter 101 and a filter 102, entering the image pickup device 103. The filers 101 and 102 are each imparted with some functions such as an infrared cut filter function, a low-pass filter function and a dust-preventive filter function, and their number is not necessarily limited to two. The image pickup device 103 is an electronic image pickup device such as CCS or C-MOS, or a silver halide film.

Figure 38:
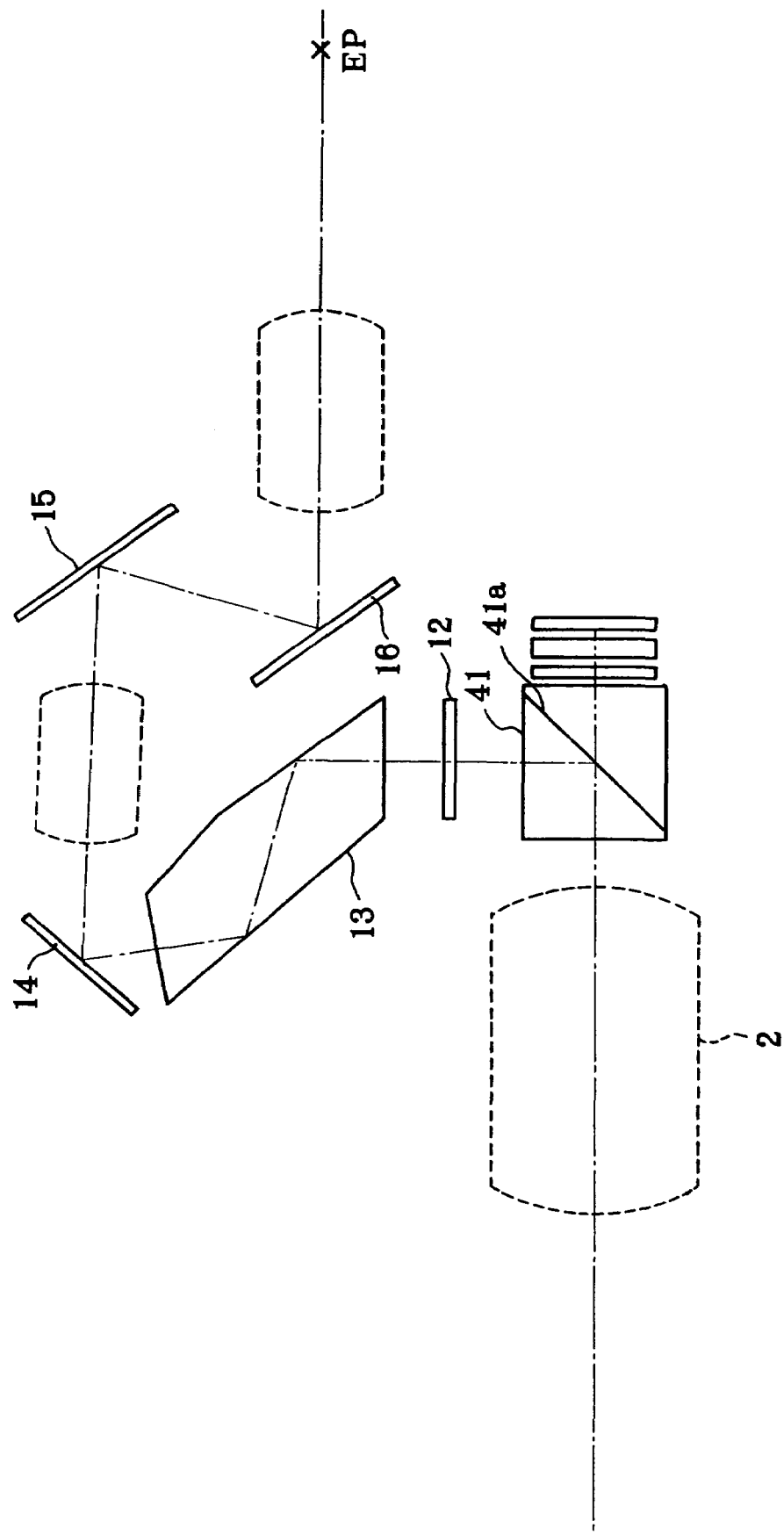
FIG. 38 is illustrative in schematic of one embodiment wherein a prism group having a half-silvered mirror surface is used in plane of the quick return mirror in FIG. 36.

FIG. 38 is a schematic representation of an arrangement wherein the quick return mirror of FIG. 36 is replaced by a prism group 41 having a half-silvered mirror plane 41a. Otherwise, this arrangement is the same as in FIG. 36, and so will not be set forth any longer (especially regarding the lens system). With this arrangement, a subject could be photographed at the same as it is viewed.

Figure 39:
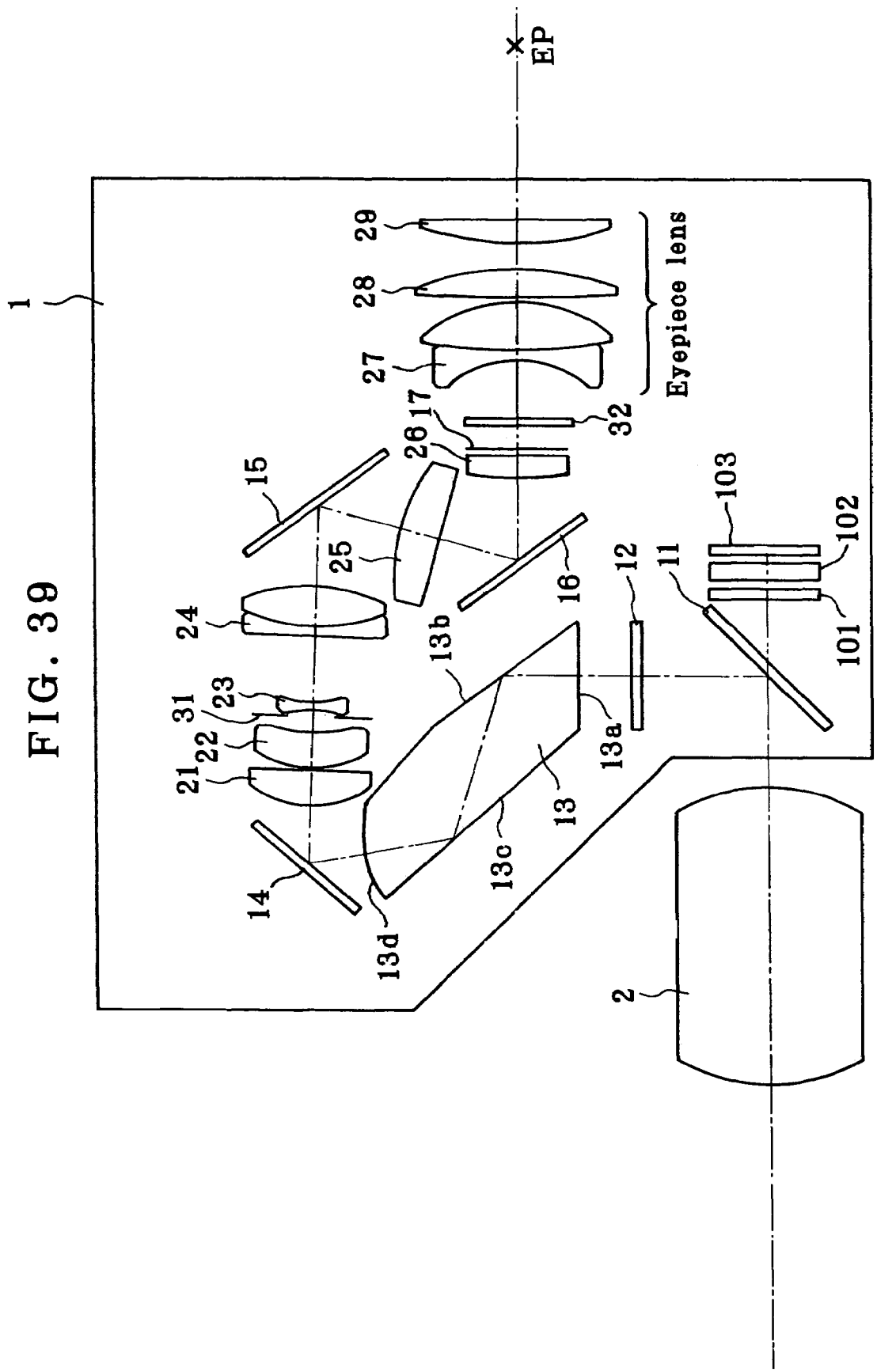
FIG. 39 is illustrative, as in FIG. 36, of a modification wherein the prism is allowed to have a prism function.

FIG. 39 is illustrative of a modification to the arrangement of FIG. 36, wherein a lens function is imparted to a prism 13 tantamount to the prism P1. In FIG. 39, reference numeral 1 is a single-lens reflex camera that incorporates the relay type finder optical system embodied herein, and 2 is an interchangeable taking lens. Note that the taking lens could be integral with a camera body.

Reference is now made with reference to the order of travel of a light beam emanating from a subject and exiting the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

The light beam reflected at the quick return mirror 11 is incident on a focal plane plate 12 placed at a position optically equivalent (conjugate) to an image pickup device 103 to be described later. Referring here to FIG. 37 to be mentioned later, when a subject image is formed on the image pickup device 103, it is also formed on the focal plane plate 12. The focal plane plate 12 could also have a condenser lens function.

The light beam exiting the focal plane plate 12 is incident on a prism 13. Corresponding to the aforesaid prism P1, the prism 13 has an entrance surface 13a, a reflecting surface 13b, a reflecting surface 13c and an exit surface 13d. Desirously, the entrance surface 13a is vertical to the incident optical axis. The light beam incident on the entrance surface 13a is reflected at the reflecting surface 13b in the subject direction. Light quantity losses here can be reduced by the satisfaction of the total-reflection condition. Further, the light beam is reflected in the upward direction such that the optical axis has components in the upward direction and subject direction at the reflecting surface 13c (that is, the optical axis direction lies between the subject direction and the upward direction). Light quantity losses here can be reduced by the satisfaction of the total-reflection condition. Note that the reflecting surfaces 13b and 13c are tantamount to the aforesaid set PM of back-to-back two reflecting surfaces. Further, the light beam leaves the prism 13 through the exit surface 13d. The exit surface 13d here is in a convex lens form, and shares a part of the function of the relay optical system.

The light beam exiting the prism 13 is further reflected at a mirror 14 in the viewer direction, with the optical axis roughly parallel with the optical axis of the taking lens 2.

Then, the light beam transmits through lens 21, lens 22, lens 23 and lens 24 that form together the relay optical system where it is subjected to lens actions. In the embodiment of FIG. 39, the lens 21 is a positive meniscus lens tightly convex on the subject side, the lens 22 is a positive meniscus lens tightly convex on the subject side, the lens 23 is a double-concave negative lens, and the lens 24 is a cemented doublet composed of a negative meniscus lens convex on the subject side and a double-convex positive lens and having a positive composite power.

The lens groups located here are constructed such that their composite power turns positive, and required to represent a substantial part of the relay optical system. A specific lens arrangement should preferably be designed while taking aberrations, etc. into consideration.

It is then preferable that at least one positive lens (tantamount to the lens 21 or the lens 22 in the embodiment of FIG. 39) is provided, at least one negative lens (tantamount to the lens 23 in the embodiment of FIG. 39) is located on the side of the positive lens facing the secondary image-formation position, and at least one positive lens (tantamount to the positive lens 24 in the embodiment of FIG. 39) is located on the side of the negative lens facing the secondary image-formation position, because the principal points are set in this region so that magnification and optical performance are easily ensured. Note that an aperture stop 31 could be positioned near that negative lens for efficient pupil transmission.

Next, the light beam is reflected at a mirror 15 to bend the optical axis in the subject direction and a downward direction, and the optical axis is reflected at a mirror 16 in the viewer direction. Here, a positive lens 25 is located between the mirrors 15 and 16, thereby improving on the image-formation capability and pupil transmission capability of the relay optical system.

The light beam reflected at the mirror 16 is incident on a condenser lens 26 placed near the secondary image-formation position 17. In the embodiment of FIG. 39, the condenser lens 26 is a plano-convex positive lens convex on the subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming together the eyepiece optical system, exiting from a camera body. Finally, the light beam is guided to the eye of the viewer.

Figure 40:
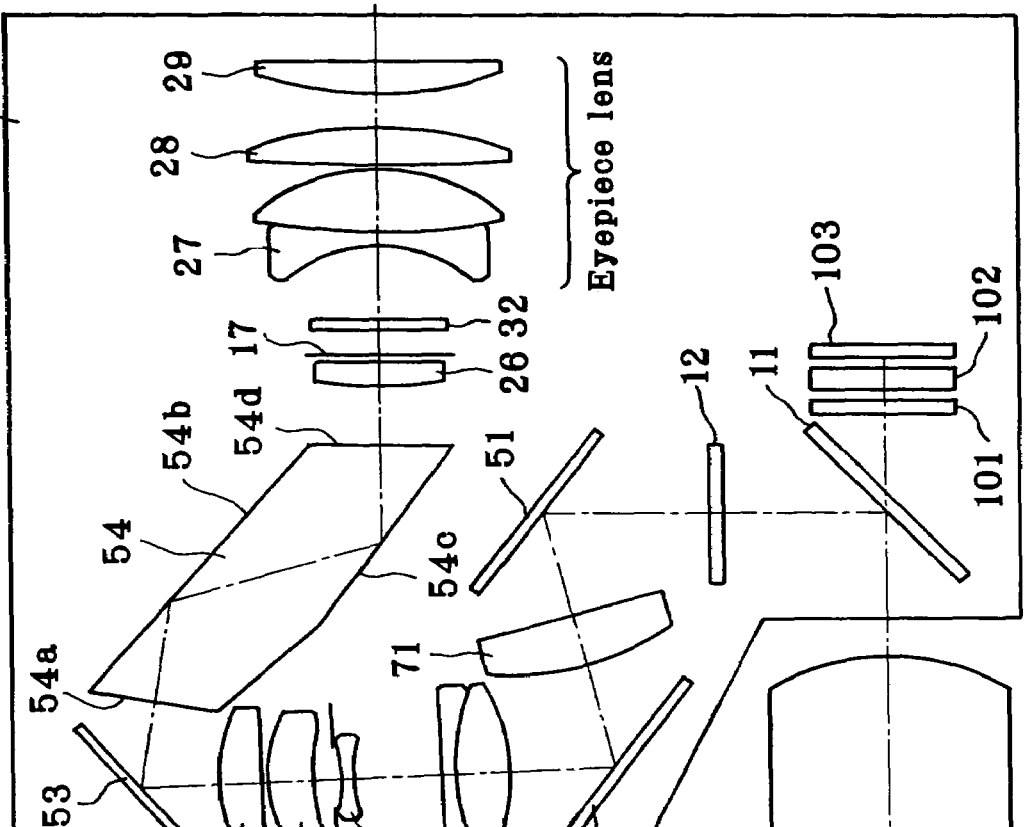
FIG. 40 is illustrative, as in FIG. 36, of an embodiment wherein the prism is located between the positive lens group and the secondary image-formation position.

FIG. 40 is illustrative, as in FIG. 36, of an embodiment wherein the aforesaid prism P1 is located between the aforesaid positive lens group GL and the secondary image-formation position. In FIG. 39, reference numeral 1 is a single-lens reflex camera that incorporates the relay type finder optical system embodied herein, and 2 is an interchangeable taking lens. Note that the taking lens could be integral with a camera body.

Reference is now made with reference to the order of travel of a light beam emanating from a subject and exiting the taking lens 2.

A light beam emanating from the taking lens 2 is reflected at a quick return mirror 11 at an angle of reflection of 90° in this embodiment. Note here that when a half-silvered mirror is used as the quick return mirror 11, the light beam transmitting through it could be guided to a focal detection means (not shown).

In what follows, on the basis of the position where the optical axis exiting from the taking lens 2 is reflected at the quick return mirror 11, a direction which is vertical to the optical axis exiting from the taking lens 2 and in which the optical axis is reflected at the quick return mirror 11 will be referred to as an upward direction, a direction which is parallel with the optical axis of the taking lens 2 and in which the taking lens 2 is located will be called a subject direction, and a direction reverse to the direction of locating the taking lens 2 will be called a viewer direction.

The light beam reflected at the quick return mirror 11 is incident on a focal plane plate 12 placed at a position optically equivalent (conjugate) to an image pickup device 103 to be described later. Referring here to FIG. 37 to be mentioned later, when a subject image is formed on the image pickup device 103, it is also formed on the focal plane plate 12. The focal plane plate 12 could also have a condenser lens function.

The light beam exiting the focal plane plate 12 has an optical axis acutely reflected at a mirror 51 in the subject direction, and is then incident on a positive lens 71 that is intended to improve on the image-formation capability or the pupil transmission capability of the relay optical system.

Further, the optical axis is acutely reflected at a mirror 52 in the upward direction, and then subjected to lens actions at lenses 72, 73, 74 and 75 forming together the relay optical system. The lens 72 is a cemented doublet composed of a positive lens and a negative lens and having generally positive power, the lens 73 is a negative lens, the lens 74 is a positive lens, and the lens 75 is a positive lens. The lenses 72-75 are tantamount to the aforesaid positive lens group RL. Note that an aperture stop 31 could be located near the negative lens 73 for efficient pupil transmission.

Further, the light beam is reflected at a mirror 53 in the viewer direction for incidence on a prism 54 tantamount the aforesaid prism P1. The prism 54 has an entrance surface 54a, a reflecting surface 54b, a reflecting surface 54c and an exit surface 54d. Desirously, the entrance surface 54a is vertical to the incident optical axis. The light beam incident on the entrance surface 543a is reflected at the reflecting surface 54b in a direction having components in both a downward direction and the subject direction. Light quantity losses here can be reduced by the satisfaction of the total-reflection condition. Further, the light beam has the optical axis reflected at the reflecting surface 54c in the viewer direction. Light quantity losses here can be reduced by the satisfaction of the total-reflection condition. Note that the reflecting surfaces 54b and 54c are tantamount to the aforesaid set PM of back-to-back two reflecting surfaces. Further, the light beam leaves the prism 54 through the exit surface 54d. The exit surface 54d here is desirously vertical to the optical axis.

The light beam exiting the prism 54 is incident on a condenser lens 26 placed near the secondary image-formation position 17. In the embodiment of FIG. 40, the condenser lens 26 is a plano-convex positive lens convex on the subject side, with its plane side substantially in alignment with the secondary image-formation position 17.

Further, the light beam passes through a dust-preventive glass 32. The dust-preventive glass 32 cooperates with other frame or the like to prevent dusts and other contaminants from deposition onto lens surfaces near the secondary image-formation position 17.

Further, the light beam is subjected to lens actions at lens 27, lens 28 and lens 29 forming together the eyepiece optical system (eyepiece lens system), exiting from a camera body.

Finally, the light beam is guided to the eye of the viewer.

Figure 41:
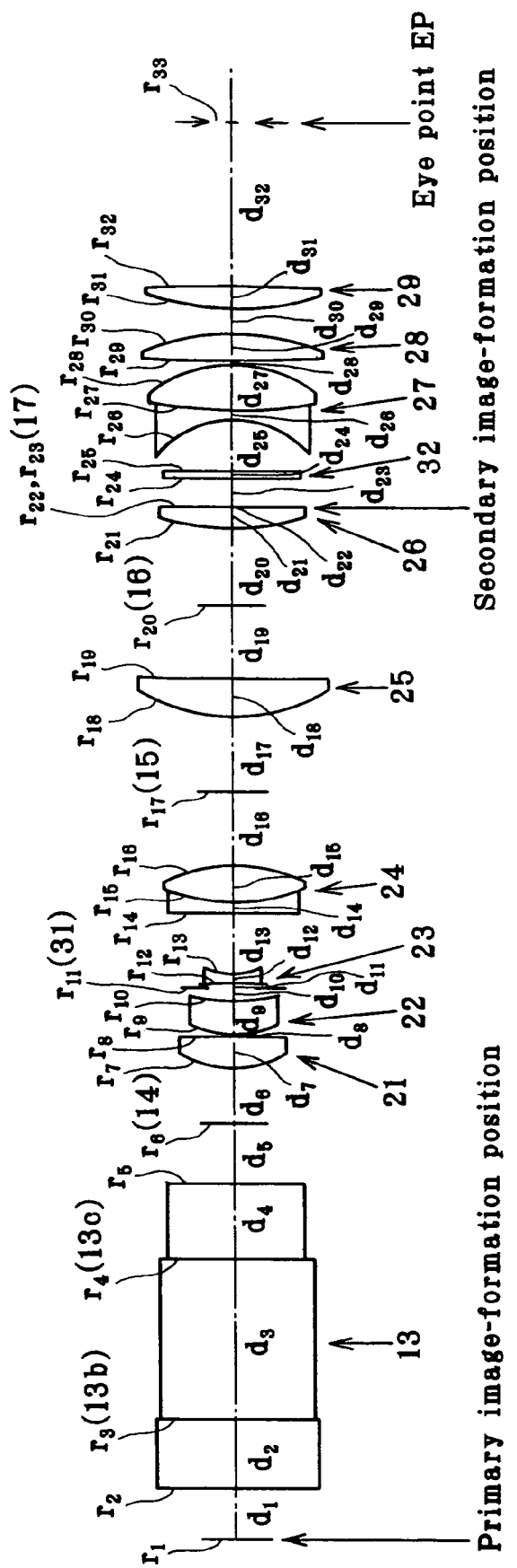
FIG. 41 is illustrative in section of the finder optical system of Numerical Embodiment 2, as taken apart along its optical axis.

FIG. 41 is a section view of the finder optical system of Numerical Embodiment 2 corresponding to the finder optical system of FIG. 36, as taken apart along its optical axis, with its numerical data identical with those in Numerical Embodiment 2 according to the second aspect of the invention.

In FIG. 41, the respective optical members in FIG. 36 are indicated by reference numerals. Referring again to this, surface $r_1$ corresponds to the primary image-formation position on the focal plane plate 12, and surfaces $r_2$-$r_5$ correspond to the prism 13, wherein the surface $r_2$ corresponds to the entrance surface 13a, the surface $r_3$ to the reflecting surface 13b, the surface $r_4$ to the reflecting surface 13c, and the surface $r_5$ to the exit surface 13d.

Surface $r_6$ corresponds to the mirror 14, surfaces $r_7$-$r_8$ to the lens 21, surfaces $r_9$-$r_{10}$ to the lens 22, surface $r_{11}$ to the aperture stop 31, surfaces $r_{12}$-$r_{13}$ to the lens 23, and $r_{14}$-$r_{16}$ to the lens 24.

Surface $r_{17}$ corresponds to the mirror 15, surfaces $r_{18}$-$r_{19}$ to the positive lens 25, surface $r_{20}$ to the mirror 16, surfaces $r_{21}$-$r_{22}$ to the condenser lens 26, and surface $r_{23}$ in alignment with the surface $r_{22}$ to the secondary image-formation position 17.

Surfaces $r_{24}$-$r_{25}$ correspond to the dust-preventive glass 32; surfaces $r_{26}$-$r_{28}$, $r_{29}$-$r_{30}$ and $r_{31}$-$r_{32}$ correspond to the lenses 27, 28 and 29, respectively, which form together the eyepiece optical system; and surface $r_{33}$ to the pupil of the viewer, viz., the eye point EP.

In this embodiment, the relay optical system is made up of lenses 21, 22, 23, 24, 25 and 26, wherein the lens 21 is a positive meniscus lens convex on the primary image-formation position side, the lens 22 is a positive meniscus lens convex on the primary image-formation position side, the lens 23 is a double-concave negative lens, the lens 24 is a cemented doublet consisting of a negative meniscus lens convex on the primary image-formation position side and a double-convex positive lens, the positive lens 25 is a double-convex positive lens, and the condenser lens 26 is a plano-convex positive lens. The eyepiece optical system is made up of lenses 27, 28 and 29, wherein the lens 27 is a cemented doublet consisting of a double-concave negative lens and a double-convex positive lens, the lens 28 is a double-convex positive lens, and the lens 29 is a double-convex positive.

Aspheric surfaces are used at both surfaces $r_{18}$ and $r_{19}$ of the positive lens 25 and the surface $r_{21}$ of the condenser lens 26 on the primary image-formation position side.

Note that in the numerical data enumerated later, the relations of diopter to the diopter control surface spaces $d_{25}$ and $d_{30}$ are shown along with the angles of the optical axis at the reflecting surfaces 13b and 13c and mirrors 14, 15 and 16.

Figure 42:
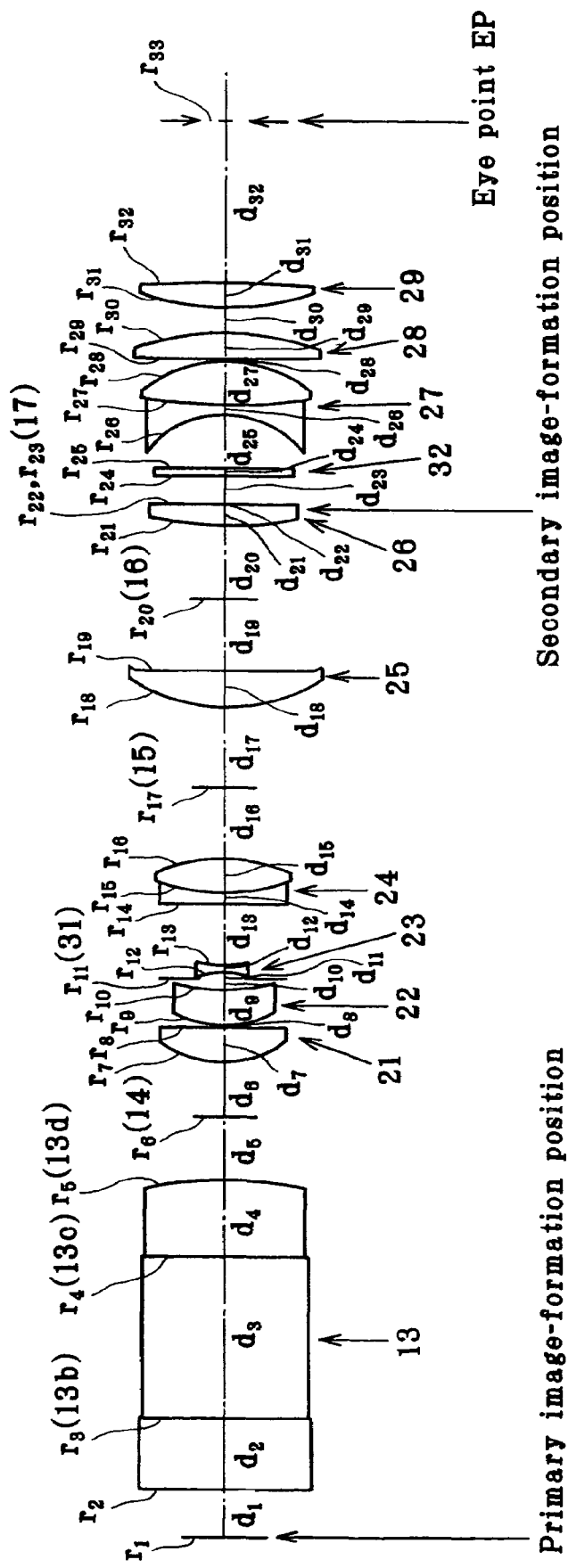
FIG. 42 is illustrative in section of the finder optical system of Numerical Embodiment 3, as taken apart along its optical axis.

FIG. 24 is a sectional view of the finder optical system of Numerical Embodiment 3 corresponding to the finder optical system of FIG. 39, as taken apart along its optical axis, with its numerical data given later. In FIG. 42, the corresponding optical members in the arrangement of FIG. 39 are indicated by reference numerals. This embodiment is basically identical with Numerical Embodiment 2 of FIG. 41, except that the surface $r_5$ of surfaces $r_2$-$r_5$ corresponding to the exit surface 13d of the prism 13 is of convex shape. The relay optical system is made up of lenses 21, 22, 23, 24, 25 and 26, wherein the lens 21 is a positive meniscus lens convex on the primary image-formation position side, the lens 22 is a positive meniscus lens convex on the primary image-formation position side, the lens 23 is a double-concave negative lens, the lens 24 is a cemented doublet consisting of a negative meniscus lens convex on the primary image-formation position side and a double-convex positive lens, the lens 25 is a double-convex positive lens, and the condenser lens 26 is a plano-convex positive lens. The eyepiece optical system is made up of lenses 27, 28 and 29, wherein the lens 27 is a cemented doublet consisting of a double-concave negative lens and a double-convex positive lens, the lens 28 is a double-convex positive lens, and the lens 29 is a plano-convex positive lens.

Four aspheric surfaces are used: one at the surface $r_7$ of the lens 21 on the primary image-formation position side, two at both surfaces $r_{18}$ and $r_{19}$ of the positive lens 25, and one at the surface $r_{21}$ of the condenser lens 26 on the primary image-formation position side.

In the numerical data given later, the relations of diopter to the diopter control surface spaces $d_{25}$ and $d_{30}$ are shown, as in Numerical Embodiment 2, along with the angles of the optical axis reflected at the reflecting surfaces 13b and 13c and the mirrors 14, 15 and 16.

In what follows, the numerical data on Numerical Embodiment 3 are given. For the symbols, etc., see Numerical Embodiments 0, 1 and 2.

| Numerical embodiment: 3 (−1diopter) | | | |
|---|---|---|---|
| $r_1 = \infty$ | $d_1 = 7.00$ | | |
| (First image plane) | | | |
| $r_2 = \infty$ | $d_2 = 10.00$ | $n_{d1} = 1.51633$ | $v_{d1} = 64.14$ |
| $r_3 = \infty$ | $d_3 = 22.80$ | $n_{d2} = 1.51633$ | $v_{d2} = 64.14$ |
| $r_4 = \infty$ | $d_4 = 10.80$ | $n_{d3} = 1.51633$ | $v_{d3} = 64.14$ |
| $r_5 = -66.31$ | $d_5 = 8.92$ | | |
| $r_6 = \infty$ | $d_6 = 7.88$ | | |
| $r_7 = 15.05$(Aspheric) | $d_7 = 5.03$ | $n_{d4} = 1.69350$ | $v_{d4} = 53.21$ |
| $r_8 = 191.03$ | $d_8 = 0.46$ | | |
| $r_9 = 14.60$ | $d_9 = 4.84$ | $n_{d5} = 1.80400$ | $v_{d5} = 46.57$ |
| $r_{10} = 23.40$ | $d_{10} = 1.84$ | | |
| $r_{11} = \infty$ (Stop) | $d_{11} = 0.80$ | | |
| $r_{12} = -13.71$ | $d_{12} = 1.10$ | $n_{d6} = 1.84666$ | $v_{d6} = 23.78$ |
| $r_{13} = 9.89$ | $d_{13} = 8.96$ | | |
| $r_{14} = 1037.06$ | $d_{14} = 1.56$ | $n_{d7} = 1.71736$ | $v_{d7} = 29.52$ |
| $r_{15} = 24.71$ | $d_{15} = 5.59$ | $n_{d8} = 1.80400$ | $v_{d8} = 46.57$ |
| $r_{16} = -20.86$ | $d_{16} = 10.41$ | | |
| $r_{17} = \infty$ | $d_{17} = 11.73$ | | |
| $r_{18} = 26.73$(Aspheric) | $d_{18} = 5.36$ | $n_{d9} = 1.52542$ | $v_{d9} = 55.78$ |
| $r_{19} = -273.06$(Aspheric) | $d_{19} = 10.41$ | | |
| $r_{20} = \infty$ | $d_{20} = 10.82$ | | |
| $r_{21} = 59.97$(Aspheric) | $d_{21} = 2.97$ | $n_{d10} = 1.52542$ | $v_{d10} = 55.78$ |
| $r_{22} = \infty$ | $d_{22} = 0.00$ | | |
| $r_{23} = \infty$ | $d_{23} = 4.14$ | | |
| (Second image plane) | | | |
| $r_{24} = \infty$ | $d_{24} = 1.00$ | $n_{d11} = 1.51633$ | $v_{d11} = 64.14$ |
| $r_{25} = \infty$ | $d_{25} = 7.79$ | | |
| $r_{26} = -14.54$ | $d_{26} = 1.37$ | $n_{d12} = 1.84666$ | $v_{d12} = 23.78$ |
| $r_{27} = 69.47$ | $d_{27} = 6.36$ | $n_{d13} = 1.60311$ | $v_{d13} = 60.64$ |
| $r_{28} = -20.03$ | $d_{28} = 0.50$ | | |
| $r_{29} = 284.63$ | $d_{29} = 3.67$ | $n_{d14} = 1.78590$ | $v_{d14} = 44.20$ |
| $r_{30} = -38.06$ | $d_{30} = 3.38$ | | |
| $r_{31} = 37.41$ | $d_{31} = 3.30$ | $n_{d15} = 1.83400$ | $v_{d15} = 37.16$ |
| $r_{32} = \infty$ | $d_{32} = 23.00$ | | |
| $r_{33} = \infty$ | | | |
| (Pupil of Observer) | | | |

Aspherical Coefficients

7th surface

K = 0.0590
$A_4 = 1.20 \times 10^{-5}$

18th surface

K = −0.8962
$A_4 = 1.73 \times 10^{-5}$

-continued

| 19th surface |
|---|
| K = −0.0551 |
| $A_4 = 1.60 \times 10^{-5}$ |
| 21th surface |
| K = −0.2550 |
| $A_4 = 6.30 \times 10^{-6}$ |

| Diopter Movement | −1diopter | −3diopter | +1diopter |
|---|---|---|---|
| $d_{25}$ | 7.79 | 5.58 | 9.96 |
| $d_{30}$ | 3.38 | 5.59 | 1.20 |

| Reflection Angle of Optical Axis | |
|---|---|
| $r_3$ | 106° |
| $r_4$ | 116° |
| $r_6$ | 78° |
| $r_{17}$ | 77° |
| $r_{20}$ | 75° |

Figure 43A:
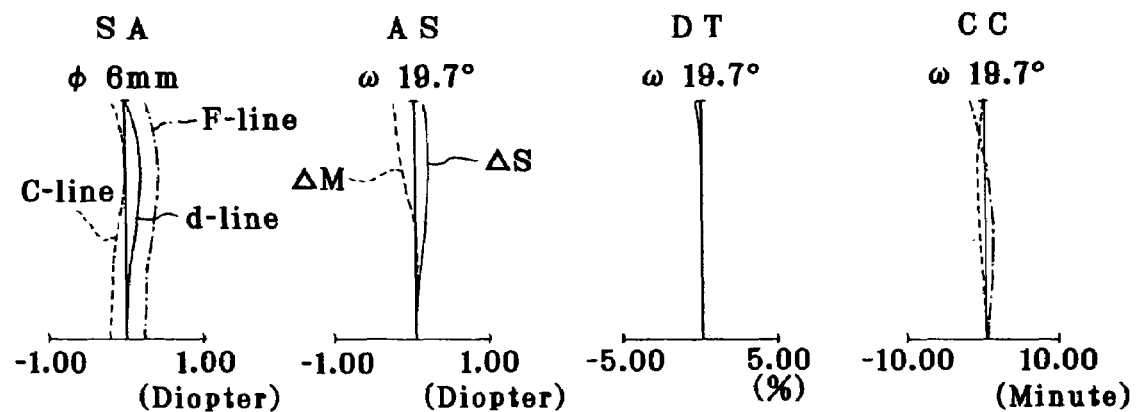
FIG. 43 is a collection of aberration diagrams for Numerical Embodiment 2.
Figure 43B:
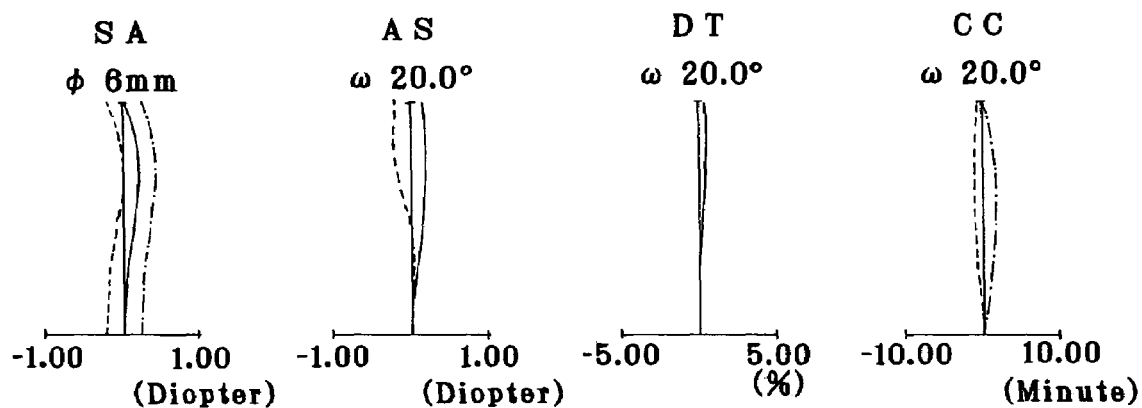
Figure 43C:
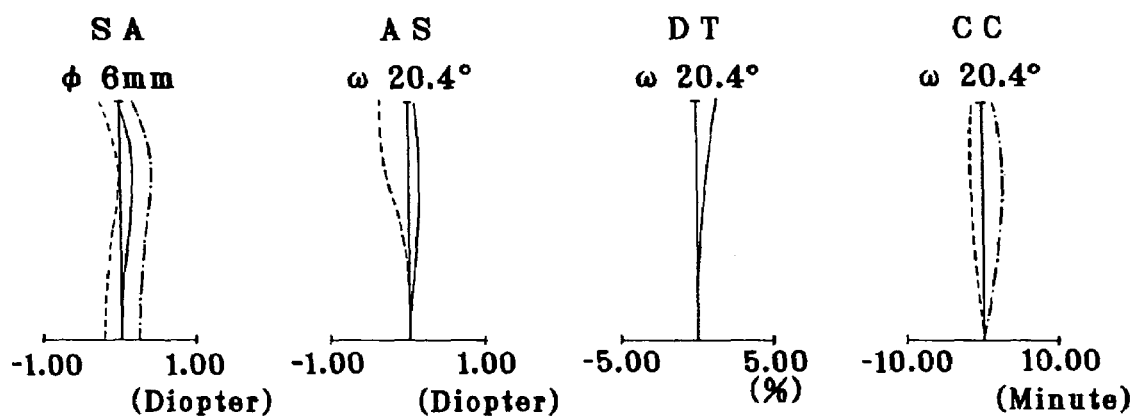
Figure 44A:
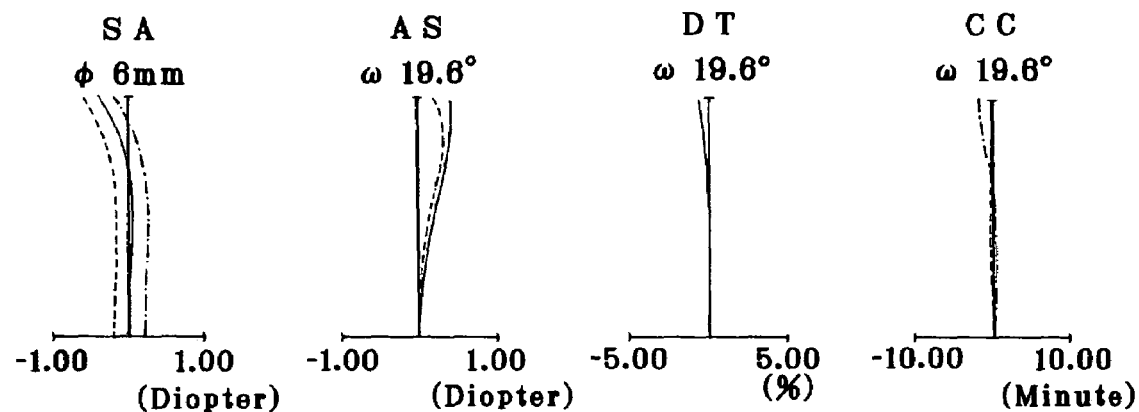
FIG. 44 is a collection of aberration diagrams for Numerical Embodiment 3.
Figure 44B:
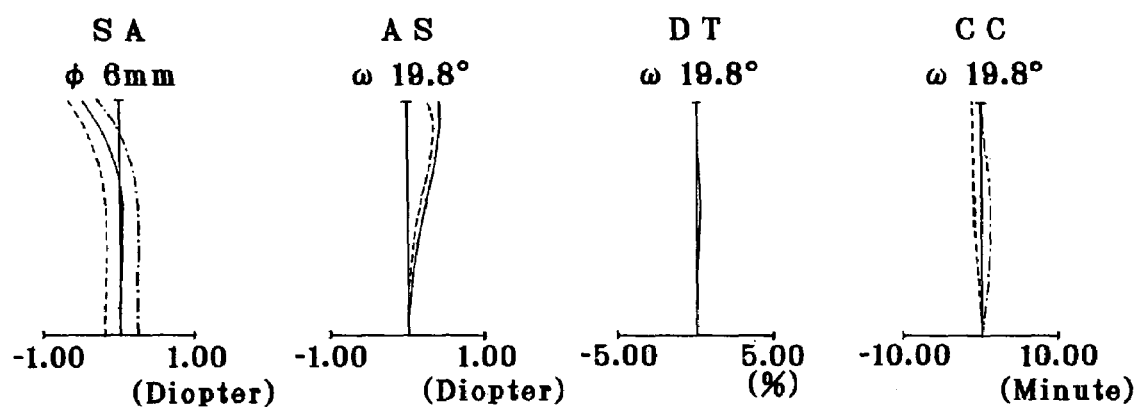
Figure 44C:
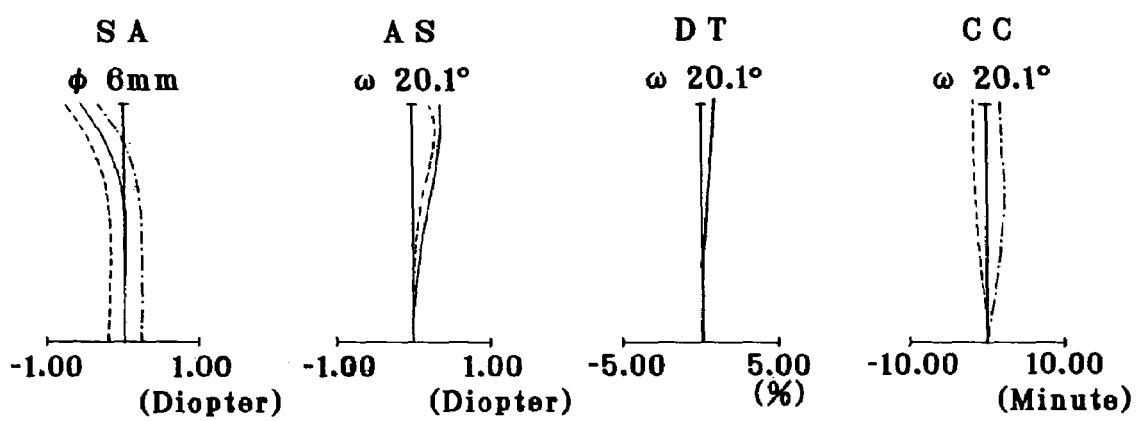
Figure 45:
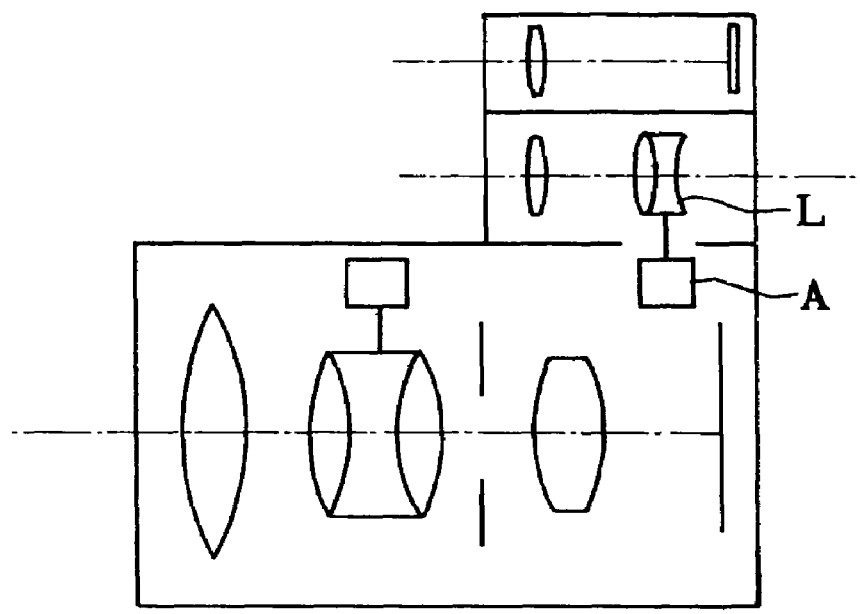
FIG. 45 is illustrative of the construction of one prior art optical system provided with an anti-shake function.
Figure 46:
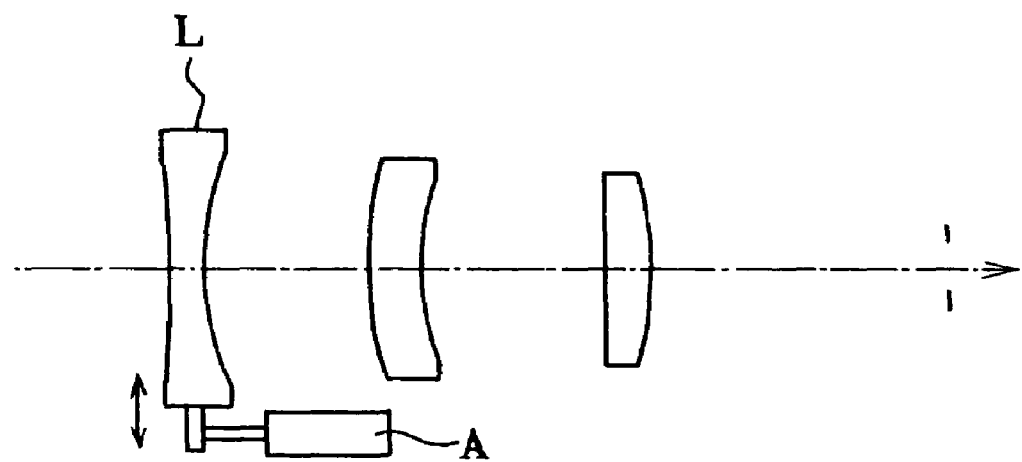
FIG. 46 is illustrative of the construction of another prior art optical system provided with an anti-shake function.
Figure 47:
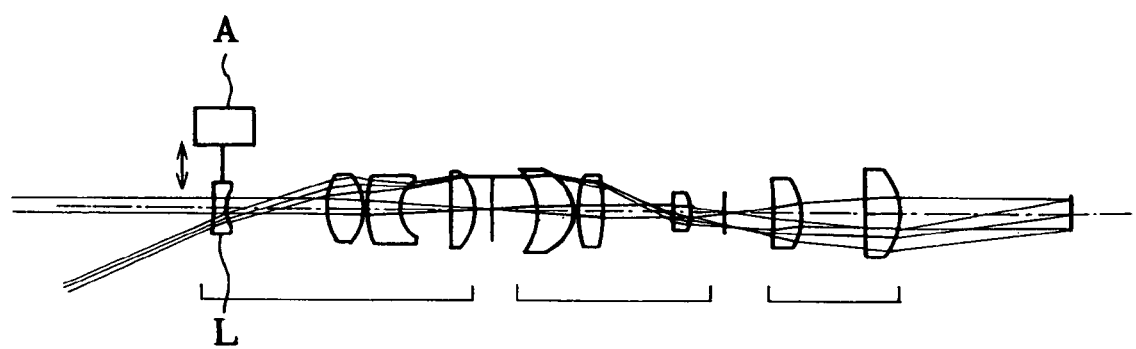
FIG. 47 is illustrative of the construction of yet another prior art optical system provided with an anti-shake function.
Figure 48:
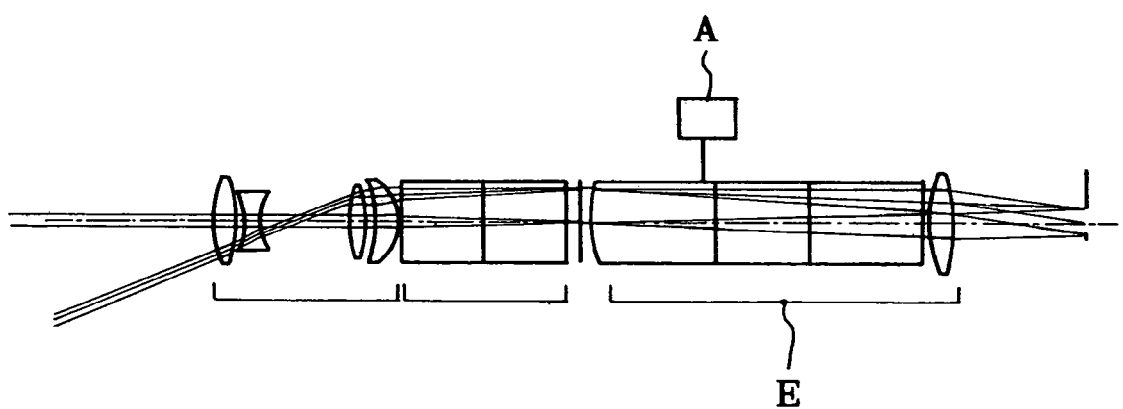
FIG. 48 is illustrative of the construction of a further prior art optical system provided with an anti-shake function.

FIG. 43 is a collection of aberration diagrams for Numerical Embodiment 2, and FIG. 44 is a collection of aberration diagrams for Numerical Embodiment 3. In these aberration diagrams, (a), (b) and (c) are indicative of spherical aberration (SA), astigmatism (AS), distortion (DT) and chromatic aberration of magnification (CC) at the time of +1 diopter, −1 diopter, and −3 diopter, respectively, and "ϕ" and "ω" are indicative of pupil diameter and an exit angle, respectively. Note that the states of aberrations in the aberration diagrams are illustrative of those in the finder optical system after the primary image-formation plane.

What we claim is:

1. A finder optical system, comprising:
a relay optical system operable to reform a subject image at a secondary image-formation position wherein the subject image is a primary image formed at a primary image-formation position through an objective optical system, and
an eyepiece optical system operable to view an image re-formed through the relay optical system, wherein:
the finder optical system comprises at least four reflecting surfaces including an F3 reflecting surface, an F2 reflecting surface, an F1 reflecting surface and an R1 reflecting surface located between the primary image-formation position and the secondary image-formation position side and in an optical path order from a primary image-formation position side to a secondary image-formation position side, at least one positive lens located between the F1 reflecting surface and the R1 reflecting surface, and an R2 reflecting surface located between the R1 reflecting surface and the secondary image-formation position, and at least one positive lens located between the R1 reflecting surface and the R2 reflecting surface.
the finder optical system has an optical axis reflected at each of the reflecting surfaces (FIG. 3), and
the light ray exits the F2 and R1 reflecting surfaces in an opposing direction of said light ray as it exits the eyepiece optical system.

2. The finder optical system according to claim 1, which satisfies the following condition (2-1) with respect to an angle $α_f$ that an optical axis direction exiting from the F2 reflecting surface subtends an optical axis direction exiting from the eyepiece optical system, provided that when extensions of the two optical axis directions do not intersect, the angle $α_f$ is given by an angle made upon projection of two such extensions in a direction of a straight line of connecting together closest portions thereof:

$$92° \leq α_f \leq 135° \quad (2\text{-}1).$$

3. The finder optical system according to claim 2, which satisfies the following condition (2-1)':

$$97° \leq α_f \leq 105° \quad (2\text{-}1)'.$$

4. The finder optical system according to claim 1, wherein an angle that an optical axis just after exiting from the R1 reflecting surface subtends an optical axis exiting from the eyepiece optical system is an acute angle, wherein the acute angle $α_r$ satisfies the following condition (2-6), provided that when extensions of the two axis directions of light do not intersect, the angle $α_r$ is given by an angle made upon projection of two such extensions in a direction of a straight line of connecting together closest portions thereof:

$$45° \leq α_r \leq 88° \quad (2\text{-}6).$$

5. The finder optical system according to claim 4, which satisfies the following condition (2-6)':

$$60° \leq α_r \leq 80° \quad (2\text{-}6)'.$$

6. The finder optical system according to claim 1, wherein an optical axis direction incident on the F1 reflecting surface is away from the primary image-formation position, and an optical axis direction exiting from the R1 reflecting surface is toward the primary image-formation position.

7. The finder optical system according to claim 1, wherein the finder optical system comprises at least one positive lens located between the F1 reflecting surface and the R1 reflecting surface, at least one negative lens located on a side of the positive lens facing the R1 reflecting surface, and at least one positive lens located on a side of the negative lens facing the R1 reflecting surface.

8. The finder optical system according to claim 1, wherein a position of incidence of an optical axis on the F1 reflecting surface with respect to a position of incidence of an optical axis on the F3 reflecting surface is in a direction away from an optical axis exiting the eyepiece optical system.

9. The finder optical system according to claim 1, wherein optical function surfaces located between the F3 reflecting surface and the F1 reflecting surface are all planes.

10. The finder optical system according to claim 1, wherein the finder optical system comprises an R2 reflecting surface located between the R1 reflecting surface and the secondary image-formation position, wherein an optical axis exiting from the secondary image-formation position and an optical axis incident on the eyepiece optical system lies on an identical straight line.

11. The finder optical system according to claim 1, wherein the number of reflecting surfaces provided between the primary image-formation position and the secondary image-formation position is only five.

12. A single-lens reflex camera, comprising: a light beam splitter means operable to split light beams incident through an objective optical system into a light beam incident on an image pickup device and a light beam incident on a finder optical system operable to bend a light beam to view a subject image, a finder optical system operable to bend a light beam from the objective optical system to view a subject image, and a focal plane plate located at a primary image-formation position given by a surface optically equivalent to the image pickup device and operable to form a subject image thereon, wherein: the finder optical system is the finder optical system according to claim 1.

* * * * *